(12) United States Patent
Shao et al.

(10) Patent No.: US 10,940,573 B2
(45) Date of Patent: Mar. 9, 2021

(54) HAND-HELD TOOL SYSTEM

(71) Applicant: Positec Power Tools (Suzhou) Co., Ltd., Jiangsu (CN)

(72) Inventors: Yong Shao, Jiangsu (CN); Jun Wu, Jiangsu (CN); Mingming He, Jiangsu (CN); Paolo Andriolo, Vicenza (IT); Ka Tat Kelvin Wong, Jiangsu (CN); Shuai Meng, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 182 days.

(21) Appl. No.: 16/357,483

(22) Filed: Mar. 19, 2019

(65) Prior Publication Data

US 2019/0283196 A1   Sep. 19, 2019

Related U.S. Application Data

(63) Continuation of application No. PCT/CN2017/102340, filed on Sep. 19, 2017.

(30) Foreign Application Priority Data

Sep. 19, 2016  (CN) .......................... 2016 1 0831703
Dec. 23, 2016  (CN) .......................... 2016 1 1209654

(51) Int. Cl.
*B23Q 17/22*  (2006.01)
*B23Q 9/00*   (2006.01)
(Continued)

(52) U.S. Cl.
CPC .......... *B23Q 17/22* (2013.01); *B23Q 9/0071* (2013.01); *B23Q 16/00* (2013.01); *B25H 1/00* (2013.01);
(Continued)

(58) Field of Classification Search
CPC ...... B23Q 17/22; B23Q 9/0071; B23Q 17/00; B25H 1/00; G01C 9/00; G01P 15/18; G01S 17/08; G06T 5/00
See application file for complete search history.

(56) References Cited

U.S. PATENT DOCUMENTS 6,301,997 B1 * 10/2001 Welte .................... B25B 21/00
                                                          33/263
6,898,860 B2 *  5/2005 Wu ...................... B25H 1/0092
                                                          33/286
(Continued)

FOREIGN PATENT DOCUMENTS

CN       1856693 A    11/2006
CN     102328306 A     1/2012
(Continued)

OTHER PUBLICATIONS

State Intellectual Property Office of the P.R. China, International Search Report and Written Opinion (English translation included) for PCT/CN2017/102340 dated Nov. 19, 2017.

*Primary Examiner* — Nathaniel C Chukwurah
(74) *Attorney, Agent, or Firm* — Middleton Reutlinger

(57) ABSTRACT

A hand-held tool system comprises a hand-held tool and a positioning device matching the hand-held tool. The hand-held tool comprises an output shaft and a working head coupled to the output shaft. The positioning device comprises a detecting module configured to detect a positional feature and/or a movement feature of the positioning device and output a parameter indicative of the positional feature and/or the movement feature, the detecting module and the working head having a preset distance therebetween; a storage module configured at least to record reference position information about the working head; a control module configured to acquire real-time position information about the working head based on the parameter, the preset distance
(Continued)

and the reference position information; and an output module configured to output the real-time position information in a way that can be perceived.

23 Claims, 63 Drawing Sheets

(51) Int. Cl.
    *B23Q 16/00*     (2006.01)
    *G01C 9/00*     (2006.01)
    *G01P 15/18*     (2013.01)
    *G01S 17/08*     (2006.01)
    *G06T 5/00*     (2006.01)
    *B25H 1/00*     (2006.01)

(52) U.S. Cl.
    CPC ............... *G01C 9/00* (2013.01); *G01P 15/18* (2013.01); *G01S 17/08* (2013.01); *G06T 5/00* (2013.01); *B23Q 2716/00* (2013.01); *B23Q 2717/00* (2013.01)

(56) References Cited

U.S. PATENT DOCUMENTS

| | | | |
|---|---|---|---|
| 7,331,113 B1 * | 2/2008 | Patrick | B25F 5/021 |
| | | | 33/286 |
| 2002/0145724 A1 * | 10/2002 | Wursch | B25H 1/0092 |
| | | | 356/4.01 |

FOREIGN PATENT DOCUMENTS

| | | |
|---|---|---|
| CN | 103118825 A | 5/2013 |
| CN | 103429395 A | 12/2013 |
| DE | 202004018003 U1 | 3/2005 |

* cited by examiner

HAND-HELD TOOL SYSTEM

BACKGROUND

Technical Field

The present invention relates to a hand-held tool system, and in particular, to a hand-held tool system provided with a positioning device.

Related Art

Currently, during punching holes continuously or mounting screws on a workpiece by using a hand-held tool, such as an electric screwdriver and a hand-held electric drill, so as to hang pictures on a wall, in order to ensure that various punching points are arranged based on specified distances and directions, pre-measurement, lineation, and working point position marking need to be performed in advance. Operations are complex, time-consuming and energy-consuming, traces may be left on the wall or the workpiece. Moreover, since overall layout is not conducted before hanging the pictures, positions between picture frames are discordant or a spacing is not suitable, so that position deviation and the like may occur easily.

In view of this, it is necessary to research and develop a hand-held tool system configured to perform positioning, ranging, and punching directly so as to assist in picture hanging and has simple, intelligent, and humanized operations, without traces.

SUMMARY

In order to overcome defects in the prior art, the present invention provides a hand-held tool system configured to perform positioning accurately and quickly.

A technical solution of the present invention is shown as follows: a hand-held tool system, including a hand-held tool; and a positioning device couple to the hand-held tool, where the hand-held tool includes an output shaft and a working head coupled to the output shaft; and the positioning device includes: a detecting module, configured to detect a position feature and/or a movement feature of the positioning device and output a parameter indicative of the position feature and/or the movement feature, the detecting module and the working head having a preset distance therebetween; a storage module, configured at least to record reference position information about the working head; a control module, configured to acquire real-time position information about the working head based on the parameter, the preset distance, and the reference position information; and an output module, configured to output the real-time position information in a sensible manner.

Preferably, the hand-held tool includes a main body portion and a holding portion arranged at an angle to the main body portion, where the positioning device is disposed in the main body portion.

Preferably, the positioning device further includes an input unit configured to input predetermined position information.

Preferably, the input unit is configured to be a key or a touch screen arranged on a tail end face of the main body portion which is opposite to the working head.

Preferably, the positioning device further includes a mode selection unit configured to operably select the positioning device to be in a predetermined working mode, where the control module is configured to match an operation interface corresponding to the predetermined working mode.

Preferably, the positioning device includes a positioning portion, and the output module includes a reminding device, where the reminding device is controlled to send out an indication when the control module determines that the positioning portion is reached to a preset area adjacent to the predetermined position.

Preferably, the reminding device is controlled to send out an in-place indication when the control module determines that the positioning portion is reached to the predetermined position.

Preferably, the positioning device further includes an actuating unit for actuating to record information of a determined reference position, where the actuating unit is disposed in the holding portion and adjacent to a switch trigger.

Preferably, the output module includes a display screen for displaying position information of the working head in a digital manner. The display screen is arranged on a tail end face of the main body portion which is opposite to the working head.

Preferably, the positioning device is provided with a DC power supply for supplying electric energy.

Preferably, the detecting module includes an inertial detection unit for detecting an attitude angle of the positioning device, where the inertial detection unit is arranged parallel with or perpendicular to an axis of the output shaft of the hand-held tool. The inertial detection unit includes an acceleration sensor and an angular velocity sensor, where the acceleration sensor is configured as a three-axis accelerometer and the angular velocity sensor is configured as a three-axis gyroscope.

Preferably, the detecting module further includes a laser ranging unit configured to detect a linear distance between the positioning device and a reference plane, where the laser ranging unit includes a laser transmitter and a laser sensor.

Preferably, the laser ranging unit includes a first laser unit and a second laser unit that are arranged perpendicular to each other.

Preferably, axis of the first laser unit and that of the second laser unit define a plane perpendicular to the axis of the output shaft of the hand-held tool.

Preferably, the laser ranging unit is rotatable about an axis.

Preferably, the detecting module further includes an image sensing unit configured to detect a displacement of the positioning device, where the image sensing unit includes a laser camera and a laser transmitter.

Preferably, the hand-held tool includes an interlock control circuit configured to initiate the hand-held tool or the positioning device working alternatively.

Preferably, the control module includes a processing module configured to reset the reference position information.

Another technical solution of the present invention is shown as follows: a hand-held tool system, including a hand-held tool and a positioning devicecouple to the hand-held tool, where the hand-held tool includes an output shaft and a working head coupled to the output shaft; and the positioning device includes: a detecting module configured to detect a position feature and/or a movement feature of the positioning device and output a parameter indicative of the position feature and/or the movement feature, the detecting module and the working head having a preset distance therebetween; a communication module configured to communicate with an intelligent apparatus so as to obtain predetermined position information from the intelligent apparatus; a storage module configured at least to record reference position information about the working head; a control module configured to acquire real-time position information of the working head based on the parameter, the preset distance, and the reference position information; and an output module configured to give an indication based on the real-time position information and the predetermined position information.

Preferably, communication is performed between the communication module and the intelligent apparatus at least by means of one of Wi-Fi, Bluetooth, infrared, and NFC.

Preferably, communication information at least includes one of position information, size information, image information, control instruction information, state monitoring information, and voice information.

Yet another technical solution of the present invention is shown as follows: a hand-held tool system, including a hand-held tool and a positioning device couple to the hand-held tool, where the hand-held tool includes an output shaft and a working head coupled to the output shaft; and the positioning device includes: a detecting module configured to detect a position feature and/or a movement feature of the positioning device and output a parameter indicative of the position feature and/or the movement feature; a positioning portion having a preset distance from the detecting module; a storage module configured at least to record reference position information of the positioning portion; a control module configured to acquire real-time position information about the positioning portion based on the parameter, the preset distance, and the reference position information; and an output module configured to output the real-time position information in a sensible manner.

Preferably, a central line of the positioning portion overlaps with an axis of the working head.

Preferably, the hand-held tool includes a main body portion and a holding portion arranged at an angle to the main body portion, where the positioning device is arranged movably in the main body portion.

Still another technical solution of the present invention is shown as follows: a hand-held tool system, including a hand-held tool and a positioning device couple to the hand-held tool, where the hand-held tool includes an output shaft and a working head coupled to the output shaft; and the positioning device includes: a detecting module configured to detect a position feature and/or a movement feature of the positioning device and output a parameter indicative of the position feature and/or the movement feature; a positioning portion having a preset distance from the detecting module; a communication module configured to communicate with an intelligent apparatus so as to obtain predetermined position information from the intelligent apparatus; a storage module configured at least to record reference position information about the working head; a control module configured to acquire real-time position information about the positioning portion based on the parameter, the preset distance, and the reference position information; and an output module configured to give an indication based on the real-time position information and the predetermined position information.

Preferably, communication is performed between the communication module and the intelligent apparatus at least by means of one of Wi-Fi, Bluetooth, infrared, and NFC.

Preferably, the communication information at least includes one of position information, size information, image information, control instruction information, state monitoring information, and voice information.

Preferably, the position information includes predetermined position information relative to a reference position.

Yet another technical solution of the present invention is shown as follows: a hand-held tool system, including a hand-held tool and a positioning device working cooperatively with the hand-held tool, where the hand-held tool includes an output shaft and a working head coupled to the output shaft; and the positioning device includes a primary positioning member connected to the hand-held tool and a secondary positioning member separated from the primary positioning member, where the secondary positioning member is configured to be able to be in signal association with the primary positioning member so as to provide a positioning benchmark for the primary positioning member; and the primary positioning member includes: a detecting module configured to detect a position feature and/or a movement feature of the primary positioning member and output a parameter indicative of the position feature and/or the movement feature, the detecting module and the working head having a preset distance therebetween; a storage module configured at least to record reference position information about the working head; a control module configured to acquire real-time position information about the working head based on the parameter, the preset distance, and the reference position information; and an output module configured to output the real-time position information in a sensible manner.

Preferably, the secondary positioning member is configured to transmit optical information, and the detecting module includes a sensor unit configured to detect an optical signal.

Preferably, the secondary positioning member includes a light tower, which may transmit three different types of laser signals, and the sensor unit includes at least three photoelectric sensors.

Preferably, the primary positioning member has a housing, and the at least three photoelectric sensors are distributed in a plurality of planar surfaces or curved surfaces of the housing.

Preferably, the secondary positioning member includes at least one light guide post, an optical detection sensor, and an infrared transmitter, and the detecting module includes a laser ranging unit and an infrared receiving unit, where the optical detection sensor is configured to detect a laser signal transmitted from the laser ranging unit and guided in through the light guide post; the infrared transmitter is configured to emit an infrared signal when the optical detection sensor detects a laser transmitted from the laser ranging unit; and the infrared receiving unit is configured to receive an infrared signal with information marked by the light guide post.

Preferably, the laser ranging unit is arranged perpendicular to an axis of the output shaft, and the infrared receiving unit is arranged parallel with the laser ranging unit.

Preferably, the hand-held tool includes a main body portion and a holding portion arranged at an angle to the main body portion, where the primary positioning member is disposed in the main body portion.

Preferably, the primary positioning member further includes an actuating unit for actuating to record information of a determined reference position, where the actuating unit is disposed in the holding portion and is arranged adjacent to a switch trigger of the holding portion.

Preferably, the primary positioning member further includes an input unit configured to input predetermined position information.

Preferably, the input unit is configured to be a key or a touch screen arranged on a tail end face which is opposite to the working head of the main body portion.

Preferably, the output module includes a display screen for displaying position information about the working head in a digital manner.

Preferably, the display screen is arranged on a tail end face which is opposite to the working head of the main body portion.

Preferably, the primary positioning member further includes a mode selection unit configured to operably select at least one predetermined working mode for the positioning device, where the control module is configured to match a corresponding operation interface based on the predetermined working mode.

Preferably, the output module includes a reminding device, where the reminding device is controlled to send out a indication when the control module determines that the working head is moved to a preset area adjacent to a predetermined position.

Preferably, the reminding device is controlled to send out an in-place indication when the control module determines that the working head is moved to the predetermined position.

Preferably, the primary positioning member is provided with a DC power supply for supplying electric energy.

Yet another technical solution of the present invention is shown as follows: a hand-held tool system, including a hand-held tool and a positioning device working cooperatively with the hand-held tool, where the hand-held tool includes an output shaft and a working head coupled to the output shaft; and the positioning device includes a primary positioning member connected to the hand-held tool and a secondary positioning member separated from the primary positioning member, where the secondary positioning member is configured to be able to be in signal association with the primary positioning member so as to provide a positioning benchmark for the primary positioning member; and the primary positioning member includes: a detecting module configured to detect a position feature and/or a movement feature of the positioning device and output a parameter indicative of the position feature and/or the movement feature, the detecting module and the working head having a preset distance therebetween; a communication module configured to communicate with an intelligent apparatus so as to obtain predetermined position information from the intelligent apparatus; a storage module configured at least to record reference position information about the working head; a control module configured to acquire real-time position information about the working head based on the parameter, the preset distance, and the reference position information; and an output module configured to give a indication based on the real-time position information and the predetermined position information.

A beneficial effect of the above technical solutions of the present invention is that since the positioning device is arranged on the hand-held tool, in a process that a tool is moved, a distance between the working head or the positioning portion and the predetermined position may be indicated through the output module or may be perceived by an operator, so that accurate and rapid positioning may be implemented. Once the working head is moved to the predetermined position, holes may be punched directly by using the tool, without additional positioning operations. Therefore, the operations may be simple, intelligent, and more humanized, and a single-person operation may be implemented without additional personnel assistance.

The present invention further provides an operation method for implementing positioning and punching in a working area by using a hand-held tool system. One solution is implemented as follows: an output module is a display screen; and the operation method includes the following operation steps: building a secondary positioning member in a predetermined area and starting running; moving a hand-held tool to a reference position in the predetermined area so as to align a working head with the reference position; recording the reference position; moving the hand-held tool in the working area and observing displayed information on the display screen; until the displayed information matches a preset first predetermined position, stopping moving the hand-held tool so as to remain the working head of the hand-held tool in a first hole position corresponding to the first predetermined position; and operating the hand-held tool so as to enable the working head to punch a first hole in the first hole position.

Preferably, the operation method further includes the following operation steps: recording the first hole position; moving the hand-held tool in the working area and observing displayed information on the display screen; until the displayed information matches a preset second predetermined position, stopping moving the hand-held tool so as to remain the working head of the hand-held tool in a second hole position corresponding to the second predetermined position; and operating the hand-held tool so as to enable the working head to punch a second hole in the second hole position.

Preferably, the operation method further includes the following operation steps: moving the hand-held tool to a reference position in the predetermined area so as to align the working head with the reference position; recording the reference position; moving the hand-held tool in the working area and observing displayed information on the display screen; until the displayed information matches a preset second predetermined position, stopping moving the hand-held tool so as to remain the working head of the hand-held tool in a second hole position corresponding to the second predetermined position; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within a range of 0 to 30 degrees respectively for a pitch angle and a heading angle.

Preferably, the hand-held tool stops moving and remains stationary within a preset time for zero speed correction.

Another solution is implemented as follows: output module includes a reminding device; and the operation method includes the following operation steps: building a secondary positioning member in a predetermined area and starting running; moving the hand-held tool to a reference position in the working area so as to align the working head with a reference position; recording the reference position; inputting first predetermined information relative to the reference position; moving the hand-held tool in the working area and determining whether a indication sent by the reminding device is received; until the indication is received, stopping moving the hand-held tool so as to remain the working head of the hand-held tool in a first hole position corresponding to the first predetermined information; and operating the hand-held tool so as to enable the working head to punch a first hole in the first hole position.

Preferably, recording the first hole position; inputting second predetermined information relative to the first hole position; moving the hand-held tool in the working area and determining whether a indication sent by the reminding device is received; until the indication is received, stopping moving the hand-held tool so as to remain the working head of the hand-held tool in a second hole position corresponding to the second predetermined information; and operating the hand-held tool so as to enable the working head to punch a second hole in the second hole position.

Preferably, moving the hand-held tool to a reference position so as to align the working head with the reference position; recording the reference position; inputting second predetermined information relative to the reference position; moving the hand-held tool in the working area and determining whether a indication sent by the reminding device is received; until the indication is received, stopping moving the hand-held tool so as to remain the working head of the hand-held tool in a second hole position corresponding to the second predetermined information; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Preferably, the hand-held tool stops moving and remains stationary within a preset time for zero speed correction.

Still another solution is implemented as follows: the output module includes a reminding device; and the operation method includes the following operation steps: building a secondary positioning member in the predetermined area and starting running; initiating a primary positioning member and establishing communication with an intelligent apparatus so as to receive predetermined information; moving the hand-held tool to a reference position in the working area so as to align the working head with the reference position; recording the reference position; moving the hand-held tool in the working area and determining whether a indication sent by the reminding device is received; until the indication is received, stopping moving the hand-held tool so as to remain the working head of the hand-held tool in a first hole position corresponding to first predetermined information in the predetermined information; and operating the hand-held tool so as to enable the working head to punch a first hole in the first hole position.

Preferably, the operation method further includes the following operation steps: recording the first hole position; moving the hand-held tool in the working area and determining whether a indication sent by the reminding device is received; until the indication is received, stopping moving the hand-held tool so as to remain the working head of the hand-held tool in a second hole position corresponding to second predetermined position in the predetermined information; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module is a display screen; and the operation method includes the following operation steps: building a secondary positioning member in the predetermined area and starting running; moving the hand-held tool to a reference position in the working area so as to align the working head with the reference position, and rotating the hand-held tool around the working head; recording the reference position; moving the hand-held tool in the working area, rotating the hand-held tool around the working head, and observing displayed information on the display screen; until the displayed information matches first predetermined information, stopping moving the hand-held tool so as to remain the working head of the hand-held tool in a first hole position corresponding to the first predetermined information; and operating the hand-held tool so as to enable the working head to punch a first hole in the first hole position.

Preferably, the operation method further includes the following operation steps: recording the first hole position; moving the hand-held tool in the working area, rotating the hand-held tool around the working head, and observing displayed information on the display screen; until the displayed information matches second predetermined information, stopping moving the hand-held tool so as to remain the working head of the hand-held tool in a second hole position corresponding to the second predetermined information; and operating the hand-held tool so as to enable the working head to punch a second hole in the second hole position.

Preferably, the operation method further includes the following operation steps: moving the hand-held tool to a reference position in the predetermined area so as to align the working head with the reference position, and rotating the hand-held around the working head; recording the reference position; moving the hand-held tool in the working area, rotating the hand-held tool around the working head, and observing displayed information on the display screen; until the displayed information matches second predetermined information relative to the reference position, stopping moving the hand-held tool so as to remain the working head of the hand-held tool in a second hole position corresponding to the second predetermined information relative to the reference position; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module includes a reminding device; and the operation method includes the following operation steps: building a secondary positioning member in the predetermined area and starting running; moving the a hand-held tool to a reference position in the working area so as to align the working head with the reference position, and rotating the hand-held tool around the working head; recording the reference position; inputting first predetermined information relative to the reference position; moving the hand-held tool in the working area, rotating the hand-held tool around the working head, and determining whether a indication sent by the reminding device is received; until the indication is received, stopping moving the hand-held tool so as to remain the working head of the hand-held tool in a first hole position corresponding to the first predetermined information; and operating the hand-held tool so as to enable the working head to punch a first hole in the first hole position.

Preferably, the operation method further includes the following operation steps: recording the first hole position; inputting second predetermined information relative to the first hole position; moving the hand-held tool in the working area, rotating the hand-held tool around the working head, and determining whether a indication sent by the reminding device is received; until the indication is received, stopping moving the hand-held tool so as to remain the working head of the hand-held tool at a second hole position corresponding to the second predetermined information; and operating the hand-held tool so as to enable the working head to punch a first hole in the second hole position.

Preferably, the operation method further includes the following operation steps: moving the hand-held tool to a reference position so as to align the working head with the reference position; recording the reference position; inputting second predetermined information relative to the reference position; moving the hand-held tool in the working area, rotating the hand-held tool around the working head, and determining whether a indication sent by the reminding device is received; until the indication is received, stopping moving the hand-held tool so as to remain the working head of the hand-held tool in a second hole position corresponding to the second predetermined information; and operating the hand-held tool so as to enable the working head to punch a first hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module includes a reminding device; and the operation method includes the following operation steps: building a secondary positioning member in the predetermined area and starting running; initiating a primary positioning member and establishing communication with an intelligent apparatus so as to receive a predetermined information signal; moving the hand-held tool to a reference position in the working area so as to align the working head with the reference position, and rotating the hand-held tool around the working head; recording the reference position; moving the hand-held tool in the working area, rotating the hand-held tool around the working head, and determining whether a indication sent by the reminding device is received; until the indication is received, stopping moving the hand-held tool so as to remain the working head of the hand-held tool in a first hole position corresponding to first predetermined information in the predetermined information signal; and operating the hand-held tool so as to enable the working head to punch a first hole in the first hole position.

Preferably, the operation method further includes the following operation steps: recording the first hole position; moving the hand-held tool in the working area, rotating the hand-held tool around the working head, and determining whether a indication sent by the reminding device is received; until the indication is received, stopping moving the hand-held tool so as to remain the working head of the hand-held tool in a second hole position corresponding to second predetermined information in the predetermined information signal; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module is a display screen; and the operation method includes the following operation steps: moving the hand-held tool to a reference position in the predetermined area so as to align a positioning portion with the reference position; recording the reference position; moving the hand-held tool in the working area and observing displayed information on the display screen; until the displayed information matches first predetermined information, stopping moving the hand-held tool so as to remain the positioning portion of the positioning device in a first hole position corresponding to the first predetermined information; and operating the hand-held tool so as to enable the working head to punch a first hole in the first hole position.

Preferably, the operation method further includes the following operation steps: recording the first hole position; moving the hand-held tool in the working area and observing displayed information on the display screen; until the displayed information matches second predetermined information, stopping moving the hand-held tool so as to remain the positioning portion of the positioning device in a second hole position corresponding to the second predetermined information; and operating the hand-held tool so as to enable the working head to punch a second hole in the second hole position.

Preferably, the operation method further includes the following operation steps: moving the hand-held tool to a reference position in the predetermined area so as to align the positioning portion with the reference position; recording the reference position; moving the hand-held tool in the working area and observing displayed information on the display screen; until the displayed information matches second predetermined information, stopping moving the hand-held tool so as to remain the positioning portion of the positioning device in a second hole position corresponding to the second predetermined information; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module includes a reminding device; and the operation method includes the following operation steps: moving the hand-held tool to a reference position in the working area so as to align the positioning portion with the reference position; recording the reference position; inputting first predetermined information; moving the hand-held tool in the working area and determining whether a indication sent by the reminding device is received; until the indication is received, stopping moving the hand-held tool so as to remain the positioning portion of the positioning device in a first hole position corresponding to the first predetermined information; and operating the hand-held tool so as to enable the working head to punch a first hole in the first hole position.

Preferably, recording the first hole position; inputting second predetermined information; moving the hand-held tool in the working area and determining whether a indication sent by the reminding device is received; until the indication is received, stopping moving the hand-held tool so as to remain the positioning portion of the positioning device in a second hole position corresponding to the second predetermined information; and operating the hand-held tool so as to enable the working head to punch a second hole in the second hole position.

Preferably, moving the hand-held tool to a reference position so as to align the positioning portion with the reference position; recording the reference position; inputting second predetermined information relative to the reference position; moving the hand-held tool in the working area and determining whether a indication sent by the reminding device is received; until the indication is received, stopping moving the hand-held tool so as to remain the positioning portion of the positioning device in a second hole position corresponding to the second predetermined information; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module includes a reminding device; and the operation method includes the following operation steps: initiating the positioning device and establishing communication with an intelligent apparatus so as to receive a predetermined information signal from the intelligent apparatus; moving the hand-held tool to a reference position in the working area so as to align the positioning portion with the reference position; recording the reference position; moving the hand-held tool in the working area and determining whether an indication sent by the reminding device is received; until the indication is received, stopping moving the hand-held tool so as to remain the positioning portion of the positioning device in a first hole position corresponding to first predetermined information in the predetermined information signal; and operating the hand-held tool so as to enable the working head to punch a first hole in the first hole position.

Preferably, the operation method further includes the following operation steps: recording the first hole position; moving the hand-held tool in the working area and determining whether an indication sent by the reminding device is received; until the indication is received, stopping moving the hand-held tool so as to remain the positioning portion of the positioning device in a second hole position corresponding to second predetermined information in the predetermined information signal; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the operation method includes the following operation steps: moving the hand-held tool to a reference position in a predetermined area so as to align the working head with the reference position; recording the reference position; moving the hand-held tool in the working area and observing displayed information on the display screen; until the displayed information matches first predetermined information, stopping moving the hand-held tool so as to remain the working head of the hand-held tool in a first hole position corresponding to the first predetermined information; and operating the hand-held tool so as to enable the working head to punch a first hole in the first hole position.

Preferably, the operation method further includes the following operation steps: recording the first hole position; moving the hand-held tool in the working area and observing displayed information on the display screen; until the displayed information matches second predetermined information relative to the first hole position, stopping moving the hand-held tool so as to remain the working head of the hand-held tool in a second hole position corresponding to the second predetermined information; and operating the hand-held tool so as to enable the working head to punch a second hole in the second hole position.

Preferably, the operation method further includes the following operation steps: moving the hand-held tool to a reference position in the predetermined area so as to align the working head with the reference position; recording the reference position; moving the hand-held tool in the working area and observing displayed information on the display screen; until the displayed information matches second predetermined information relative to the reference position, stopping moving the hand-held tool so as to remain the working head of the hand-held tool in a second hole position corresponding to the second predetermined information relative to the reference position; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Preferably, the hand-held tool stops moving and remains stationary within a preset time for zero speed correction.

Yet another solution is implemented as follows: the output module includes a reminding device; and the operation method includes the following operation steps: moving the hand-held tool to a reference position in the working area so as to align the working head with the reference position; recording the reference position; inputting first predetermined information relative to the reference position; moving the hand-held tool in the working area and determining whether an indication sent by the reminding device is received; until the indication is received, stopping moving the hand-held tool so as to remain the working head of the hand-held tool in a first hole position corresponding to the first predetermined information; and operating the hand-held tool so as to enable the working head to punch a first hole in the first hole position.

Preferably, recording the first hole position; inputting second predetermined information relative to the first hole position; moving the hand-held tool in the working area and determining whether an indication sent by the reminding device is received; until the indication is received, stopping moving the hand-held tool so as to remain the working head of the hand-held tool in a second hole position corresponding to the second predetermined information; and operating the hand-held tool so as to enable the working head to punch a second hole in the second hole position.

Preferably, moving the hand-held tool to a reference position so as to align the working head with the reference position; recording the reference position; inputting second predetermined information relative to the reference position; moving the hand-held tool in the working area and determining whether a indication sent by the reminding device is received; until the indication is received, stopping moving the hand-held tool so as to remain the working head of the hand-held tool in a second hole position corresponding to the second predetermined information; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Preferably, the hand-held tool stops moving and remains stationary within a preset time for zero speed correction.

Yet another solution is implemented as follows: the output module includes a reminding device; and the operation method includes the following operation steps: initiating the positioning device and establishing communication with an intelligent apparatus so as to receive a predetermined information signal from the intelligent apparatus; moving the hand-held tool to a reference position in the working area so as to align the working head with the reference position; recording the reference position; moving the hand-held tool in the working area and determining whether an indication sent by the reminding device is received; until the indication is received, stopping moving the hand-held tool so as to remain the working head of the hand-held tool in a first hole position corresponding to first predetermined information in the predetermined information signal; and operating the hand-held tool so as to enable the working head to punch a first hole in the first hole position.

Preferably, the operation method further includes the following operation steps: recording the first hole position; moving the hand-held tool in the working area and determining whether an indication sent by the reminding device is received; until the indication is received, stopping moving the hand-held tool so as to remain the working head of the hand-held tool in a second hole position corresponding to second predetermined information in the predetermined information signal; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

Yet another solution is implemented as follows: the output module is a display screen; and the operation method includes the following operation steps: moving the hand-held tool to a reference position in the working area so as to align the working head with the reference position, and rotating the hand-held tool around the working head; recording the reference position; moving the hand-held tool in the working area, rotating the hand-held tool around the working head, and observing displayed information on the display screen; until the displayed information matches first predetermined information, stopping moving the hand-held tool so as to remain the working head of the hand-held tool in a first hole position corresponding to the first predetermined information; and operating the hand-held tool so as to enable the working head to punch a first hole in the first hole position.

Preferably, the operation method further includes the following operation steps: recording the first hole position; moving the hand-held tool in the working area, rotating the hand-held tool around the working head, and observing displayed information on the display screen; until the displayed information matches second predetermined information, stopping moving the hand-held tool so as to remain the working head of the hand-held tool in a second hole position corresponding to the second predetermined information; and operating the hand-held tool so as to enable the working head to punch a second hole in the second hole position.

Preferably, the operation method further includes the following operation steps: moving the hand-held tool to a reference position in the predetermined area so as to align the working head with the reference position, and rotating the hand-held around the working head; recording the reference position; moving the hand-held tool in the working area, rotating the hand-held tool around the working head, and observing displayed information on the display screen; until the displayed information matches second predetermined information relative to the reference position, stopping moving the hand-held tool so as to remain the working head of the hand-held tool in a second hole position corresponding to the second predetermined information relative to the reference position; and operating the hand-held tool so as to enable the working head to punch a second hole in the second hole position.

Preferably, the detecting module includes an inertial detection unit, and the hand-held tool is moved within a preset attitude angle range of the inertial detection unit.

Preferably, the hand-held tool is moved within the range of 0 to 30 degrees respectively for a pitch angle and a heading angle.

The beneficial effect of the above technical solutions of the present invention is that since the positioning device is arranged on the hand-held tool, in the process that the tool is moved, the distance between the working head or the positioning portion and the predetermined position may be indicated through the output module or may be perceived by an operator, so that accurate and rapid positioning may be implemented. Once the working head is moved to the predetermined position, holes may be punched directly by using the tool, without additional positioning operations. Therefore, the operations may be simple, intelligent and more, and a single-person operation may be implemented without additional personnel assistance.

In order to overcome the defects in the prior art, the present invention provides a positioning device configured to perform positioning accurately and quickly.

A technical solution of the present invention is shown as follows: a positioning device, including: a detecting module configured to detect a position feature and/or a movement feature of the positioning device and output a parameter indicative of the position feature and/or the movement feature; a positioning portion having a preset distance from the detecting module; a storage module configured at least to record reference position information about the positioning portion; a control module configured to acquire real-time position information about the positioning portion based on the parameter, the preset distance, and the reference position information; and an output module configured to output the real-time position information in a sensible manner.

Preferably, the positioning device further includes a mode selection unit configured to operably select at least one predetermined working mode for the positioning device, where the control module is configured to match a corresponding operation interface based on the predetermined working mode.

Preferably, the positioning device further includes an input unit configured to input predetermined position information.

Preferably, the input unit is configured to be a key or a touch screen.

Preferably, the output module includes a reminding device, where the reminding device is controlled to send out an indication when the control module determines that the positioning portion is moved to a preset area adjacent to a predetermined position.

Preferably, the reminding device is controlled to send out an in-place indication when the control module determines that the positioning portion is moved to the predetermined position.

Preferably, the positioning device further includes a DC power supply for supplying electric energy.

Preferably, the detecting module includes an inertial detection unit for detecting an attitude angle of the positioning device.

Preferably, the inertial detection unit includes an acceleration sensor and an angular velocity sensor, where the acceleration sensor is configured as a three-axis accelerometer and the angular velocity sensor is configured as a three-axis gyroscope.

Preferably, the detecting module further includes an image sensing unit configured to detect a displacement of the positioning device, where the image sensing unit includes a laser camera and a laser transmitter.

Preferably, the detecting module further includes a laser ranging unit configured to detect a linear distance from a reference plane, where the laser ranging unit includes a laser transmitter and a laser sensor. The laser ranging unit includes a first laser unit and a second laser unit that are arranged perpendicular to each other.

Preferably, the control module includes a processing module configured to clear the reference position information about the working head.

Preferably, the positioning device further includes a communication module, which is configured to communicate with an intelligent apparatus.

Preferably, communication is performed between the communication module and the intelligent apparatus at least by means of one of Wi-Fi, Bluetooth, infrared, and NFC.

Preferably, the information of the communication at least includes one of position information, size information, image information, control instruction information, state monitoring information, and voice information.

Another technical solution of the present invention is shown as follows: a positioning device, including: a detecting module, configured to detect a position feature and/or a movement feature of the positioning device and output a parameter indicative of the position feature and/or the movement feature; a positioning portion having a preset distance from the detecting module; a storage module configured at least to record reference position information and predetermined position information about the positioning portion; a control module, configured to acquire real-time position information about the positioning portion based on the parameter, the preset distance, and the position information; and an output module, configured to give an indication based on the real-time position information and the predetermined position information.

Another technical solution of the present invention is shown as follows: a positioning device, including: a detecting module configured to detect a position feature and/or a movement feature of the positioning device and output a parameter indicative of the position feature and/or the movement feature; a positioning portion having a preset distance from the detecting module; a communication module configured to communicate with an intelligent apparatus so as to obtain predetermined position information from the intelligent apparatus; a storage module configured at least to record reference position information about the positioning portion; a control module configured to acquire real-time position information about the positioning portion based on the parameter, the preset distance, and the reference position information; and an output module configured to give an indication based on the real-time position information and the predetermined position information.

Another technical solution of the present invention is shown as follows: a positioning device, including: a detecting module configured to detect a position feature and/or a movement feature of the positioning device and output a parameter indicative of the position feature and/or the movement feature; an information input module configured to provide predetermined area information as well as position information about a predetermined object in a predetermined area; and a control module configured to control, based on the information and the parameter, the output module to project the information onto the predetermined area in a projecting manner.

Preferably, the positioning device further includes an adjusting module for correcting a projection proportion of the predetermined object within the predetermined area.

Preferably, the positioning device further includes a communication module for communicating with an intelligent apparatus so as to acquire information about the predetermined object and the predetermined area.

Preferably, the output module includes a laser galvanometer projection apparatus.

Preferably, the output module further includes a driving circuit, the laser galvanometer projection apparatus includes a laser transmitter, an X-axis scanning motor, and a Y-axis scanning motor, and the driving circuit is configured to receive displayed data and controlling the starting and stopping of the laser transmitter as well as a movement angle of the X-axis scanning motor.

Preferably, the X-axis scanning motor and the Y-axis scanning motor are configured to be high-speed motors, and the laser transmitter is configured to be a dotted laser transmitter.

Preferably, the detecting module includes an inertial detection unit for detecting an attitude angle of the positioning device and correcting a pitch distortion angle parameter thereof.

Preferably, the inertial detection unit includes an acceleration sensor and an angular velocity sensor, where the acceleration sensor is configured as a three-axis accelerometer and the angular velocity sensor is configured as a three-axis gyroscope.

Preferably, the positioning device includes a power supply providing energy for the positioning device to work.

Preferably, the information input module may communicate with the intelligent apparatus so as to obtain the predetermined area information and the position information about the predetermined object in the predetermined area.

Another technical solution of the present invention is shown as follows: a positioning device, where the positioning device includes: a battery; a detecting module configured to obtain a predetermined object and predetermined area information; an information input module configured to provide the predetermined area information as well as position information about the predetermined object in a predetermined area; a control module configured to acquire real-time position information about the predetermined object based on the information and a parameter; and an output module configured to give a indication based on the real-time position information and predetermined position information.

Preferably, the detecting module includes a camera.

Preferably, the positioning device further includes an input module and a processing module, where the input module is configured to operably select the processing module to process man-machine interaction or battery level state monitoring and an output is performed through the output module.

Preferably, the processing module includes a visual identification unit and a visual ranging unit.

Preferably, the information at least includes one of size information, image information, control instruction information, and state monitoring information.

Preferably, the state monitoring information includes a battery level and the remaining working time.

Preferably, the control instruction information includes a visual ranging ambiguity tolerance.

Preferably, the image information includes a front-face image of a preset predetermined and a typeset preset predetermined image.

The beneficial effect of the above technical solutions of the present invention is that in the process that the positioning device is moved, the distance between the positioning portion and the predetermined position may be indicated-indicated through the output module or may be perceived by an operator, so that more accurate and rapid positioning may be implemented.

The present invention further provides a method for determining a predetermined position in a predetermined area by using a positioning device.

A technical solution of the present invention is shown as follows: the method includes the following operation steps: moving the positioning device so as to move the positioning portion to a reference position in the predetermined area; recording a coordinate of the reference position; moving the positioning device and observing real-time position information from an output module; stopping moving the positioning device when it is determined that the real-time position information is consistent with a first predetermined position; and marking the first predetermined position by the positioning portion.

Preferably, the method further includes the following operation steps: recording the first predetermined position; moving the positioning device and observing real-time position information from the output module; stopping moving the positioning device when it is determined that the real-time position information is consistent with a second predetermined position; and marking the second predeterminedposition by the positioning portion.

Preferably, moving the positioning device so as to move the positioning portion to a reference position in the predetermined area; recording the reference position; inputting a first predetermined position; moving the positioning device and observing real-time position information from the output module; stopping moving the positioning device when it is determined that the real-time position information is consistent with the first predetermined position; and marking the first predetermined position by the positioning portion.

Preferably, recording the first predetermined position; inputting a second predetermined position; moving the positioning device and observing real-time position information from the output module; stopping moving the positioning device when it is determined that the real-time position information is consistent with the second predetermined position; and making the second predetermined position by the positioning portion.

A technical solution of the present invention is shown as follows: the method includes the following operation steps: initiating a communication module and establishing communication connection with an intelligent apparatus so as to receive predetermined position information from the intelligent apparatus; moving the positioning device so as to move the positioning portion to a reference position; recording reference position information; moving the positioning device and determining whether a indication from the output module is received; stopping moving the positioning device when a indication signal is received; and marking a first predetermined position in the predetermined position information by the positioning portion.

Preferably, the method includes the following operation steps: recording a coordinate of the first predetermined position; moving the positioning device and determining whether a indication sent by the output module is received; stopping moving the positioning device when a indication signal is received; and marking a second predetermined position by the positioning portion.

A technical solution of the present invention is shown as follows: the method includes the following operation steps: initiating the positioning device and establishing communication connection with an intelligent apparatus; receiving predetermined position information from the intelligent apparatus, where the predetermined position information includes information about a predetermined object in the predetermined area; projecting the information onto the predetermined area in a projecting manner; adjusting and correcting the projection so as to enable the predetermined object to overlap with the projection in the predetermined area, thereby determining a predetermined position in the projection; punching a hole and mounting a peg in the predetermined position; and mounting the predetermined object onto the peg.

Preferably, the projection is adjusted and corrected by operating the intelligent apparatus.

The present invention further provides a method for performing positioning detection by using a positioning device.

A technical solution of the present invention is shown as follows: the method includes the following operation steps: recording a reference position; detecting a position feature and/or a movement feature of the positioning device and outputting a parameter indicative of the position feature and/or the movement feature; acquiring real-time position information about the positioning portion based on the parameter, the preset distance, and the reference position information; and outputting the real-time position information in a sensible manner.

Preferably, the real-time position information is displayed in a digital manner.

Another technical solution of the present invention is shown as follows: the method includes the following operation steps: recording a reference position; inputting predetermined position information; detecting a position feature and/or a movement feature of the positioning device and outputting a parameter indicative of the position feature and/or the movement feature; acquiring real-time position information about the positioning portion based on the parameter, the preset distance, and the position information; and giving an indication based on the real-time position information and the predetermined position information.

Preferably, a final coordinate or distance is compared with a preset coordinate, and an indication is sent by the output module when the real-time position information matches the predetermined position information.

Preferably, the method includes the following operation steps: initiating the positioning device so as to obtain predetermined position information; recording a reference position; detecting a position feature and/or a movement feature of the positioning device and outputting a parameter indicative of the position feature and/or the movement feature; acquiring real-time position information about the positioning portion based on the parameter, the preset distance, and the position information; and giving an indication based on the real-time position information and the predetermined position information.

Another technical solution of the present invention is shown as follows: the method includes the following operation steps: initiating the positioning device so as to obtain predetermined position information as well as position information about a predetermined object in a predetermined area; detecting a position feature and/or a movement feature of the positioning device and outputting a parameter indicative of the position feature and/or the movement feature; and controlling, based on the information and the parameter, the output module to project the information onto the predetermined area in a projecting manner.

Another technical solution of the present invention is shown as follows: the method includes the following operation steps: obtaining a predetermined object and predetermined position information; obtaining the predetermined position information as well as position information about the predetermined object in a predetermined area; acquiring real-time position information about the predetermined object based on the information and the parameter; and giving a indication based on the real-time position information and the predetermined position information.

Preferably, the indication shown is an indication of voice.

The beneficial effect of the above technical solutions of the present invention is that in the process that the positioning device is moved, the distance between the positioning portion and the predetermined position may be indicated through the output module or may be perceived by an operator, so that accurate and rapid positioning may be implemented.

DETAILED DESCRIPTION

A First Embodiment

A positioning apparatus and a hand-held tool system equipped with the positioning apparatus of the present invention will be described below in detail in combination with specific embodiments.

In the hand-held tool system involved in the present invention, the hand-held tool is preferably a drilling tool; a hand-held tool for positioning, such as an electric drill, a screwdriver, an impact wrench; and an electric hammer, or a hand-held for cutting a workpiece, such as an electric circular saw, a reciprocating saw, and a chain saw.

Figure 1:
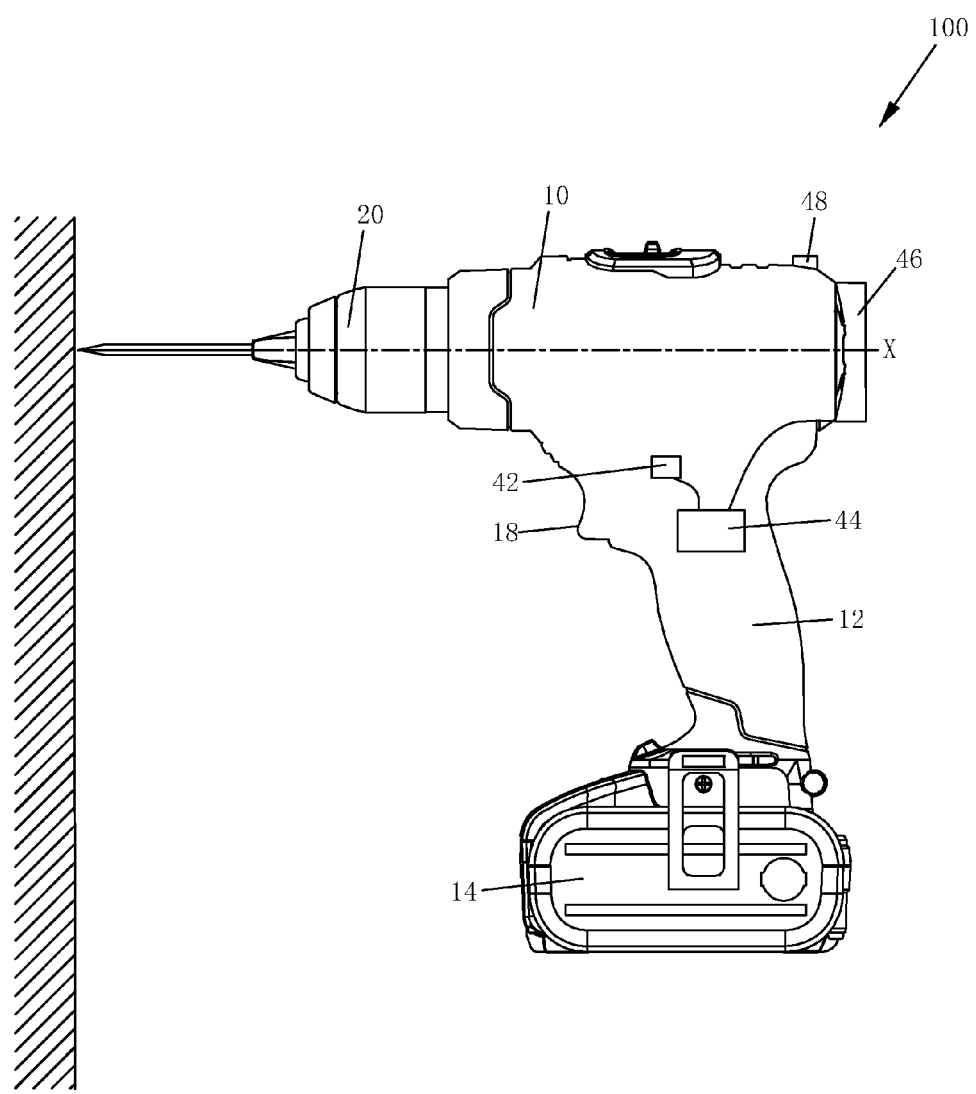
FIG. 1 is a schematic diagram of an electric drill in a first embodiment of the present invention.

FIG. 1 is a schematic structural diagram of an electric drill. The electric drill includes: a horizontally arranged main body portion; a holding portion arranged at an angle to the main body portion, that is, a handle 12; and a battery pack 14 detachably connected to the handle at the bottom of the handle. A housing 10 of the main body portion is provided with a motor (not shown) and an output shaft (not shown) that is driven to rotate by the motor, and a chuck 20 is provided at a front end of the housing 10 for mounting a working head on the output shaft in a fixed manner. The power generated by the motor is transferred to the chuck 20 through the output shaft, which in turn drives the working head to work. There may also be a transmission mechanism for driving the working head to rotate and/or reciprocate between the motor and the chuck, such as a gear and an air cylinder. An axis X of the output shaft is arranged parallel with or coaxial with a direction of a working rotation axis of the working head. A switch trigger 18 is arranged on the handle 12. A user may initiate the electric drill by pressing the switch trigger 18, so that the working head rotates in a forward or reverse direction. Certainly, the electric drill can also be driven by an alternating current power supply instead of the battery pack, or by pneumatic pressure or hydraulic pressure, etc.

The positioning apparatus involved in this embodiment is a ranging and positioning apparatus. The ranging and positioning apparatus may be mounted on the housing of the electric drill in a detachable manner or may be integrated with the electric drill in a non-detachable manner. The positioning apparatus may also be a wearable inertial detection apparatus that can be detached from a machine, which is advantageous for being easily used for ranging by different tools.

In this embodiment, preferably, description is made to the ranging and positioning apparatus being integrated with the electric drill.

The ranging and positioning apparatus includes a detecting/measuring module, an output module, and a control module connecting the detecting module to the output module. The detecting module is configured to detect continuous position feature values and/or movement feature values of the housing. The detecting module is disposed within the housing. Certainly, the detecting module may also be provided outside the housing and integrated with or arranged separately from the output module. In addition, the detecting module may be fixed on the housing of the electric drill in the form of a fitting, that is, a fixed interface is left on the electric drill. Connection to a display device may be implemented as long as the detecting module is mounted on the housing. Preferably, the detecting module has a preset distance from the motor and the battery pack 14 so as to prevent the detecting module from interference. The detecting module includes an inertial sensor 42, such as a displacement detecting sensor and an orientation detecting sensor. The displacement detecting sensor includes an acceleration sensor and the orientation detecting sensor includes an angular velocity sensor and/or an angle sensor, and are respectively configured to detect displacements of the electric drill in at least two directions of space and orientations of the electric drill. For either the acceleration sensor or the angular velocity sensor, its mounting position relative to the electric drill needs to be parallel with or perpendicular to the axis X of the output shaft. The parallelism or the perpendicularity here does not mean a complete 0° or 90°, but being substantially parallel or perpendicular, that is, a range of plus or minus 15° can be considered to be substantially parallel or substantially perpendicular, preferably a range of plus or minus 5°. It is possible to be not parallel and perpendicular, but an included angle of mounting must be known, or a software correction may be performed so as to acquire the included angle of the sensor, and the included angle may be taken into account in a final calculation. The acceleration sensor is preferably configured as a three-axis acceleration sensor, which reflects linear displacement features of the electric drill in three directions of space comprehensively and accurately by detecting the spatial acceleration. The angular velocity sensor is preferably configured as a three-axis gyroscope, especially an MEMS gyroscope, which accurately reflects tilted angle features of the electric drill in three directions of space by detecting rotational angular velocity during deflection and tilting and is not affected by a magnetic field. Certainly, the orientation detecting sensor may also be an electronic compass or other sensors configured to detect orientations.

The output module of this embodiment relates to a display device arranged outside the housing. Preferably, the display device is arranged on a tail portion of the housing of the electric drill away from the chuck or the working head, preferably on an end face of the tail portion, so that the user may observe the display device whenever and wherever possible, that is, the user may see the display device in real time no matter it is a horizontal operation or a vertical punching operation. The display device is configured to display detection position information about the electric drill. The control module includes a processing module. The processing module may process and analyze a displacement feature and an orientation feature detected by the detecting module so as to convert the displacement feature and the orientation feature into numerical values and send the numerical values to the display device, that is, the processing module receives signals indicative of a position feature and/or a movement feature detected by the detecting module, performs data processing and analysis calculation and the like on the signals, and acquires a relative coordinate or a relative distance of a current position relative to a reference position and/or azimuth angle data on the current position. The control module is preferably an MCU controller 44, and the control module may also be integrated with the detecting module, for example, the sensor itself is provided with a controller. The position information about the electric drill displayed by the display device includes a moving distance or a three-dimensional coordinate relative to a benchmark position in three directions. An azimuth angle of the electric drill, that is, a horizontal/tilted angle, may be configured to be displayed or not displayed as needed. The preferred display device in this embodiment includes a display screen 46. The display screen 46 may be an LED or LCD liquid crystal display and may also be a digital tube display, which displays the distance or the coordinate digitally, so that the user may learn a real-time position of the electric drill intuitively. As other optional solutions, the output module may also include a projection apparatus, which projects the coordinate or values of the coordinate onto a working plane through projection display, so that the user may observe more clearly and conveniently.

The ranging and positioning apparatus further includes an actuating unit for actuating to record information of a determined reference position. The actuating unit of this embodiment is configured to be a positioning mode key 48. The positioning mode key 48 is mounted on the housing, preferably in a position adjacent to the display screen. Another preferred manner is to be arranged adjacent to the switch trigger 18 on the handle 12 so as to facilitate operations of an operator when the handle 12 is held. The actuating of the positioning mode key 48 may be used at least for recording a determined origin coordinate, that is, a reference position, or clearing the origin coordinate and recording the zero coordinate, thereby eliminating accumulated errors. The actuating of the positioning mode key 48 may also be used for initiating the ranging and positioning apparatus to supply power, that is to say, coordinate clearing may occur when or after the ranging and positioning apparatus is powered on, which means that the ranging and positioning apparatus may be always in a power-on state. Considering energy saving, the ranging and positioning apparatus may be powered off after the electric drill reaches a predetermined position. In addition, in order to eliminate an influence of the vibration when the electric drill is initiated on the inertial sensor, when the positioning mode key 48 is pressed, the electric drill motor is not powered on, that is, the motor does not work. Certainly, the influence on the inertial sensor may also be eliminated by reducing the vibration, for example, providing a vibration reduction apparatus between the inertial sensor and the housing, such as a rubber pad and a vibration reduction spring.

It is necessary to determine a reference position and/or an orientation of the electric drill before the ranging and positioning apparatus starts detecting. The reference position here may be a starting position or an finishing position of a first working process, such as hole drilling. The reference position may be a position in which a drill bit abuts against the workpiece and is ready to initiate the trigger to start working or a working ending position in which the drill bit remains in a hole after a hole drilling is completed and the trigger is released. The difference therebetween is whether data on a next working position detected includes depth data on punching. This difference has no influence on determining a distance and angle between holes during continuous punching. Therefore, the starting position of working and the finishing position of working are collectively referred to as a working position here. The reference position may be fixed as a first working position, which needs accumulating data during continuous punching. A previous working position for each operation may also be defined as the reference position, so that if continuous punching is an isometric operation, merely one set of data needs to be recorded. Since the ranging and positioning apparatus of this embodiment may detect the displacements in three directions of space, that is to say, the ranging and positioning apparatus may also detect the depth of punching in addition to confirming a position of punching, continuous punching of a given distance and depth may be implemented.

In this embodiment, preferably, a reference position or a benchmark position of the electric drill is determined by detecting the positioning mode key 48, that is, the position where the electric drill is located when the positioning mode key 48 is actuated. Under a normal working condition, the reference position is an origin position of the electric drill, and then, in a process that the electric drill is moved, the detecting module starts detecting a real-time position of the electric drill, and the position may be displayed by the display device in real time. Certainly, the positioning mode key may also be in other forms, such as a separate button for the user to trigger, a trigger of the electric drill or an actuating member, and is mounted on the housing in a position convenient for operation, or perform actuating detection in other manners, such as voice control and gesture recognition. In other optional solutions, the positioning mode key is combined with the trigger of the electric drill into one, and the actuating detection and the initiating of the power supplying to the electric drill are implemented by pressing with different depths; or the trigger is divided into two portions, with one configured to implement the function of the positioning mode key and the other configured to implement the function of the trigger, and both preventing misoperation by providing an interlock, that is to say, detection of the detecting module and operation of the motor may be performed alternatively. Moreover, there is a certain distance between the positioning mode key and the trigger so as to allow the user to actuate the positioning mode key while holding the handle by one hand to operate the trigger.

After triggering the positioning mode key 48, the user may move the electric drill to a position in which the electric drill needs to work, observe data on a current position of the electric drill displayed on the display screen in real time, and confirms, based on the data, whether the electric drill reaches a working position, and the electric drill may start working after the electric drill reaches the working position. In order to prevent error accumulation caused by continuous detection of the detecting module, the detection may be stopped while starting working, or a detecting system may be powered off. There are many implementations of stopping detection, for example, in a case that the positioning mode key and the trigger are arranged separately, an initiating circuit of the positioning mode key and an initiating circuit of the trigger switch may be configured to be interlock circuits, that is, the detection starts when the positioning mode key is actuated, and the detection stops when a trigger switch is actuated, or the detecting module stops detecting when the positioning mode key is actuated again. The display screen displays distances between a current position and a previous triggering position in three directions in a fixed manner, and the data may be stored, that is to say, the control module of the ranging and positioning apparatus includes a storage module for storing data such as a distance and an azimuth angle of the working position relative to the reference position. After one operation is completed, for example, one hole drilling is completed, the positioning mode key is actuated again, that is, the current position is the reference position, the displayed data is all cleared, and the electric drill is moved to a next required working position again, so that the position in which the electric drill is located every time the positioning mode key is actuated may be a reference position next time. Therefore, merely one set of data needs to be recorded when isometric punching on a same straight line is performed, which is simpler and more convenient compared with the configuration of merely setting an actuating position for the first time, no matter the set of data is determined by the user or stored in a storage unit and displayed through the display device.

Certainly, if the user desires to merely set one reference position, the user may actuate the positioning mode key in the selected reference position every time, and then, displace to a position to be operated, so that a moving distance needs to be determined by the user or calculated through the ranging and positioning apparatus. In addition, coordinates of a plurality of punching points relative to an initial position or a previous punching point may be input at one time and stored. Therefore, it is not necessary to re-input a punching coordinate every time a hole is punched, and the system automatically sets a predetermined coordinate to be a coordinate value that is stored in the storage module previously.

A Second Embodiment

Figure 2:
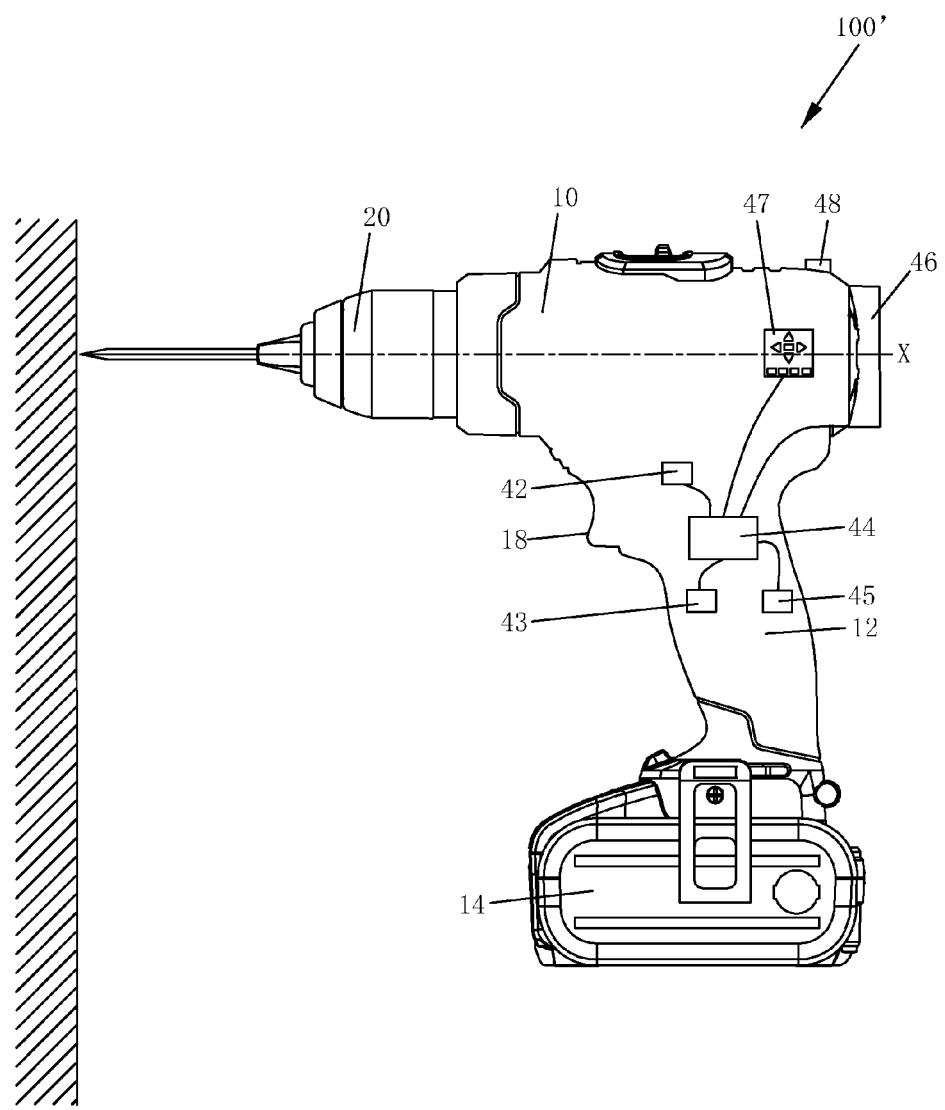
FIG. 2 is a schematic diagram of an electric drill in a second embodiment of the present invention.

FIG. 2 is a schematic diagram of another electric drill. The ranging and positioning apparatus includes an input unit for setting a position parameter relative to the reference position, that is, predetermined position information, and inputting a predetermined position via a keyboard, a touch screen, or a button, preferably a keyboard. The user may input the moving distance as needed. Then, the user may actuate the positioning mode key at the reference position and move the electric drill. When the electric drill reaches a specified position, the user may be prompted correspondingly in a sensible manner, for example, by blinking of an LED lamp of the display screen, or by sound production of a buzzer 43 as long as the ranging and positioning apparatus further includes the buzzer 43, or by vibration or other ways that can be perceived in visual sense, auditory sense, or tactile sense. The sensible manner includes but not limited to optical and/or acoustic and/or electrical manners.

Certainly, the way of inputting data by the user may also be replaced by other ways, for example, establishing communication connection with an intelligent apparatus so as to receive preset position or coordinate information from the intelligent apparatus. The ranging and positioning apparatus may further include a communication module, configured to implement wired or wireless communication connection, for example, a USB interface, Wi-Fi, a cellular mobile network, etc., with the ranging and positioning apparatus through, for example, an intelligent apparatus, such as a mobile phone, a tablet computer, and other mobile apparatus. In this embodiment, the communication module is preferably a Bluetooth module 45, which inputs data into the mobile apparatus and transmits data and information to the ranging and positioning apparatus via Bluetooth.

When the ranging and positioning apparatus performs position detection, since the inertial sensor is mounted in the housing and the defined coordinate origin is located on an end portion of the drill bit, coordinate correction is needed. Methods for coordinate correction will be described below in detail for different situations.

Figure 3:
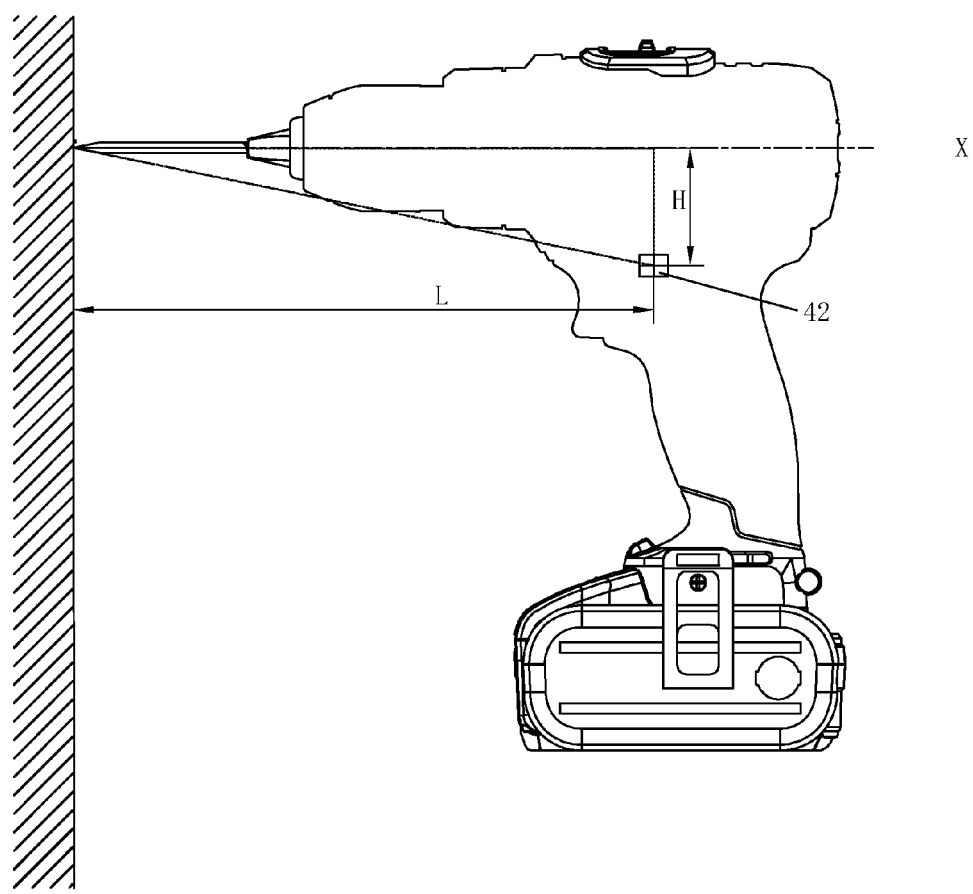
FIG. 3 is a schematic diagram of coordinate correction for the electric drill of FIG. 2 under a first working condition.

FIG. 3 is a schematic diagram of a method of coordinate correction for the drill bit relative to the inertial sensor when the electric drill is in a horizontal position. Assuming coordinates of the sensor are (x0, y0, z0), coordinates of the drill bit are corrected to be (x0, y0−L, z0+H).

Figure 4:
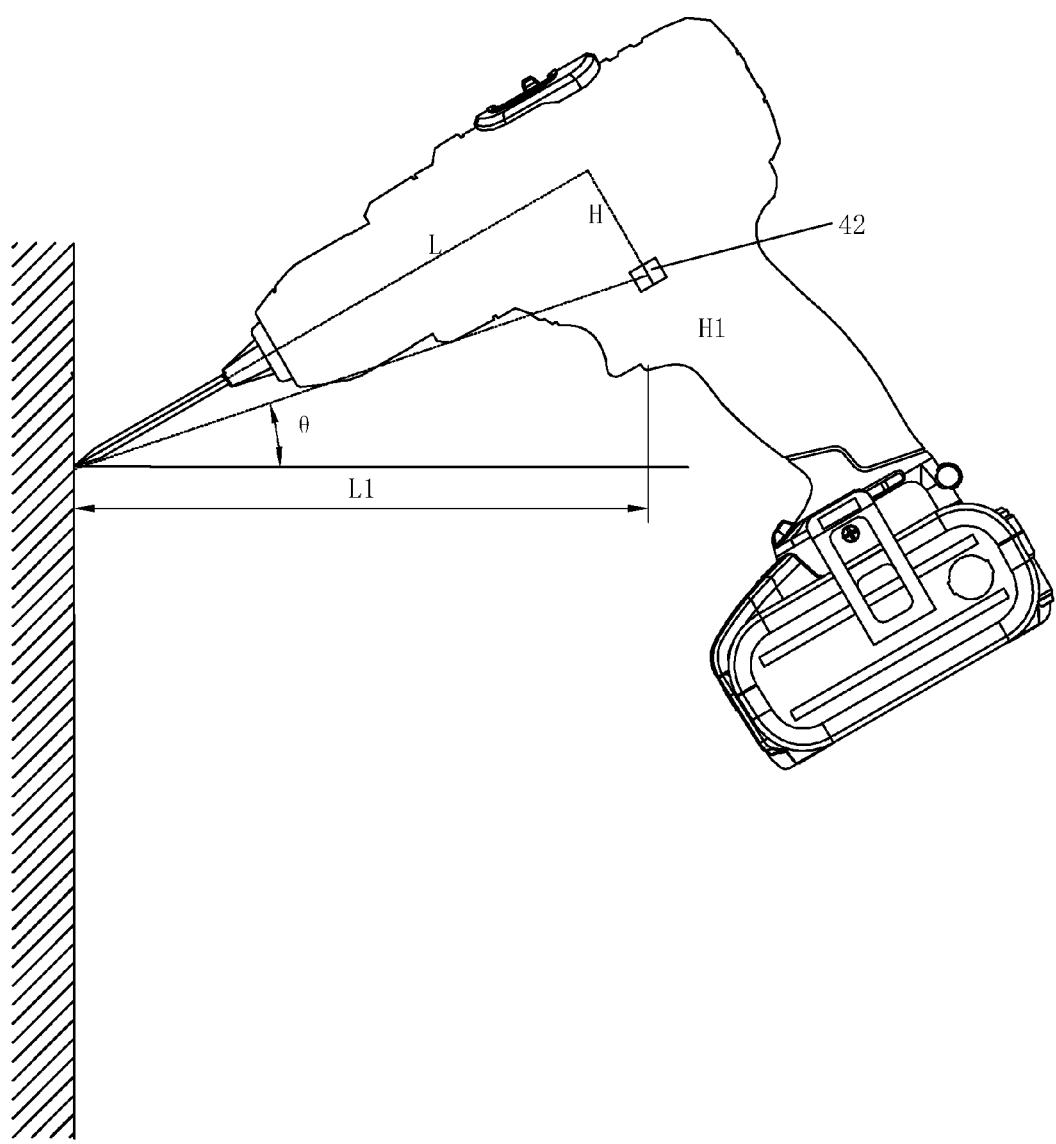
FIG. 4 is a schematic diagram of coordinate correction for the electric drill of FIG. 2 under a second working condition.

FIG. 4 is a schematic diagram of a method of coordinate correction for the drill bit relative to the inertial sensor when the electric drill tilts. At this point, the coordinates of the drill bit are (x0, y0−L1, z0−H1).

Moreover, $$L1 = \sqrt{(L^2+H^2)} \cos \theta$$

$$H1 = \sqrt{(L^2+H^2)} \sin \theta$$

where θ may be acquired by the sensor, and L and H are mounting data on the sensor itself and are unchanged by default. However, drill bits with different lengths may need to be changed in actual use. In order to better correct the coordinates of the drill bit, a ranging module may also be mounted on the electric drill.

Figure 5:
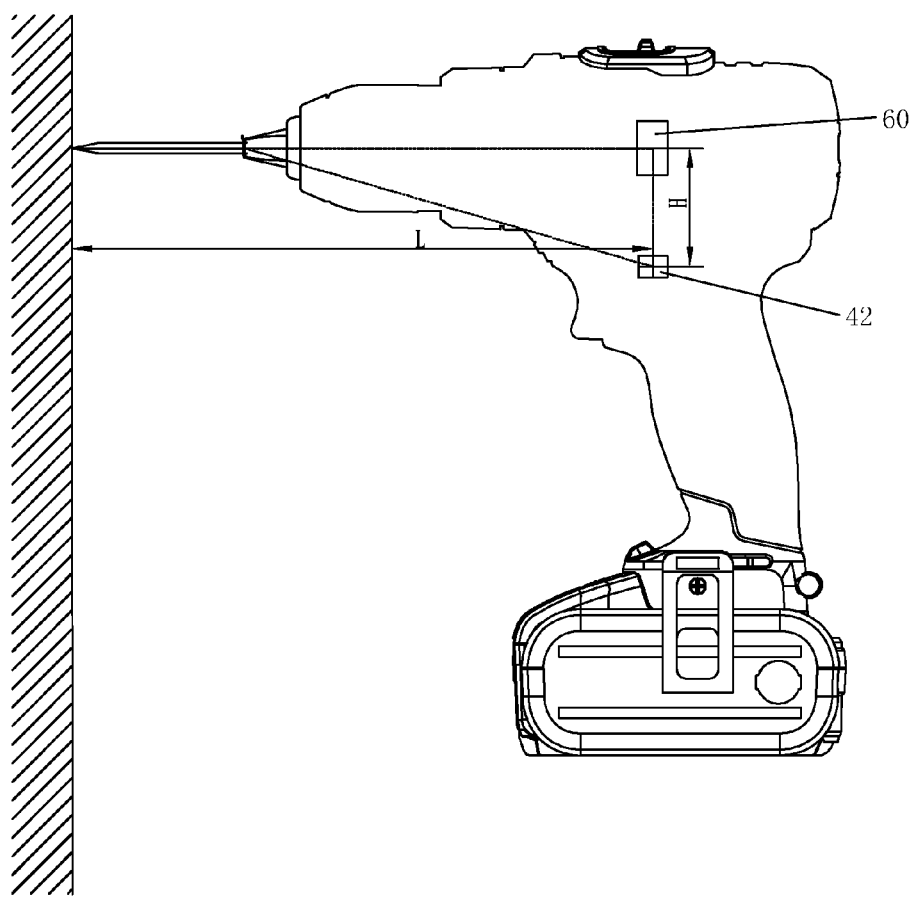
FIG. 5 is a schematic diagram of coordinate correction for the electric drill of FIG. 2 by providing a ranging module.

As shown in FIG. 5, FIG. 5 is a schematic diagram of coordinate correction for the electric drill by providing a ranging module. A required parameter L is detected by, for example, laser ranging, ultrasonic ranging, infrared ranging, etc. In addition, the parameter L may also be input manually or may be acquired automatically by selecting one of standard working heads set through the system.

Based on the difference in hardware constitution of the ranging and positioning apparatus, work flows of continuously punching by the electric drill through the ranging and positioning apparatus are also different and will be described below in detail. A first ranging and positioning apparatus includes an inertial sensor, a controller, a positioning mode key, and a display screen, and determines a punching position under a human-assisted determining mode.

Figure 6:
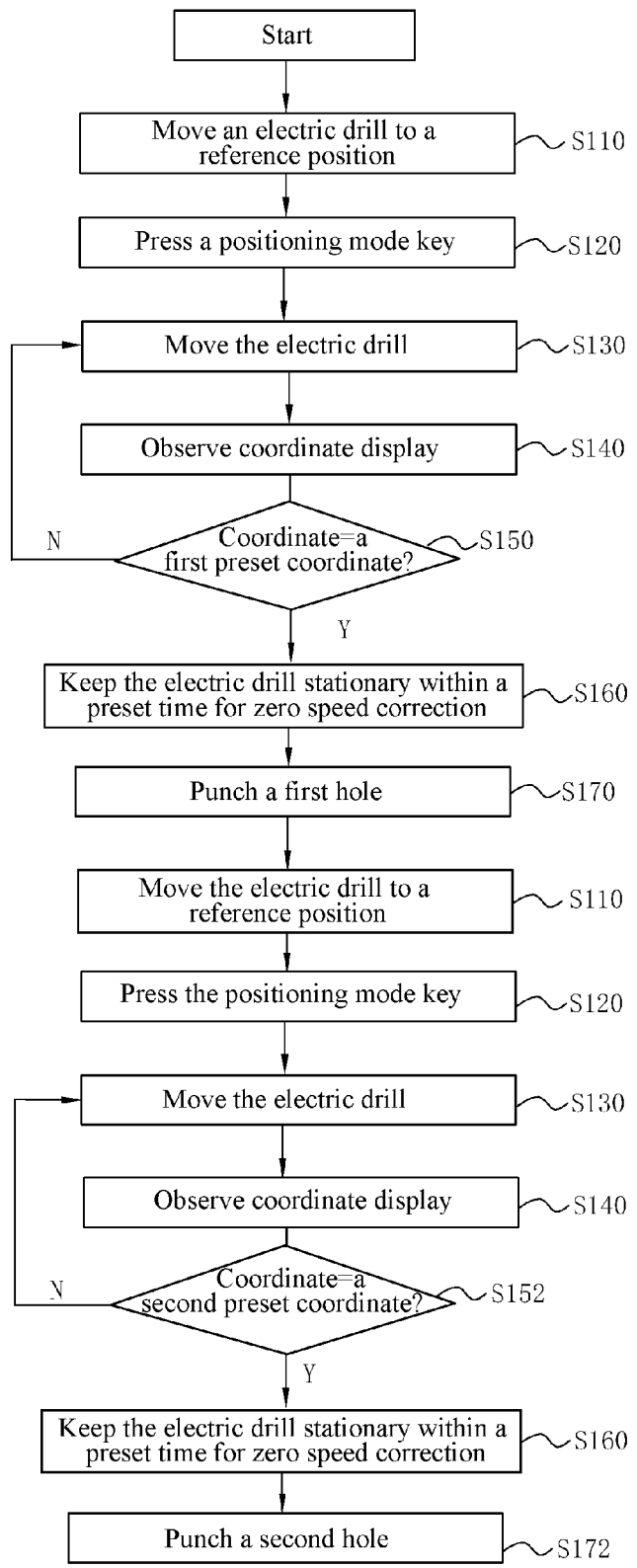
FIG. 6 is a flowchart of punching, by using the electric drill of FIG. 2, a first hole and a second hole under a human-assisted determining mode by taking a reference position as a benchmark.

As shown in FIG. 6, FIG. 6 is a flowchart of punching a first hole and a second hole by the electric drill under the human-assisted determining mode by taking a reference position as a benchmark, specifically including: step S110, the user holding the electric drill and moving the electric drill to an initial position, that is, a reference position. The position in which a tail end of the drill bit contacts the working plane is defined as the reference position, that is, the origin coordinate of the working plane, and at this point, the drill bit needs to abut against the working plane (such as a wall). Step S120, pressing a positioning mode key so as to record the reference position; if the positioning mode key simultaneously triggers the powering on and coordinate clearing for the detecting system, powering on and initiating the detecting module, clearing coordinates, and recording an attitude of the electric drill; and if the detecting system has been in a power-on state, merely clearing the coordinates and recording the attitude of the electric drill. Step S130, next, the user moving the electric drill, the display screen displaying a real-time position, which is relative to the origin coordinate of the reference position, and calculating a real-time relative position of the electric drill bit via an algorithm by using sensor data. Step S140, observing coordinate display. Step S150, the user determining, based on ranging coordinate values on the display screen, whether the electric drill is moved to a predetermined punching point. Step S160, if the electric drill reaches the predetermined point, the electric drill stopping moving and remaining stationary within a preset time for zero speed correction. Performing error control through zero speed correction is low-cost and effective and may also achieve a more accurate detection effect. Here, remaining the electric drill stationary is merely one of the ways to trigger zero speed correction. Other ways may also be used, for example, triggering the positioning mode key again, which indicates that the electric drill is considered to have reached the predetermined position. Or, by detecting the contact or force of the top of the drill bit on the working plane so as to indicate that the electric drill reaches the predetermined position, these conditions may also achieved, and zero speed correction starts. Step S170, the user punching a first hole after the electric drill reaches a predetermined position. Certainly, the detection may also be stopped, that is, the ranging and positioning apparatus is powered off, which is not necessarily considering energy saving and detection error reduction. When a next punching operation is to be implemented, an optional way relates to performing step S110 again, of moving the electric drill to the original reference position; performing step S120 of pressing a positioning mode key so as to record the reference position; performing step S130 of moving the electric drill; performing step S140 of observing coordinate display; performing step S152 of the user determining, based on observed ranging coordinate values on the display screen, whether the electric drill is moved to a second preset coordinate, that is, a second predetermined punching point, and if the electric drill reaches the predetermined point, performing step S160 of the electric drill stopping moving and remaining stationary within a preset time for zero speed correction; and then, performing step S172 of punching a second hole in a second hole position.

Figure 7:
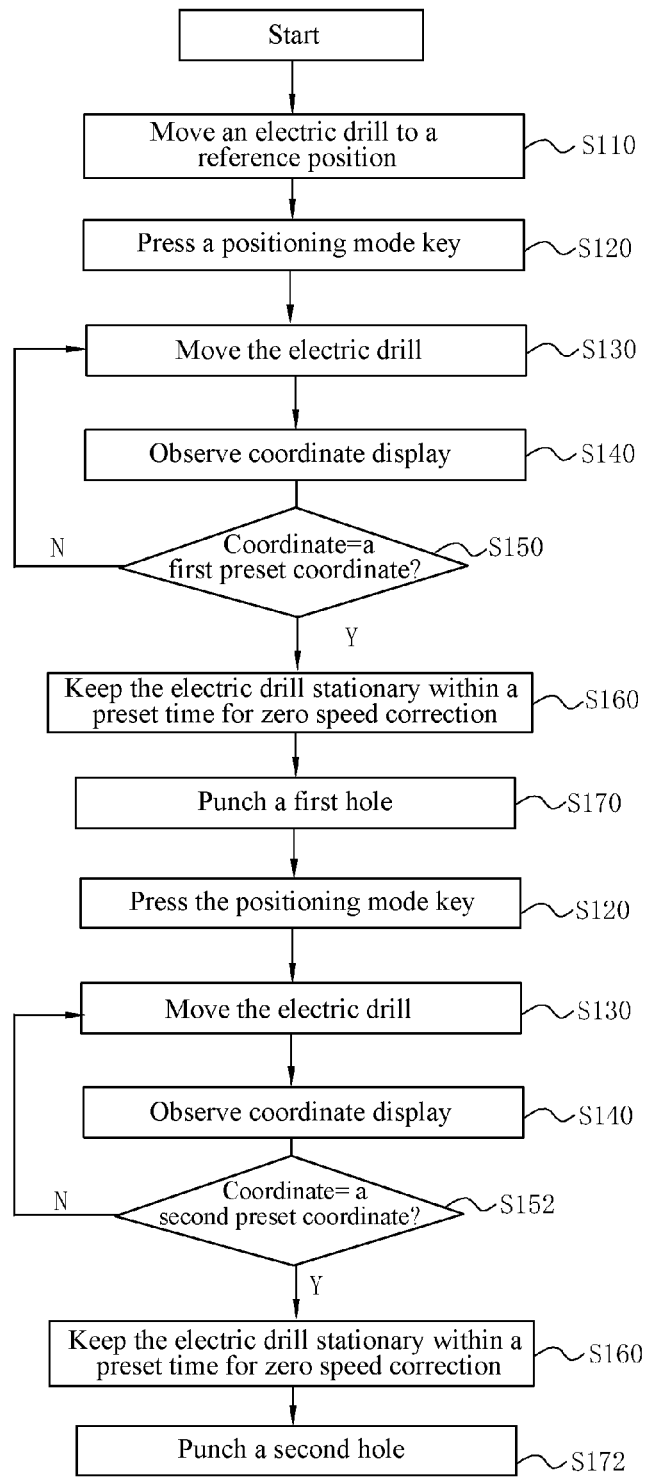
FIG. 7 is a flowchart of punching, by using the electric drill of FIG. 2, a first hole by taking a reference position as a benchmark and a second hole by taking a first hole position as a benchmark, under the human-assisted determining mode.

Referring to FIG. 7, FIG. 7 is another alternative punching operation mode. It differs from the previous flow of punching a first hole and a second hole by the electric drill under the human-assisted determining mode by taking a reference position as a benchmark in: taking the first punching position as the reference position, that is to say, after step S170, namely, after completing punching the first hole, performing step S120 of pressing a positioning mode key in this hole position so as to record the reference position, and then, repeating operation steps of S130 to S172 in the previous flow. The positioning and punching steps may be repeated, so that a plurality of holes may be punched efficiently and continuously on the working plane.

Figure 8:
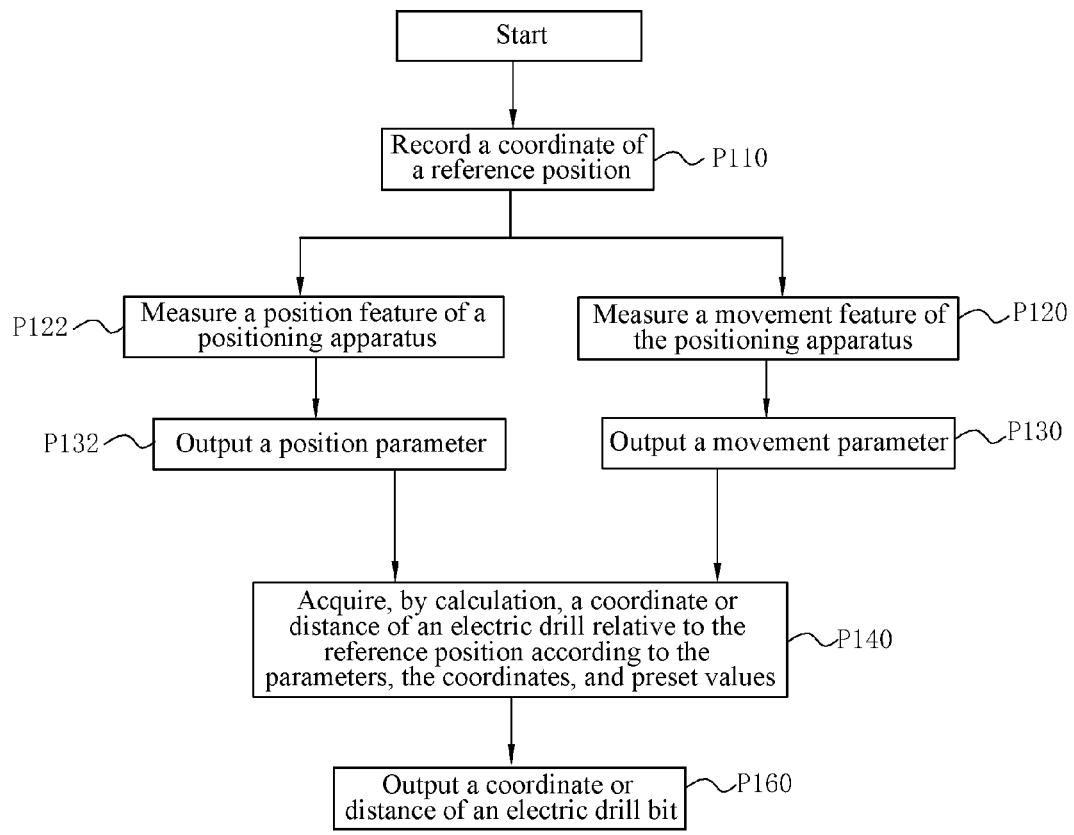
FIG. 8 is a working flowchart of a ranging and positioning apparatus when the electric drill of FIG. 2 is under a human-assisted determining mode.

Referring to FIG. 8, a work flow of performing positioning detection by the ranging and positioning apparatus includes the following steps: when the user presses the positioning mode key, the controller of the ranging and positioning apparatus performing the following operations: step P110, recording a coordinate of a reference position; and when the user moves the electric drill, the inertial sensor performing the following operations respectively: step P120, measure a movement feature of the positioning apparatus in real time, and step P130, outputting a movement parameter; simultaneously performing step P122 of measure a position feature of the positioning apparatus in real time, and step P132 of outputting a position parameter; performing step P140, the controller acquiring a coordinate or distance of the electric drill bit relative to the reference position by calculation via an algorithm based on the recorded coordinate of the reference position, the detected position and movement parameters, and a preset distance between the electric drill bit and the positioning apparatus, that is, correcting the coordinate of the positioning apparatus to be the coordinate or distance of the electric drill bit; and finally, performing step P160 of outputting the coordinate or distance on the display screen, which is a current coordinate or distance of the electric drill bit after correction.

Another alternative ranging and positioning apparatus includes an inertial sensor, a controller, a positioning mode key, a display screen, an input unit, and a prompt module. If the input unit here is an input panel arranged on the housing for the user to input coordinates, for example, a built-in keyboard of the electric drill, data is input directly. The user may identify the punching position by using an intelligent determining mode.

Figure 9:
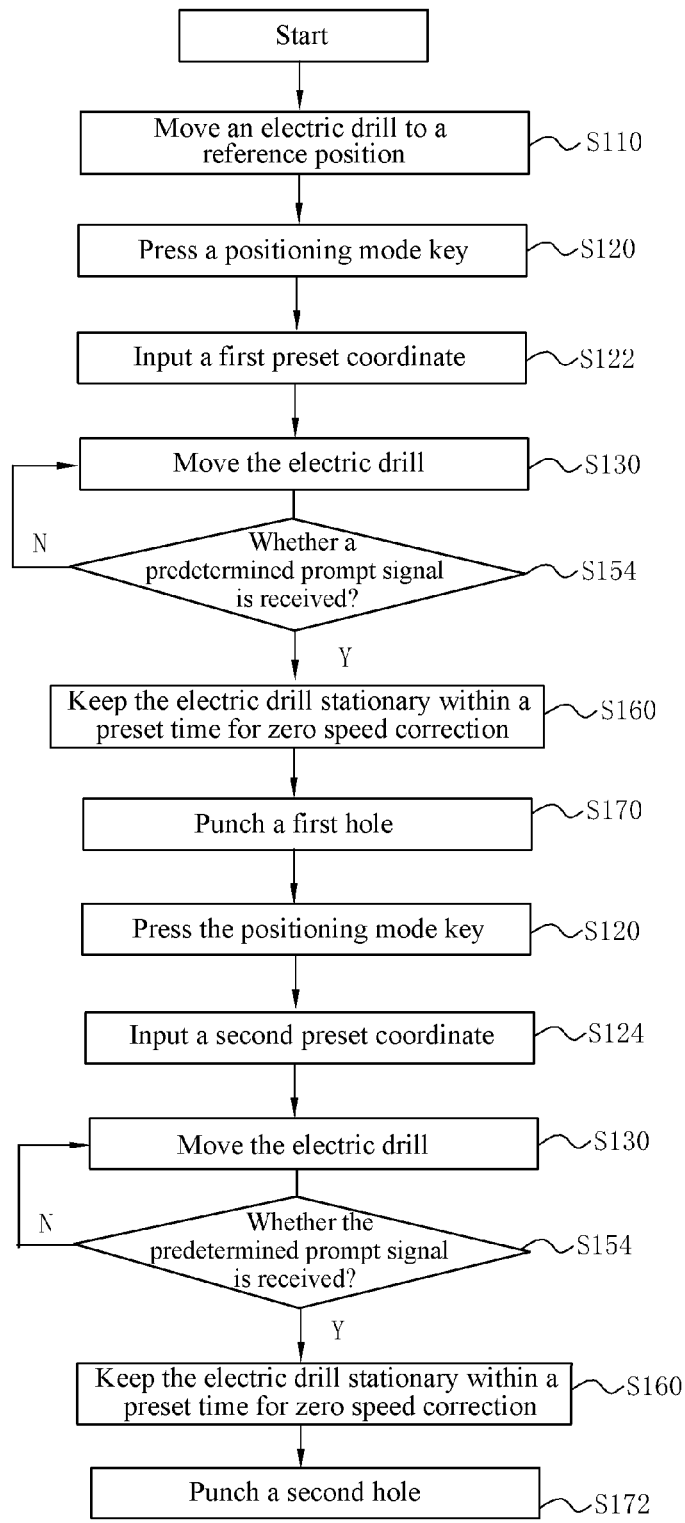
FIG. 9 is a flowchart of punching, by using the electric drill of FIG. 2, a first hole and a second hole under an intelligent determining mode by inputting a preset working coordinate.

Referring to FIG. 9, FIG. 9 shows a flow of punching a first hole and a second hole by the electric drill under the intelligent determining mode by inputting a preset working coordinate, specifically including: step S110, the user holding the electric drill and moving the electric drill to a reference position; step S120, pressing a positioning mode key so as to record an attitude of the electric drill and perform coordinate clearing; and step S122, inputting data on a first punching point relative to the origin coordinate through the input module, that is, inputting a first preset coordinate, for example, inputting information such as 15 centimeters right and 10 centimeters upward, so that predetermined position information M (15, 10, 0, angle) may be generated. Next, performing step S130: the user moving the electric drill; the processor acquiring a real-time position m of the drill bit by using inertial device data; displaying a real-time coordinate on the display screen; the controller comparing the real-time coordinate with the input coordinate of the drill bit; and when the real-time coordinate is equal to the input coordinate, the user being indicated with a signal through lighting of an LED lamp of the display screen or sound production of a buzzer. Step S154, determining whether a preset prompt signal is received. If it is observed that the LED lamp is lit up or it is heard that the buzzer produces a sound, it indicates that the electric drill has been moved to a predetermined punching position. Step S160, the electric drill stopping moving and remaining stationary within a preset time for zero speed correction. Step S170, the user punching a first hole. When a second hole needs to be punched, if the height and distance of a next hole are equal to the height and distance of the previous hole, there is no need to input the height and the distance again, and if they are different, data may be re-input or data of all predetermined points of punching may be input at one time. Step S120, pressing the positioning mode key by taking the first hole as a benchmark; step S130, moving the electric drill again; repeating step S154 and step S160 again; and finally, performing step S172 of punching a second hole in a second preset predetermined position, and so on.

Figure 10:
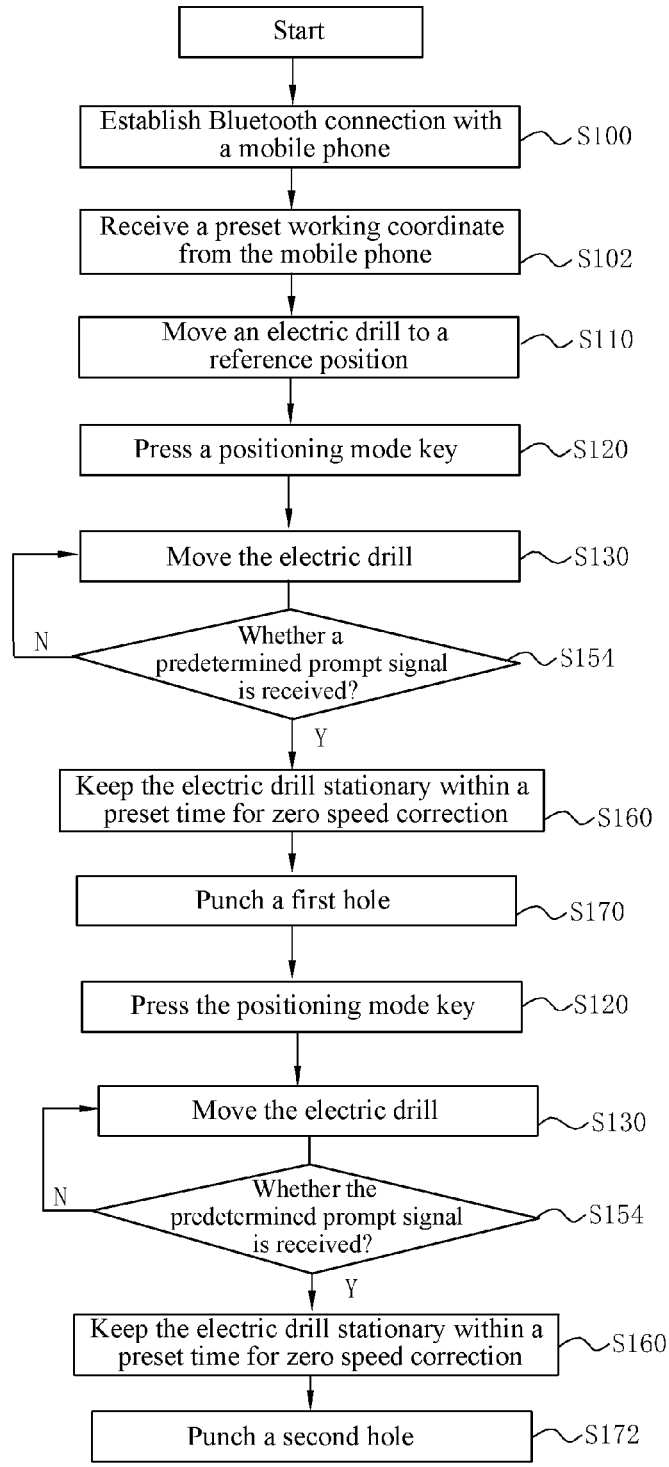
FIG. 10 is a flowchart of punching, by using the electric drill of FIG. 2, a first hole and a second hole under an intelligent determining mode by receiving a preset working coordinate from a mobile phone.

Referring to FIG. 10, FIG. 10 is a flowchart of punching a first hole and a second hole by the electric drill under the intelligent determining mode by receiving a preset working coordinate from a mobile phone. The differences from the flow shown in FIG. 9 lie in: establishing communication connection with the electric drill through an external mobile apparatus, for example, a smart phone; inputting a series of preset coordinates or data of a next punching point relative to the origin coordinate into the mobile apparatus, so that the ranging and positioning apparatus of the electric drill receives a preset working coordinate from the mobile phone, and the input module on the ranging and positioning apparatus being preferably a Bluetooth communication module. Specific working steps include: step S100, establishing Bluetooth connection with the mobile phone; step S102, receiving a preset working coordinate from the mobile phone, where the preset working coordinate may include a series of coordinates, that is, coordinates of a plurality of consecutive punching positions; step S110, moving an electric drill to a reference position; step S120, pressing a positioning mode key; step S130, moving the electric drill; step S154, determining whether a preset prompt signal is received, where if it is observed that the LED lamp is lit up or it is heard that the buzzer produces a sound, it indicates that the electric drill has been moved to a predetermined punching position; step S160, the electric drill stopping moving and remaining stationary within a preset time for zero speed correction; and step S170, the user punching a first hole. If a second hole is to be punched, performing step S120 of pressing the positioning mode key by taking the first hole as a benchmark; performing step S130 of moving the electric drill again; repeating step S154 and step S160 again; and finally, performing step S172 of punching a second hole in a second preset predetermined position, and so on.

Figure 11:
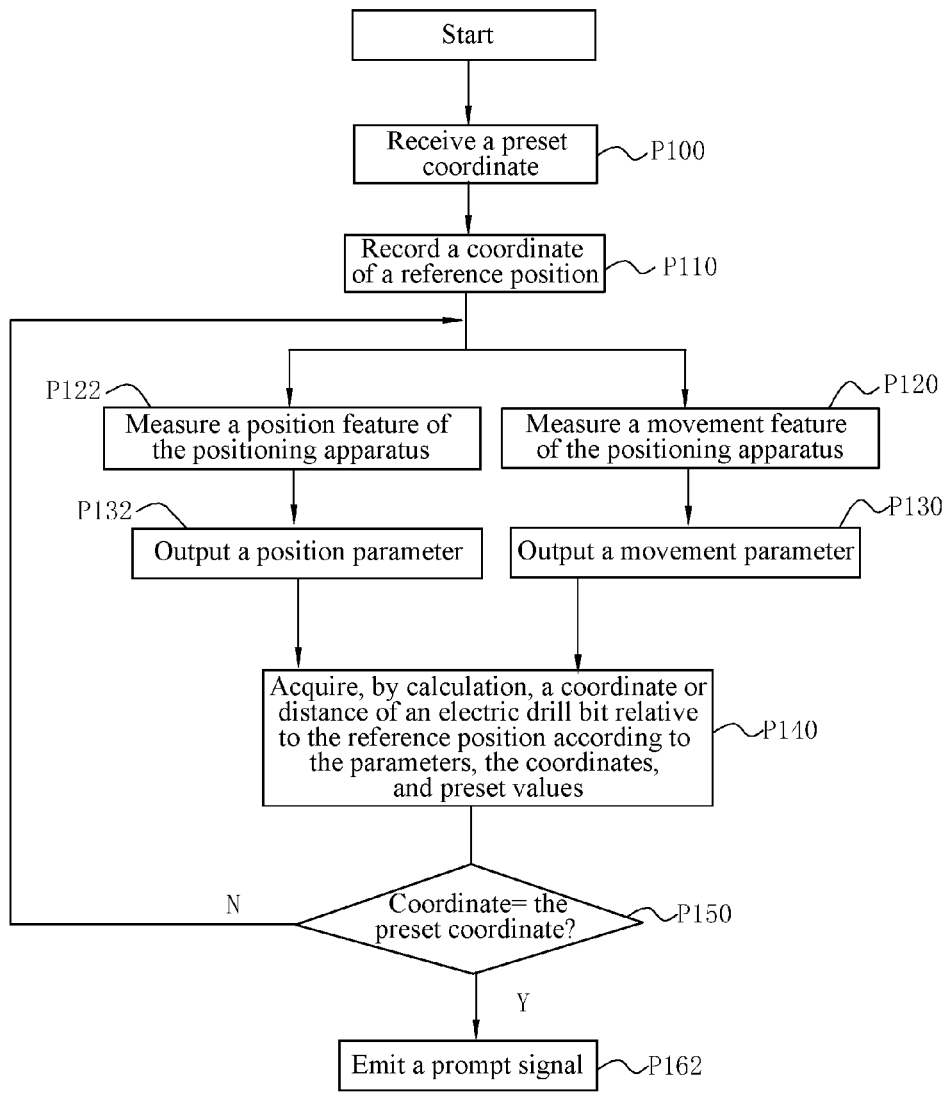
FIG. 11 is a working flowchart of a ranging and positioning apparatus when the electric drill of FIG. 2 is associated with an intelligent apparatus under an intelligent determining mode.

Referring to FIG. 11, detail description is made blow to a work flow of data processing by a controller of the ranging and positioning apparatus in the process of punching holes by the electric drill under the intelligent determining mode by receiving a preset working coordinate from a mobile phone. Step P100, the controller receiving a preset coordinate; when the electric drill is moved to a reference position and the positioning mode key is pressed, performing step P110 of recording a coordinate of a reference position; when the user moves the electric drill, the inertial sensor performing the following operations respectively: step P120, measure a movement feature of the positioning apparatus in real time; step P130, outputting a movement parameter; simultaneously performing step P122 of measure a position feature of the positioning apparatus in real time and step P132 of outputting a position parameter; performing step P140 of the controller acquiring a coordinate or distance of the electric drill bit relative to the reference position by calculation via an algorithm based on the recorded coordinate of the reference position, the detected position and movement parameters, and a preset distance between the electric drill bit and the positioning apparatus, that is, correcting the coordinate of the positioning apparatus to be the coordinate or distance of the electric drill bit; performing step P150 of the controller determining whether a current coordinate is equal to the preset coordinate; and when it is determined that the current coordinate is equal to the preset coordinate, performing step P162 of emitting a preset prompt signal which indicates that the electric drill has been moved in place.

Figure 12:
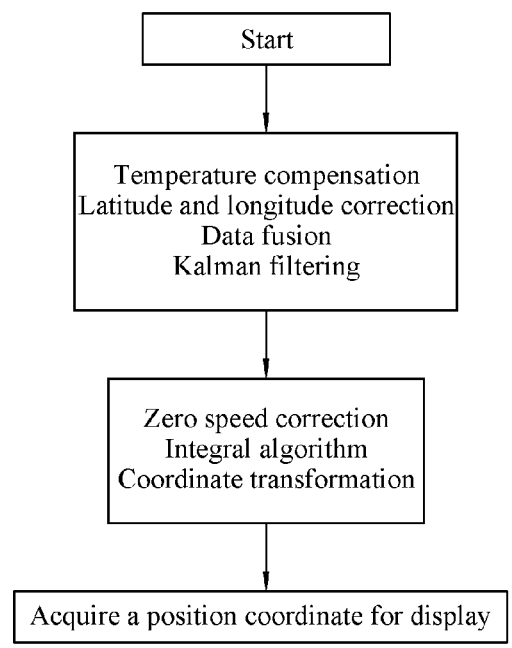
FIG. 12 is a schematic diagram of a control flow of a controller for a ranging and positioning apparatus of FIG. 2.

Referring to FIG. 12, once the positioning mode key is actuated, the controller receives an initiating signal and starts performing sensor data processing, that is, starts performing temperature compensation, gravity elimination, data fusion, Kalman filtering, etc.; next, coordinate correction is performed based on a position of the inertial sensor, that is, an actual coordinate of the sensor is corrected to a coordinate of the end portion of the drill bit; then, integral detection starts via an integral algorithm and/or a zero speed correction algorithm, which may effectively suppress positioning errors of the inertial navigation accumulated over time; and finally, a real-time coordinate is displayed through the display screen, and the ranging and positioning apparatus is powered off or the positioning mode key is actuated again.

Considering that the electric drills produced by manufacturers will be sold all over the world and the acceleration of gravity varies from place to place around the world, it is necessary to perform gravity elimination. The method of gravity elimination may be local latitude and longitude correction, or a gravity acceleration value in the inertial sensor may also be intelligently corrected based on position information in a mobile phone when the mobile phone communicates with the electric drill through Bluetooth.

In the process of data processing of the inertial sensor, in addition to gravity elimination, other processing is also needed, such as temperature compensation, data fusion, and Kalman filtering, thereby eliminating the influence of external factors on the inertial sensor as well as random interference, so that the detection of the inertial sensor is more precise.

In actual punching operations, in addition to a plurality of isometric holes on the same straight line, the user also needs to punch some holes with particular shapes for lines connecting the holes, such as a triangle, a quadrangle, and a pentagram. Therefore, all these particular shapes may be pre-stored in the ranging and positioning apparatus. In use, the user only needs to select a required shape, input numerical values of determining the size of the shape, such as the radius of a circumcircle, the length of side, and the angle of an inner angle, and determine a reference position. There are two ways to confirm whether the electric drill reaches a predetermined position. One way is similar to the above-mentioned determining a punching position with human assistance, that is, when the reference position is determined, the system may automatically generate coordinate positions of various predetermined points for the user to view, and the user only needs to determine whether real-time coordinate display is the same as a coordinate value of the predetermined point. The other way is similar to the above-mentioned determining the punching position in an intelligent manner, where the controller compares the real-time coordinate of the drill bit with a preset coordinate point generated by the system, and when the real-time coordinate of the drill bit and the preset coordinate point generated by the system are equal, the user is indicated, via the display screen, the buzzer, the LED lamp or the like, of having moved to the predetermined punching position.

A person skilled in the art would envisage that if the ranging and positioning apparatus is separated from the electric drill, the positioning apparatus may perform positioning on the working plane first independently, and then perform punching in a predetermined position by the electric drill. The ranging and positioning apparatus includes a positioning portion. The function of the positioning portion is equivalent to that of the electric drill bit. The positioning portion is used as a basis for ranging coordinate correction. The positioning portion is preferably arranged between the detecting module and the control module. The processing module displays a final coordinate of the positioning portion on the display screen in real time based on a preset distance between the detecting module and the positioning portion, or the coordinate of the positioning portion is used as a basis for the prompt device to send out prompt information. The positioning portion may preferably mark in a determined predetermined position so as to facilitate punching a hole in the predetermined position accurately by the electric drill.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

A Third Embodiment

Figure 13:
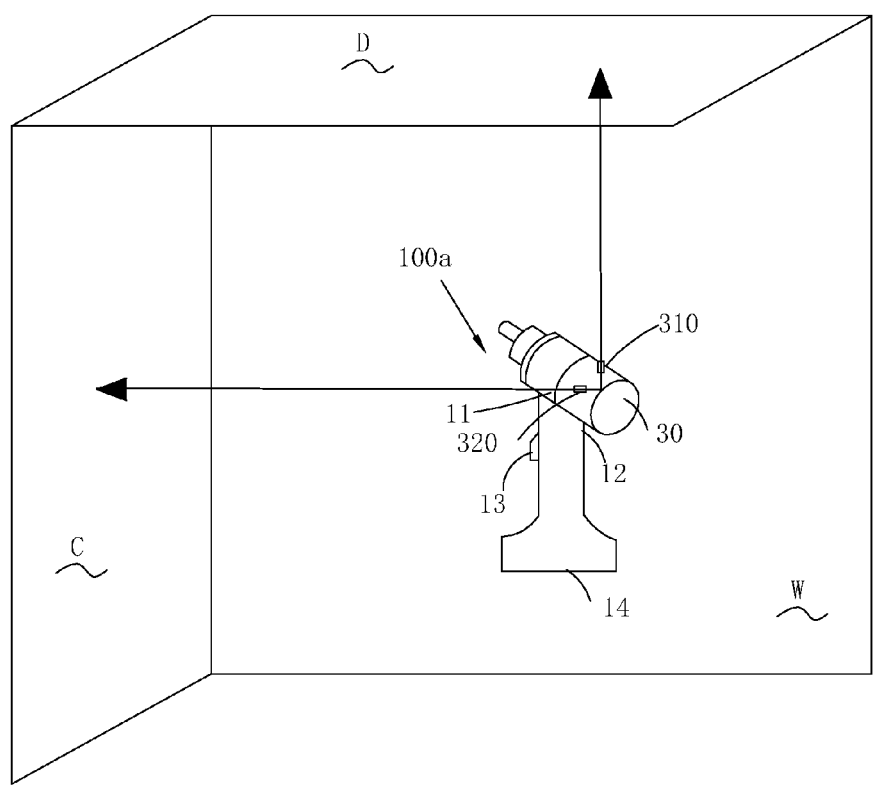
FIG. 13 is a schematic diagram of a working scenario of an electric drill in a third embodiment of the present invention.

Referring to FIG. 13, the ranging and positioning apparatus 30 of this embodiment is combined with the electric drill 100a into one. The electric drill 100a includes a body 11. The body 11 includes a main body portion and a handle 12 at an angle to the main body portion and providing a holding operation. The ranging and positioning apparatus 30 is mounted on the main body portion of the body 11. A power motor (not shown) is arranged on the body 11. The handle 12 includes a switch trigger 13 configured to control the motor. A tail end, extending along an axis, of the handle 12 is connected to a battery pack 14. The ranging and positioning apparatus 30 of the embodiments of the present invention is configured to be integrated into the body 11. A person skilled in the art would envisage that the ranging and positioning apparatus 30 may also be designed individually as a module, and then, detachably mounted on the body 11 in the form of an accessory.

The ranging and positioning apparatus 30 includes a detecting module, a control module, an input unit, and an output module. The detecting module includes a laser ranging unit 310. The ranging and positioning apparatus 30 of the embodiments of the present invention includes two laser ranging units 310, 320 arranged at a fixed angle. A first laser unit 310 and a second laser unit 320 are arranged at 90 degrees to each other. The laser ranging units 310, 320 each include a laser transmitter and a laser sensor that are connected to each other.

Figure 14:
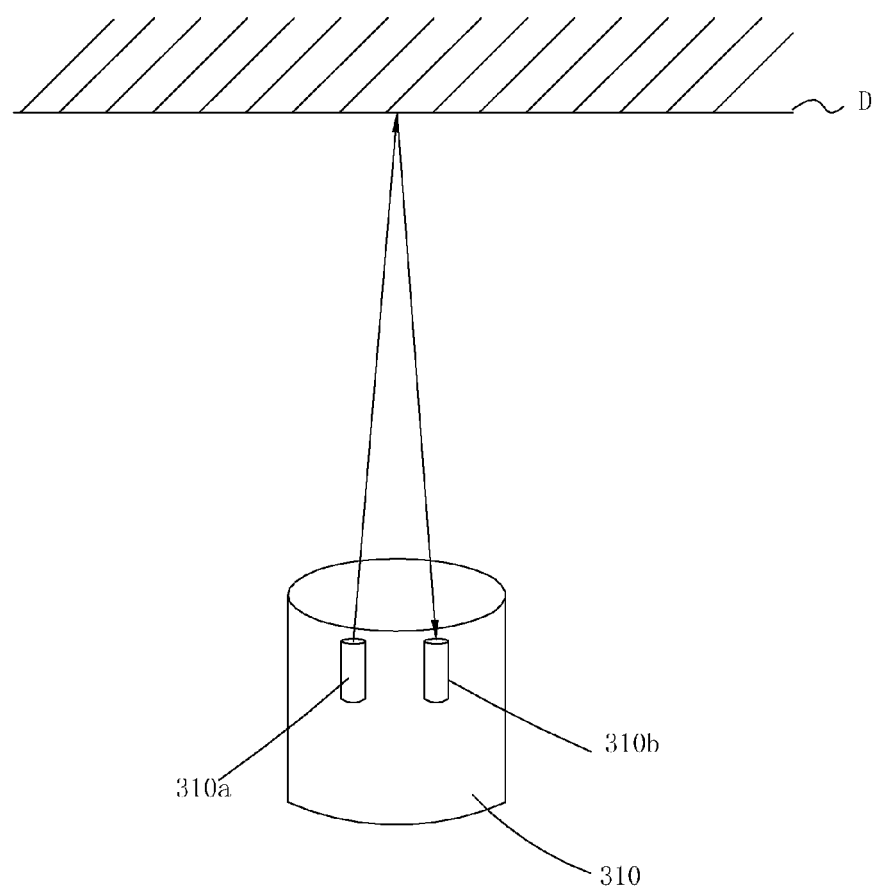
FIG. 14 is a schematic structural diagram of a laser ranging unit for the electric drill of FIG. 13.

Referring to FIG. 14, for the convenience of expression, in this embodiment, merely the first laser unit 310 is used as an example for description. The first laser unit 310 includes a first laser transmitter 310a and a first laser sensor 310b that are disposed in parallel and in close proximity to each other. The first laser transmitter 310a is configured to transmit a laser, and the first laser sensor 310b is configured to detect a linear distance between a transmission point of the first laser transmitter 310a and a reflection point of the laser transmitted therefrom on a reference plane D. The principle of ranging of the first laser sensor 310b is shown as follows: the laser transmitted from the first laser transmitter 310a and projected onto the reference plane D is sensible and received by the first laser sensor 310b after reflection, and the first laser sensor 310b acquires, by calculation, the total stroke S of the laser based on the velocity V at which the laser propagates in the air and the time T taken from the time when the laser starts transmitting to the time when the reflected laser is received. As different components of the same laser ranging unit, an included angle between the transmitted light of the laser transmitter and the reflected light received by the laser sensor is negligibly small, that is to say, a half of the total stroke S is the linear distance between the laser transmitted from the first laser transmitted 310a to the reflection point on the reference plane D, which may be detected by the first laser sensor 310a. The principle of detecting the structure of the second laser unit 320 is the same as that of the first laser unit 310. Since the first laser unit 310 and the second laser unit 320 are at 90 degrees, the first laser sensor 310b and a second laser sensor are also arranged at 90 degrees. An axis of the first laser unit 310 and an axis of the second laser unit 320 are located within a same plane, the axis of the output shaft of the electric drill 100a is perpendicular to the plane, and an intersection point of the axis of the first laser unit 310 and the axis of the second laser unit 320 is located on the axis of the output shaft of the electric drill.

The laser transmitted from the laser transmitter of this embodiment is a visible laser, and the laser may produce a visible reflection point after the laser reaches the reference plane, which is advantageous for the operator to determine the reference plane. In some other optional solutions, a laser for ranging may be selected as a non-visible laser however, in order to enable the operator to identify the reference plane, an assisted visible laser also needs to be provided.

A working plane W is configured to be a working object of the electric drill 100a. If the electric drill 100a needs to position and punch a row of horizontal holes on the working plane W, a top surface of the working plane W, for example, the ceiling or the canopy, may be selected as the reference plane D. Certainly, a bottom surface of the working plane W, for example, a flat ground, may also be selected as a reference plane. If the electric drill 100a needs to position and punch a row of vertical holes on the working plane W, a side surface of the working plane W may be selected as a reference plane C. During ranging and positioning, the first laser unit 310 is enabled to correspond to a first reference plane D and the second laser unit 320 is enabled to correspond to a second reference plane C. The first laser transmitter 310a transmits a laser towards the reference plane D, and a second laser transmitter 320a transmits a laser towards the reference plane C.

Since positions of the first laser unit 310 and the second laser unit 320 are relatively fixed, the first laser transmitter 310a and the second laser transmitter 320a simultaneously change deflection or rotation directions with the electric drill when the electric drill 100a is angularly deflected or rotated.

In another optional way, the first laser unit 310 and the second laser unit 320 are arranged into a whole and may be rotatable around an axis relative to the body 11. With such arrangements, the two laser ranging units 310, 320 may rotate together relative to the body 11 so as to facilitate determining the reference plane.

When the laser transmitted from the first laser transmitter 310a is projected onto the reference plane D, a reflection point may be formed on the reference plane D, and the first laser sensor 310b is configured to detect a linear distance between the first laser transmitter 310a and the reflection point of the laser transmitted therefrom to the reference plane D. Correspondingly, when a laser transmitted from the second laser transmitter 320a is projected onto the reference plane C, a reflection point may be formed on the reference plane C, and the second laser sensor 320b is configured to detect a linear distance between the laser transmitted from the second laser transmitter 320a to the reflection point on the reference plane C.

Figure 15:
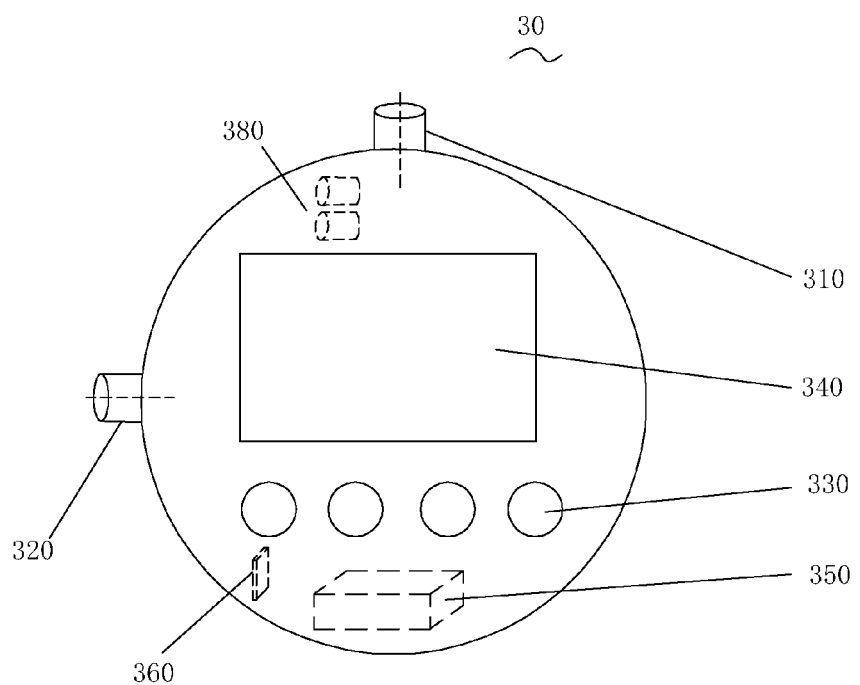
FIG. 15 is a schematic structural diagram of a ranging and positioning apparatus for the electric drill of FIG. 13.

Referring to FIG. 15, the detecting module further includes an inertial detection unit 350 for detecting an attitude angle of the electric drill 100a. The inertial detection unit 350 is arranged and mounted parallel with or perpendicular to the output axis of the electric drill 100a. Since being closely related, the laser ranging units 310, 320 and the inertial detection unit 350 may be arranged, as a whole, at a front end of the body 11 near the electric drill chuck or away from a rear end of the electric drill chuck of the body 11. With such arrangements, a mounting position of the ranging and positioning apparatus 30 on the body 11 may not overlap with the projection of the battery pack 14 at an end of the handle 12 onto the body 11, that is, they are staggered with each other in an axial direction, thereby preventing the lasers transmitted from the laser transmitter 310a, 320a towards the reference planes from the interference of the battery pack 14 or interference of the hand of the operator holding the handle 12.

The output module of this embodiment includes a display device 340. The ranging and positioning apparatus 30 further includes a mode selection unit configured to select a working mode. The working mode includes but not limited to horizontally isometric positioning, vertically isometric positioning, obliquely isometric positioning, triangularly isometric positioning, and non-isometric positioning. In a case of horizontally or vertically isometric positioning, inputting of a predetermined spacing value may be indicated on an operation interface of the user, without considering other parameters such as a moving direction. The mode selection unit of this embodiment is a mode selection key 330. The actuating unit is a positioning mode key 15. The ranging and positioning apparatus 30 is integrally arranged at the rear end of the body 11. The display device 340 is preferably arranged on a rear end face of the body 11 so as to facilitate the observation of the operator. The display device 340 of this embodiment of the present invention is a liquid crystal display screen, and parameters such as the attitude angle detected by the inertial detection unit 350 may be displayed on the liquid crystal display screen in the manner of digital display. The control module 360 includes a microprocessor (MCU).

Figure 16:
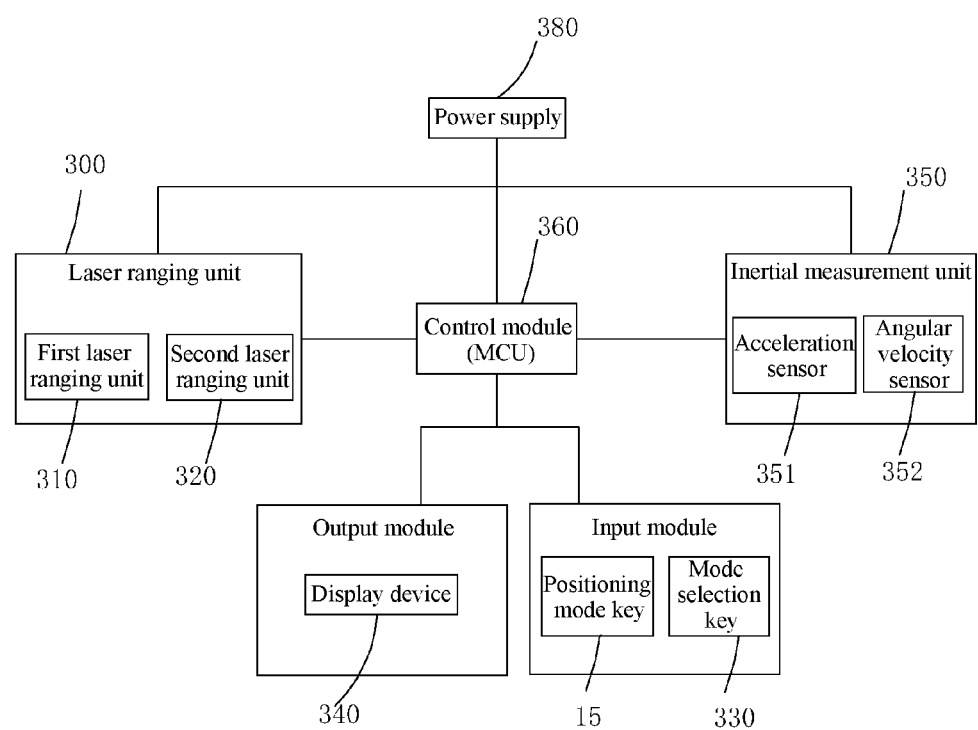
FIG. 16 is a schematic diagram of connection of various components of the ranging and positioning apparatus of FIG. 15.

Referring to FIG. 16, the control module 360 is electrically connected to the inertial detection unit 350 and the laser ranging unit 300 respectively. The control module 360 acquires, by calculation, a normal distance of the electric drill 100a from a corresponding reference plane based on the linear distance detected by the laser ranging unit 300 and the attitude angle detected by the inertial detection unit 350. The display device 340 is used configured to selectively display the attitude angle, the linear distance, the normal distance, and a preset normal distance. The mode selection key 330 is configured to select at least one working mode, and different working modes correspond to different working scenarios and resolve different technical problems correspondingly. Specifically, each working mode includes a method of processing the acquired normal distance by the control module 360 and a manner of prompting or displaying a comparison result of data obtained based on the processing method, and finally the prompting or the displaying is used as an operational guidance for adjusting a moving direction of the electric drill 100a. The mode selection key 330 is a key or a touch screen. The prompting manner may be a sound producing manner or an illuminating manner. The sound may be a voice and may also be a sound produced with a specific frequency. The illuminating may be lighting of an LED lamp or blinking with light. The displaying may be displayed on a display by means of a number or a symbol.

The inertial detection unit 350 of this embodiment includes an acceleration sensor 351 and an angular velocity sensor 352, where the acceleration sensor 351 is configured as a three-axis accelerometer and the angular velocity sensor 352 is configured as a three-axis gyroscope. The three-axis accelerometer is configured to detect the acceleration of a moving carrier in three directions, the three-axis gyroscope is configured to detect angular velocities of the moving carrier in three axial directions, and with the detected data processed via data fusion, two upper included angles of the electric drill 100a relative to a horizontal plane, that is, a roll angle and a pitch angle, as well as a rotation angle on the horizontal plane, that is, a heading angle, may be detected precisely, so that a horizontal benchmark may be provided based on tilted angles so as to calculate an included angle of a horizontal or vertical component on the working plane. The roll angle, the pitch angle, and the heading angle of the embodiments of the present invention all belong to attitude angles.

A power supply 380 may provide electric energy for electricity utilization components of the ranging and positioning apparatus 30. The power supply 380 may supply power to these working components and maintain for a certain working time when the ranging and positioning apparatus 30 may be separated from the electric drill 100a as an accessory. Certainly, a person skilled in the art would envisage that the battery pack 14 may serve as a power supply to supply power to the above electricity utilization components without providing a power supply additionally when various functional components of the ranging and positioning apparatus 30 are assembled into the electric drill 100a.

Figure 17:
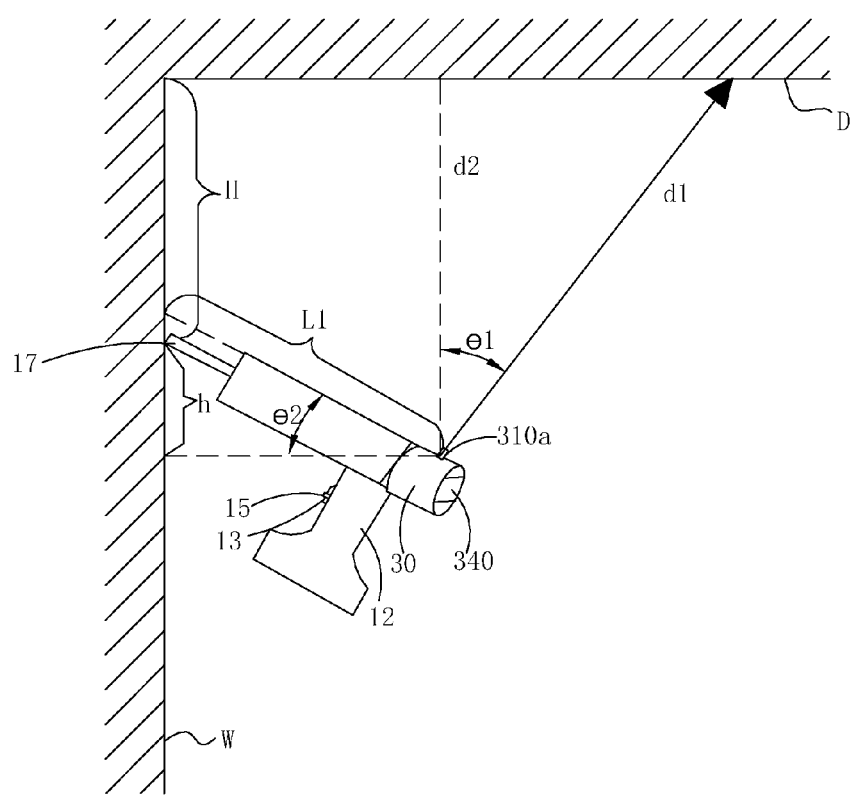
FIG. 17 is a schematic diagram of a working state of the electric drill of FIG. 13 in a first working scenario.

Referring to FIG. 13 and FIG. 17, FIG. 13 and FIG. 17 show a first working scenario in which the electric drill 100a punches holes on the working plane W. When the operator needs to punch, on the vertical working plane W, a plurality of holes located on the same horizontal line, a first working mode is selected firstly by operating the mode selection key 330. Under this working mode, a top surface D of the working plane W is selected as the reference plane, and the first laser unit 310 is involved in the ranging. Before punching, a reference point is set on the working plane W firstly. Specifically, the reference point may be selected on the working plane W based on the experience of the operator or a position of the reference point may be found and confirmed by using a normal distance from a free end of a drill bit 17 to the reference plane D, which is detected by using the first laser unit 310 and acquired by calculation by the control module 360, that is to say, the acquired normal distance is compared with a preset normal distance, and the position of the reference point is determined when the acquired normal distance is equal to the preset normal distance. Once the reference point has been selected or determined, the reference point needs to be recorded. Specifically, the drill bit 17 of the electric drill 100a is aligned with the reference point, and the positioning mode key is operated to record the reference point position.

The positioning mode key 15 of this embodiment is equivalent to a learning unit and is arranged adjacent to the trigger 13 of the handle 12. The operator may operate the positioning mode key 15 simultaneously with the hand holding the electric drill handle 12, so that the detected normal distance may be stored or recorded conveniently. The normal distance of the reference point from the reference plane D may be displayed on the display device 340 selectively as a parameter.

After the reference point is set, the electric drill 100a is moved in a horizontal direction. If the roll angle of the hand-held tool 100a is set to be 0 degree, the first laser transmitter 310a of the first laser unit 310 projects a laser towards the reference plane D, and the first laser sensor 310b is configured to detect a linear distance d1 between the first laser transmitter 310a and a reflection point of the laser transmitted therefrom on the reference plane D. The attitude angle of the electric drill 100a relative to a vertical plane in this position, that is, a pitch angle $\theta 1$, is detected and acquired by the three-axis accelerometer and the three-axis gyroscope. The control module 360 calculates and acquires a normal distance from the laser transmitter 310a to the reference plane D based on a set procedure based on the linear distance d1 and the corresponding attitude angle $\theta 1$, that is, $d2=d1* \cos \theta 1$. At this point, the tilted electric drill 100a also has a tilted angle $\theta 2$ relative to the horizontal plane, and the tilted angle $\theta 2$ and the attitude angle $\theta 1$ are corresponding angles. Therefore, the attitude angle $\theta 1$ is equal to the inclination angle $\theta 2$ in values. Since the distance L1 between the first laser transmitter 310a and the electric drill bit 17 is set or preset based on the specification of the drill bit, a distance may be acquired, by calculation, based on the tilted angle $\theta 2$ and the distance L1, that is, $h=\sin \theta 1*L1$, where the distance h is a normal distance between a horizontal projection point of the first laser transmitter 310a on the working plane W and a punching point of the electric drill bit on the working plane W.

Thus, the control module 360 acquires, by calculation, the normal distance from the free end of the drill bit 17 of the electric drill 100a to the top face D, that is, $H=d2-\sin \theta 1*L1$. The operator determines a first hole position on the working plane W after comparing the normal distance H with a preset normal distance, that is to say, when the normal distance H reaches the value of the preset normal distance, the position in which the free end, which abuts against the working plane, of the drill bit 17 is aligned with the working plane W is a first predetermined punching position, and the first predetermined position remains on the same horizontal line as the reference point.

During operation, the operation step of having to adjust the electric drill 100a to a horizontal position prior to a detection operation is omitted compared with the prior art. Determining the predetermined position is based on three calculations of the control module 360, that is, precise values corresponding to a detection result are acquired after data correction. A first calculation: acquiring, by calculation, the normal distance d2 based on the linear distance d1 from the laser ranging unit 310 to the reference plane D, which is detected by the first laser unit 310, and the attitude angle θ1 detected by the inertial detection unit 350; a second calculation: acquiring, by calculation, by the control module 360, the linear distance h from a point in which the laser ranging unit 310 projects onto the working plane W to the free end of the drill bit based on the linear distance L1 from the laser ranging unit 310 to the free end of the drill bit and the attitude angle θ1; and a third calculation: acquiring the normal distance from the free end of the drill bit to the reference plane D after calculating and comparing the normal distance d2 with the linear distance h, so that a coordinate position of the free end of the drill bit is acquired.

Thus, a first hole is punched in the first predetermined punching position. The electric drill 100a is then moved along the horizontal direction to find the second hole position. Without considering distances between various holes, as long as a current normal distance displayed by the display device 340 is equal to the recorded preset normal distance H, the position where the free end of the drill bit 17 is aligned with the working plane W is a second horizontal hole position, and a second hole is punched in the second hole position, and by analogy, a third hole, a fourth hole and the like may be punched. Under the first working mode, the reference plane D is selected, so that a row of horizontal holes that are parallel with the reference plane and having the normal distance H from the reference plane may be punched. Thus, real-time positioning is implemented through real-time detection by the laser ranging unit and the inertial detection unit, calculation and control by the control module, and display by the display device.

The ranging and positioning apparatus 30 of this embodiment further includes a reminding device (not shown). When the control module 360 determines that the current normal distance and the present normal distance H meet a preset condition, for example, the preset condition is that the current normal distance is equal to the preset normal distance H, the reminding device is controlled to emit a prompt signal. The prompt signal is a sound or light. If a sound is used as a prompt, it may be a sound or voice of a particular frequency. If light is used, it may be lighting up an LED lamp or blinking at a particular frequency of light. The prompt signal may assist the operator in determining whether the electric drill 100a is moved in place, thereby quickly determining a punching position. The current normal distance being equal to the preset normal distance H noted in this embodiment refers to that the absolute value of the difference between the current normal distance and the preset normal distance is less than or equal to a preset value. The preset value is an allowable precision error value. That is to say, when the electric drill 100a is moved to a certain position, the reminding device emits a prompt signal, which indicates that the operator has found the punching position. The precision error value in a corresponding working mode may be preset.

Certainly, the preset condition may also be set as the absolute value of the difference between the current normal distance and the preset normal distance H being greater than a preset value. The preset value here also refers to an allowable precision error value. That is to say, when the electric drill 100a does not reach or approach the punching position, the reminding device emits a prompt signal, so that the operator further moves the electric drill 100a. For example, when the electric drill 100a is farther from the punching position, the reminding device emits a high-frequency sound; when the electric drill is closer to the punching position, the reminding device emits a low-frequency sound; and when the electric drill reaches the punching position, the reminding device does not produce a sound. In this way, the operator may be guided to move the electric drill 100a in a certain direction, so that a second hole position, a third hole position, a fourth hole position and the like may be determined accurately and quickly. The prompt signal noted here is not limited to sounds with a different frequencies and may also be a prompt signal of a voice or the like.

The arrangement of the reminding device prevents the operator from acquiring information by observing numbers on the display constantly, thereby making operations more convenient and labor-saving. Certainly, for the first working mode, in fact, there is no need for the operator to know values of the preset normal distance and the current normal distance. Therefore, a parameter displayed by the display device 340 at this point is not necessary and may be selected to be ignored or closed. The operator only needs to know whether the position of the current electric drill 100a reaches a preset horizontal position relative to a preset reference punching position. Therefore, punching may be completed only if the reminding device emits a prompt signal.

In a second working scenario, the electric drill 100a is utilized to punch, on the working plane W, a plurality of holes located on the same vertical line. A second working mode may be set through the mode selection key, and a side surface C of the working plane W may be selected as a reference plane, in cooperation with the second laser unit 320. Under the second working mode, working manners of the second laser unit 320 and the inertial detection unit 350 as well as a calculation method of the control module 360 are the same as those under the first working mode. In specific operations, a preset reference point is determined on the working plane W firstly, that is, a first hole is punched in a preset punching position; the drill bit 17 of the electric drill 100a is positioned in the first hole, and at this point, the second laser transmitter 320a of the second laserunit 320 projects a laser towards the reference plane, and the second laser sensor 320b is configured to detect a linear distance between the second light transmitter 320a and a reflection point of the laser transmitted therefrom on the reference plane; and finally, a normal distance between the drill bit 17 of the electric drill 100a and the second reference plane C is acquired by the control module 360 by calculation. The normal distance of the acquired preset reference point is recorded as a preset normal distance of the electric drill 100a from the reference plane; the electric drill 100a is moved along the vertical direction to find a second hole position, so that when a normal distance of the second hole position from the second reference plane C is equal to the preset normal distance, the reminding device emits a prompt signal or, when the value of the normal distance value displayed on the display device is equal to the value of the preset normal distance, the second hole position is determined, and punching may be performed; and by analogy, a third hole position and a fourth hole position are determined. Thus, it is guaranteed that holes punched in the determined hole positions are located on the same vertical line.

Figure 18:
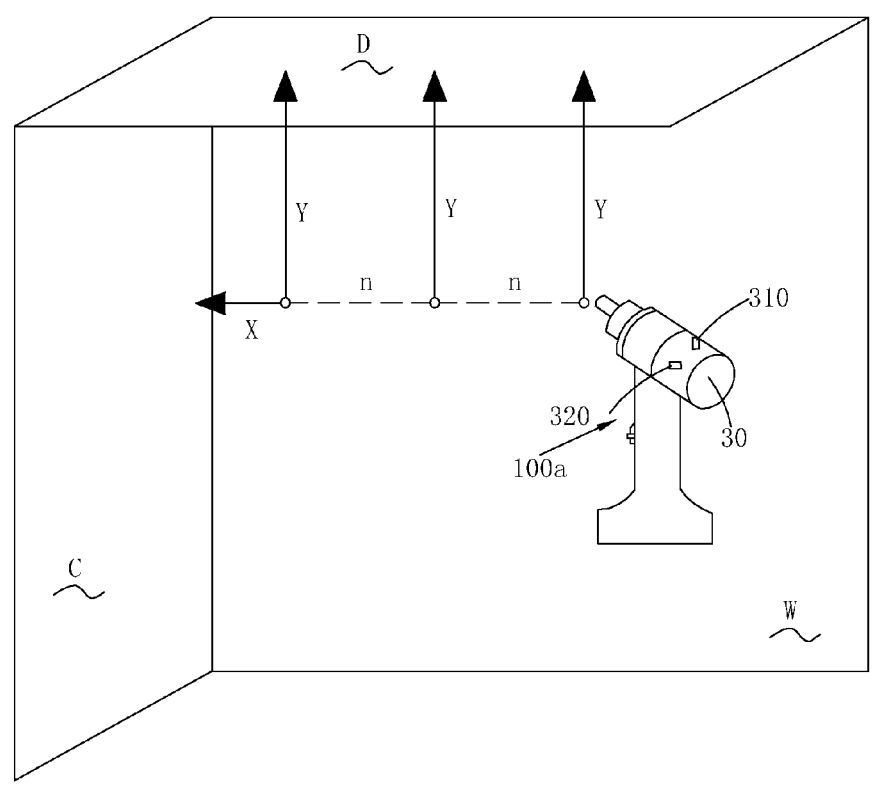
FIG. 18 is a schematic diagram of a working state of the electric drill of FIG. 13 in a third working scenario.

Referring to FIG. 18, in a third working scenario, the electric drill 100a is utilized to punch, on the working plane W, a plurality of holes that are located on the same vertical line and equally spaced. A third operating mode is selected through the mode selection key. Under the third working mode, the top surface D of the working plane W is selected as a first reference plane and the side surface C of the working plane W is selected as a second reference plane respectively, and the first laser unit 310 is utilized to correspond to the first reference plane and the second laser unit 320 is utilized to correspond to the second reference plane respectively. The first laser unit 310, the inertial detection unit 350, and the control module 360 working cooperatively so as to acquire a normal distance Y of the preset reference point from the first reference plane. The second laser unit 320, the inertial detection unit 350, and the control module 360 work cooperatively so as to acquire a normal distance X of the preset reference point from the second reference plane. Coordinate values (X, Y) of the preset reference point on the working plane W is recorded by operating the key. In order to punch, on the working plane W, a plurality of holes that are located on the same horizontal line and are equally spaced, as long as the value of the normal distance Y acquired by the drill bit 17 in a corresponding hole position keeps constant, the hole position may be guaranteed to be located on the same horizontal line as the preset reference point. During specific operations, the spacing between a second hole position and the first hole position is set firstly, that is, an increased preset distance n from the second hole position to a horizontal coordinate of the preset reference point is set, so that the preset normal distance may be X+n by manual input via the key; then, the electric drill 100a is moved along the horizontal direction, the control device 360 may compare the normal distance detected in real time and acquired by calculation thereby, and when the absolute value of the difference between the real-time detected normal distance and the preset normal distance X+n reaches a preset condition, the reminding device emits a prompt signal so as to assist the operator in finding the position where the distance from the first hole position is n; and then, the electric drill 100a is moved along an up-down direction, and the position where the normal distance from the first reference plane is Y is found based on the prompt signal emitted by the reminding device; and therefore, the second hole position is determined. With respect to finding a third hole position on the working plane W, the preset normal distance is X+n+n by manual input via the key, and then the third hole position is determined with reference to the above method. By analogy, a fourth hole position, a fifth hole position and the like are determined on the working plane W.

For the third working mode, another optional operation method is shown as follows: using a previous hole position as a benchmark before each hole is punched, and setting the real-time detected normal distance in the position, that is, the normal distance X from the second reference plane W, to be zero, so that coordinates of a benchmark hole position are (0, Y), that is to say, aligning the drill bit 17 of the electric drill 100a with a previous hole position, recording normal distances from two reference planes by the positioning mode key 15, and then, setting the normal distance X to be zero; inputting a preset normal distance n in the horizontal direction manually via the key; moving the electric drill 100a along the horizontal direction, and when the absolute value of the difference between the real-time detected normal distance and the preset normal distance n reaches a preset condition, the reminding device emitting a prompt signal; moving the electric drill 100a along an up-down direction, and finding, based on the prompt signal emitted by the reminding device, the position where a normal distance from the first reference plane is n, so that the second hole position is determined; and By analogy, a row of horizontally isometric holes are determined on the working plane W.

In a fourth working scenario, the electric drill 100a is utilized to punch, on the working plane W, a plurality of isometric holes located on the same vertical line. The fourth working mode is selected through the mode selection key. A specific operation method is similar to that of the third working mode, that is, the first laser unit 310 is utilized to correspond to the first reference plane D and the second laser unit 320 is utilized to correspond to the second reference plane C. The difference lies in that after the coordinate values (X, Y) of the preset reference point on the working plane W are recorded, the value of the normal distance X acquired by the drill bit 17 in a corresponding hole position is kept constant, so that the hole position may be guaranteed to be located on the same vertical line as the preset reference point and with regard to the setting of equal spacing between various vertical holes, reference can be made to the method in the third mode. In order to set a new hole position, the spacing between holes is manually input firstly, that is, a preset normal distance is set to be Y+n, then the electric drill 100a is moved to determine a hole position, and the normal distance is increased successively by Y+n+n and the like with the increase of the number of hole positions. Another method is shown as follows: firstly returning at least one coordinate in the coordinate values (X,Y) of the preset reference point on the working plane W, that is, the vertical coordinate, to zero; setting the coordinates of the preset reference point are (X, 0); inputting a preset normal distance n in the vertical direction manually through the key; moving the electric drill 100a along the vertical direction; when the absolute value of the difference between the real-time detected normal distance and the preset normal distance n reaches a preset condition, the reminding device emitting a prompt signal; and then, moving the electric drill 100a along the horizontal direction, and finding, based on the prompt signal emitted by the reminding device, the position where a normal distance from the second reference plane is X, so that the second hole position is determined. By analogy, a row of vertically isometric holes are determined on the working plane W.

Figure 19:
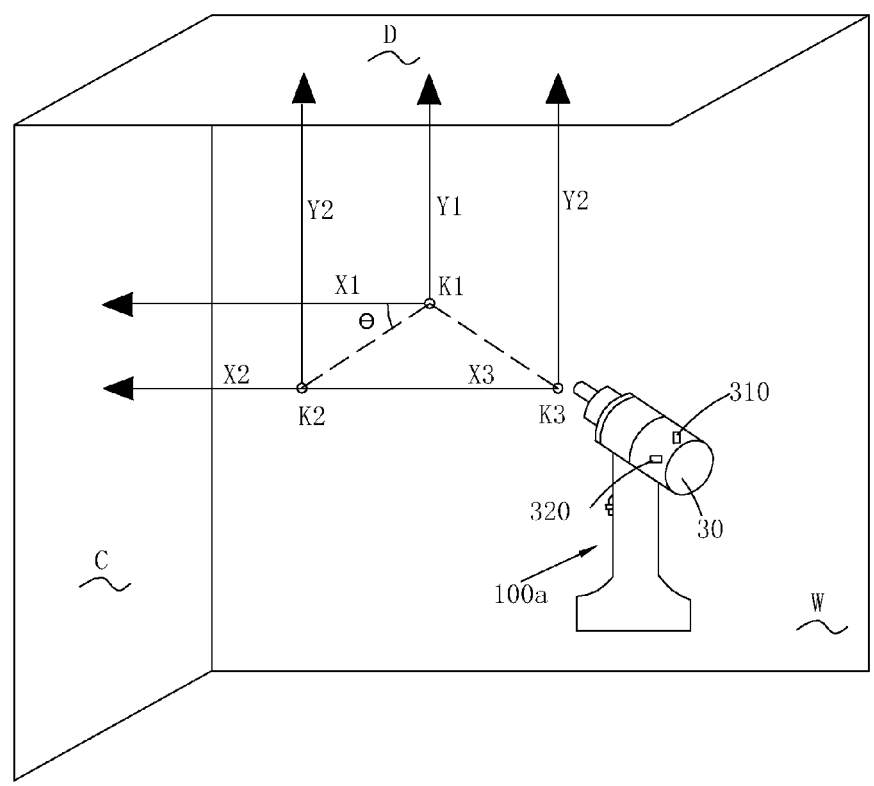
FIG. 19 is a schematic diagram of a working state of the electric drill of FIG. 13 in a fifth working scenario.

Referring to FIG. 19, in a fifth working scenario, holes may be punched on the working plane W by using the electric drill 100a, so that lines connecting the holes are of particular geometric shapes, such as a triangle, a quadrangle, and a pentagram. In this embodiment, the event that lines connecting the holes are oblique lines at certain angles to the horizontal line or the vertical line is used as an example for description. A fifth working mode is selected through the mode selection key. The first laser unit 310 is utilized to correspond to the first reference plane D and the second laser unit 320 is utilized to correspond to the second reference plane C. Firstly, a preset hole position K1 is determined, and there are different operation methods based on precision requirements for the preset hole position K1. If there are certain spatial size requirements for the preset hole position K1, the electric drill 100a can be moved, and normal distances currently detected in real time from the first reference plane D and the second reference plane C may be displayed by using the display device 340 and compared with a corresponding preset normal distance, so as to determine the preset hole position K1. If there is no precise requirement for the preset hole position K1, the first preset hole position K1 may be determined on the working plane W based on the experience of the operator.

A second hole is then determined via the following operation steps based on the determined first hole position K1. For example, in order to enable the included angle θ between a line connecting a second hole position K2 with the preset hole position K1 and the horizontal line to be 30 degrees, the difference between a normal distance Y2 of the second hole position K2 from the first reference plane D and the normal distance from the preset hole position K1 is +1 m. The operator firstly records a normal distance of the preset hole position K1 from a corresponding reference plane through the key, that is, coordinate values (X1, Y1), the electric drill 100a to the second hole position K2, and the control module 360 acquires the real-time detected normal distance (X2, Y2) by calculation, and thus acquires the value of the angle θ by second calculation based on the formula tan θ=Y2−Y1/X2−X1, where θ is the included angle between a line connecting the second hole with the preset hole position and the horizontal line. The operator may determine, based on the angle θ calculated through the control module 360 in real time and displayed on the display apparatus 340 in combination with the normal distance Y1+1 m displayed in real time, whether the electric drill has been moved to a predetermined second hole position K2.

In another alternative solution, based on the determined first hole position K1, the operator firstly records a normal distance of the first hole position K1 from a corresponding reference plane through the key, that is, coordinate values (X1, Y1), manually inputs the angle θ relative to the horizontal line, which is equal to 30 degrees, and the difference between a normal distance Y2 of a second hole position K2 and the normal distance of the preset hole position K1, which is +1 m, moves the electric drill 100 and determines that the drill bit 17 of the electric drill 100a reaches the second hole position K2 when the control module determines that the preset normal distance and a preset angle meet a preset condition, and the reminding device emits a prompt signal.

In the same way, a third hole position K3 is determined on the working plane W, the third hole position K3 and the second hole position K2 are arranged symmetrically relative to the first hole position K1, and when the three hole positions K1, K2, and K3 are sequentially connected to form an equilateral triangle, the hole positions determined on the working plane W under this working mode are suitable for picture hanging and other purposes. Certainly, a person skilled in the art would envisage that holes arranged in different forms may be punched under the working mode so as to suitable for other purposes.

Figure 20:
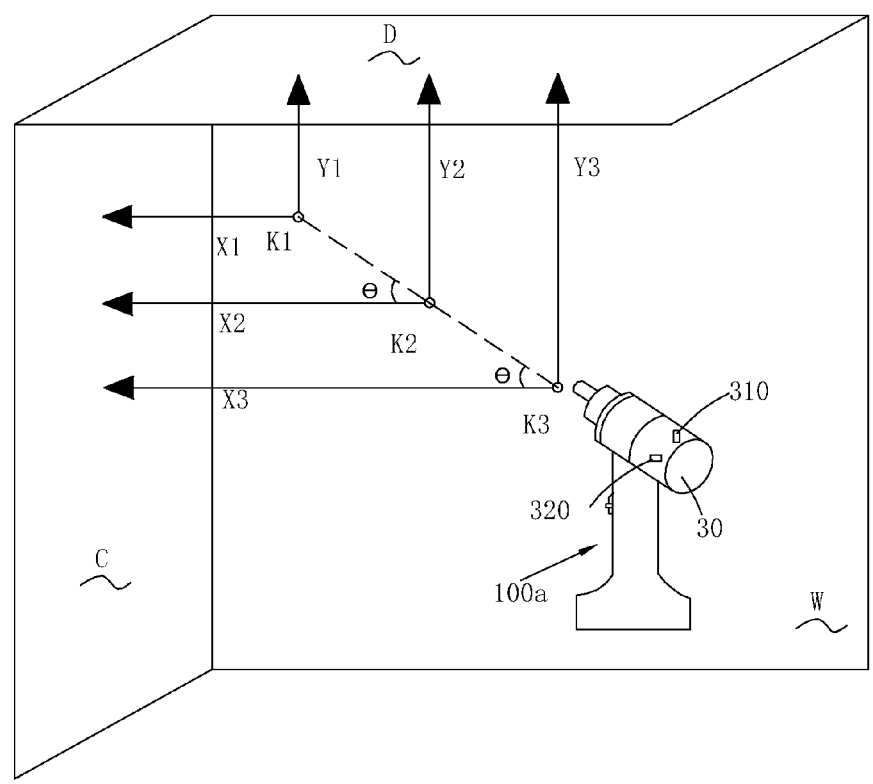
FIG. 20 is a schematic diagram of a working state of the electric drill of FIG. 13 in a sixth working scenario.

Referring to FIG. 20, in a sixth working scenario, isometric holes may be punched on the working plane W by using the electric drill 100, and lines connecting the holes are oblique lines at an angle relative to the horizontal line. For determining the first hole position K1 and the second hole position K2, reference can be made to the method as described in FIG. 7. The included angles θ between the lines connecting the holes in the first hole position K1, the second hole position K2, and the third hole position K3 and the horizontal line are equal. Therefore, the third hole position K3 may be determined based on the second hole position K2 or the first hole position K1. When the third hole position is determined based on the second hole position K2, the normal distances (X2,Y2) of the second hole position K2 relative to the reference planes respectively are recorded, the electric drill 100 is moved, and the operator may determine, based on the angle θ calculated through the control module 360 in real time and displayed on the display device 340 in combination with the normal distance Y2+1 m displayed in real time, whether the electric drill has been moved to the predetermined third hole position K3. When the third hole position is determined based on the first hole position K1, the normal distances (X1,Y1) of the first hole position K1 relative to the reference planes respectively are recorded, the electric drill 100 is moved, and it is determined, based on the angle θ calculated through the control module 360 in real time and displayed on the display device 340 in combination with the normal distance Y1+2 m displayed in real time, whether the electric drill reaches the predetermined third hole position K3 (X3,Y4). Certainly, a preset condition, that is, the angle θ, and the difference between relative displacements of various hole positions relative to the first reference plane D may also be input manually, the electric drill 100a is moved, and when the control module determines that the preset normal distance and the preset angle meet a preset condition, it is determined that the drill bit 17 of the electric drill 100a reaches the third hole position K3, and the reminding device emits a prompt signal.

The above different working scenarios correspond to different working modes. For different operation interfaces, the operator may select at least one working mode as needed. The selection of the working mode means selection of a method of processing the acquired normal distances by the control module as well as selection of the prompting or displaying corresponding to the processing method.

During a punching process of the electric drill 100a of the present invention, the ranging and positioning apparatus 30 is integrated into the electric drill 100a. Since an inertial sensor is used, the level of the electric drill 100a is not required to be corrected manually during an positioning and punching operation, that is to say, the ranging and positioning apparatus may automatically correct the tilted degree of the electric drill 100a within the range of an attitude angle of not greater than 30 degrees, so that punching operations may be more convenient and rapid and punching positions may be very precise.

During movement of the ranging and positioning apparatus, real-time position information about the positioning portion or the working head changes. The ranging and positioning apparatus is arranged on an electric tool, and during the tool is moved, the distance between the working head and a predetermined position may be indicated through the output module. Once the working head is moved to the predetermined position, holes may be punched directly by using the tool, without additional positioning operations.

In some working scenarios, the positioning apparatus may be in communication association with an intelligent apparatus so as to assist in mounting a predetermined object in a predetermined area, for example, performing positioning, punching, and picturing hanging on a predetermined wall. The intelligent apparatus is configured to be installed with APP typesetting software associated with the positioning apparatus. The intelligent apparatus transmits or exchanges information with the positioning apparatus via Wi-Fi, Bluetooth, infrared, NFC or other wireless manners. The intelligent apparatus may preset some information by using the APP typesetting software, such as presetting a distance and direction of a predetermined point from a reference point and a working mode parameter, and then transmit the preset information to the positioning apparatus. The positioning apparatus may be a ranging and positioning apparatus, a visual identifying and positioning apparatus, or a projecting and positioning apparatus, where the information may be in the form of position information, size information, image information, control instruction information, state monitoring information, voice information, etc.

Figure 21:
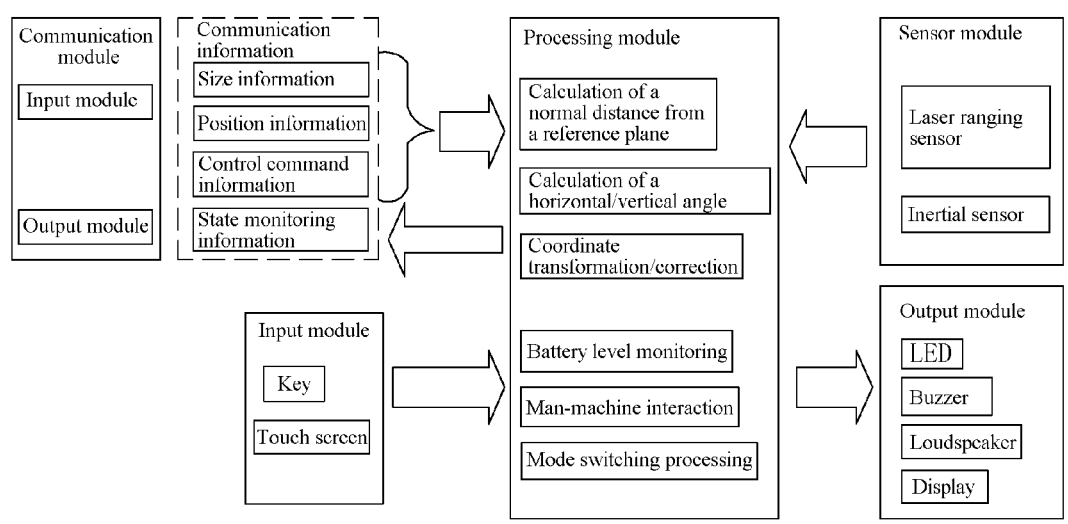
FIG. 21 is a schematic diagram of communication information and control between the ranging and positioning apparatus of FIG. 15 and an intelligent apparatus.

Referring to FIG. 21, a laser ranging and positioning apparatus configured to in communication association with an intelligent apparatus is also involved in the hand-held tool system. The laser ranging and positioning apparatus is configured to perform punching and positioning in combination with the hand-held tool, which has been described above in detail. In order to perform positioning and punching on a working plane and mount a picture by using the laser ranging and positioning apparatus, there are further requirements for the laser ranging and positioning apparatus. The laser ranging and positioning apparatus includes a communication module, a detecting module, and a processing module, where the communication module includes a receiving module for receiving information sent by an intelligent apparatus; the detecting module is configured to acquire a position of a preset predetermined and/or movement information about the positioning apparatus; and the processing module is configured to process information from the receiving module and/or the detecting module. The processing of the processing module includes calculation of a normal distance of the positioning apparatus from a reference plane, calculation of a horizontal and/or vertical angle, coordinate transformation and/or correction, etc. The control instruction information includes a horizontal deflection angle tolerance. The state monitoring information includes a monitored current working attitude angle. The state monitoring information includes a battery level and the remaining working time.

The communication module further includes a sending module for sending, to the intelligent apparatus, the information processed by the processing module or obtained by the detecting module. The size information in this embodiment includes the length and width of a picture frame of each picture to be hung and the horizontal and vertical spacing between adjacent picture frames. The position information includes positions of hooks for the picture frames relative to respective reference points. The control instruction information includes a working mode and a ranging precision tolerance. The working mode includes an independent detection mode and a picture hanging mode. In the independent detection mode, there are horizontal ranging, vertical ranging, linear ranging at a set angle, horizontally equal spacing, vertically equal spacing, linear ranging at a set angle, etc. The state monitoring information includes a battery level, a continuous working time of the apparatus, the remaining working time, the number of currently identifiable feature points, data acquired by detection or calculation, etc.

The ranging and positioning apparatus may send its current state monitoring information, such as monitoring information about the distance from the wall, to the intelligent apparatus through the sending module.

The positioning apparatus includes an input unit. The input unit is electrically connected to the processing module. The input unit may be in the form of a key or a touch screen. At least one working mode may be selected for the positioning apparatus through the input unit, that is, mode switching processing. The processing module under a corresponding working mode includes at least one information processing method corresponding to the working mode. The positioning apparatus may also be configured to perform functions such as man-machine interaction and battery level monitoring, through the input unit.

The detecting module includes a laser ranging sensor and an inertial sensor and is configured to detect a movement and/or state parameter of the laser ranging and positioning apparatus. The processing of the processing module includes calculation of a moving distance of the positioning apparatus, calculation of a horizontal and/or vertical angle, coordinate transformation and/or correction, etc.

The positioning apparatus further includes an output module for outputting, in a sensible manner, the information processed by the processing module. The output module of this embodiment may be a reminding device for emitting a prompt signal based on a processing result of the processing module. The reminding apparatus includes at least one indication unit and/or a display unit. The display unit emits an optical signal, and the indication unit emits a sound signal. The display unit may be an LED or a display, and the indication unit may be a buzzer or a loudspeaker.

Figure 22:
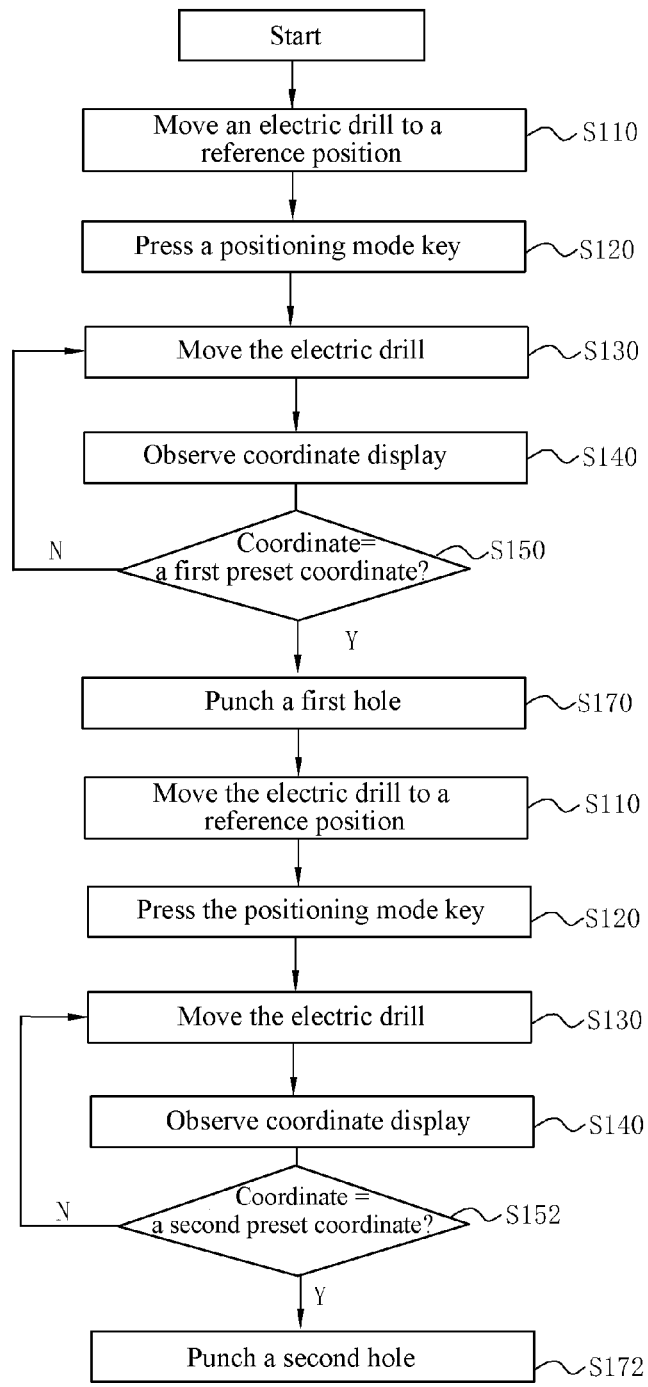
FIG. 22 is a flowchart of punching a first hole and a second hole by the electric drill of FIG. 13 under a human-assisted mode by taking a reference position as a benchmark.

As shown in FIG. 22, a processing flow of punching a first hole and a second hole by the electric drill under the human-assist determining mode by taking a reference position as a benchmark is shown as follows and specifically includes: step S110, the user holding the electric drill 100*a* and moving the electric drill to a reference position. The position where the tail end of the drill bit contacts the working plane is defined as the reference position, that is, the origin coordinate of the working plane, and at this point, the drill bit needs to abut against the working plane (such as a wall). Step S120, pressing a positioning mode key so as to record the reference position; if the positioning mode key simultaneously controls the powering on and coordinate clearing for the detecting system, powering on and initiating the detecting module, clearing coordinates, and recording an attitude of the electric drill; and if the detecting system has been in a power-on state, merely clearing the coordinates and recording the attitude of the electric drill. Step S130, next, the user moving the electric drill, and the display screen displaying a real-time position, which is relative to the origin coordinate of the reference position here, and calculating a real-time relative position of the electric drill bit via an algorithm by using sensor data. Step S140, observing coordinate display. Step S150, the user determining, based on ranging coordinate values on the display screen, whether the electric drill is moved to a predetermined punching point. Step S170, the user punching a first hole after the electric drill reaches a predetermined location. Certainly, the detection may also be stopped, that is, the ranging and positioning apparatus is powered off, which is not necessarily considering energy saving and detection error reduction. When a next hole needs to be punched, an optional manner is shown as follows: performing, again, step S110 of moving the electric drill to the original reference position; then performing step S120 of pressing the positioning mode key so as to record the reference position; then performing step S130 of moving the electric drill; performing step S140 of observing coordinate display; performing step S152, the user determining, based on ranging coordinate values observed on the display screen, whether the electric drill is moved to a second preset coordinate, that is, a second predetermined punching point; and if the electric drill reaches a predetermined point, performing step S172 of punching a second hole in the second hole position.

Figure 23:
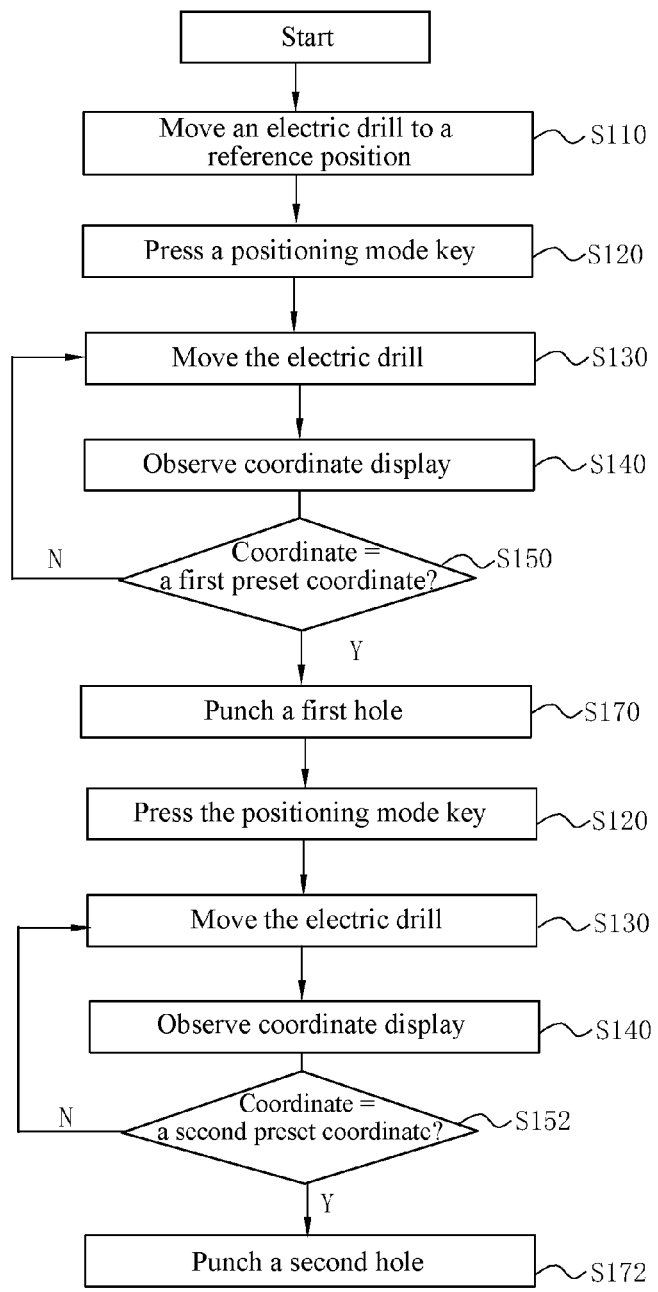
FIG. 23 is a flowchart of punching, by the electric drill of FIG. 13 under a human-assisted determining mode, a first hole by taking a reference position as a benchmark and a second hole by taking a first hole position as a benchmark.

Referring to FIG. 23, FIG. 23 is a flowchart of punching, by the electric drill 100*a* under the human-assisted determining mode, a first hole by taking a reference position as a benchmark and a second hole by taking a first hole position as a benchmark. The differences from the previous flow of punching a first hole and a second hole by the electric drill by taking a reference position as a benchmark under the human-assisted determining mode lies in: using the first punching position as the reference position, that is to say, after step S170, namely, after the completion of the first hole punching, performing step S120 of pressing the positioning mode key in this hole position so as to record the reference position, and then repeating operation steps of S130 to S172 in the previous flow. The positioning and punching steps may be repeated, so that a plurality of holes may be punched efficiently and continuously on the working plane.

Figure 24:
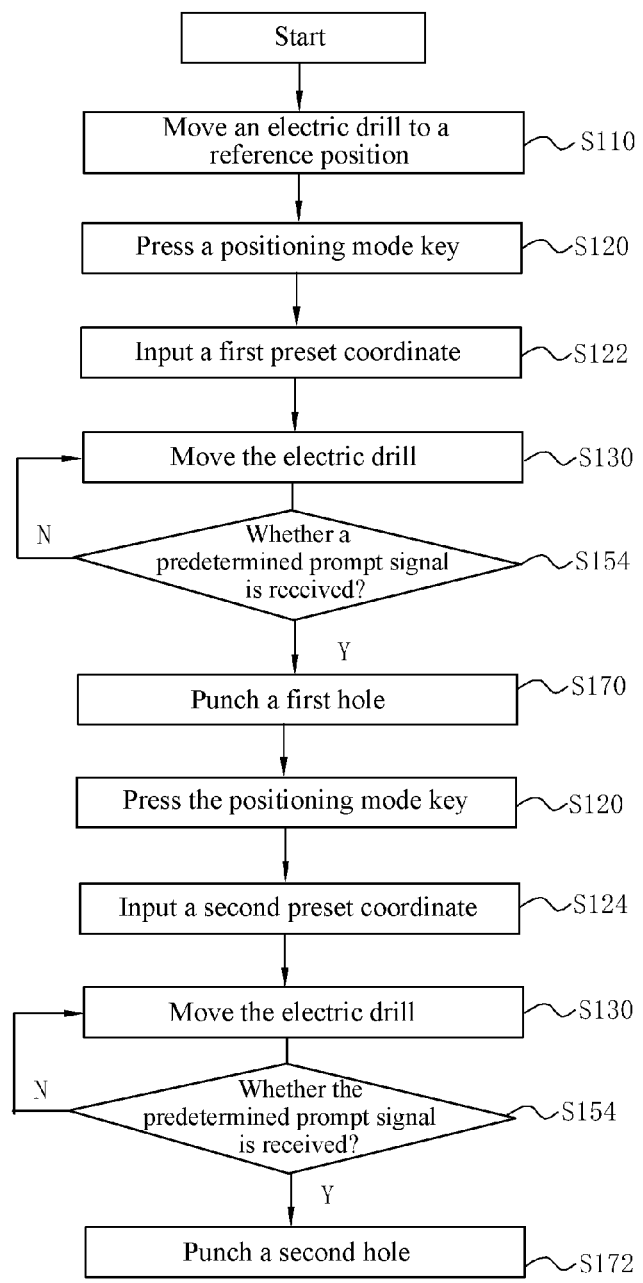
FIG. 24 is a flowchart of punching a first hole and a second hole by the electric drill of FIG. 13 under an intelligent determining mode by inputting a preset working coordinate.

Referring to FIG. 24, FIG. 24 is a flowchart of punching a first hole and a second hole by the electric drill 100*a* under the intelligent determining mode by inputting a preset working coordinate. The operation flow specifically includes: step S110, the user holding the electric drill and moving the electric drill to a reference position; step S120, pressing a positioning mode key so as to record an attitude of the electric drill and clear a coordinate; step S122, inputting data on a first punching point relative to the origin coordinate through the input module, that is, inputting a first preset coordinate, for example, inputting 15 centimeters right and 10 centimeters upward, so that predetermined position information M (15, 10, 0, angle) is generated. Next, performing step S130: the user moving the electric drill; the processor acquiring a real-time position m of the drill bit by using inertial device data; displaying a real-time coordinate on the display screen; the controller comparing the real-time coordinate with the input coordinate of the drill bit; and when the real-time coordinate is equal to the input coordinate, the user being indicated with a signal through lighting of an LED lamp of the display screen or sound production of a buzzer. Step S154, determining whether a preset prompt signal is received. If it is observed that the LED lamp is lit up or it is heard that the buzzer produces a sound, it indicates that the electric drill has been moved to a predetermined punching position. Step S170, punching a first hole in the predetermined position. When a second hole needs to be punched, the following steps are performed: step S120, pressing the positioning mode key by taking the first hole as a benchmark; step S124, inputting a second preset working coordinate; step S130, moving the electric drill again; step S154, determining whether the preset prompt signal is received; and finally, step S172, punching a second hole in a second preset predetermined position, and so on.

The user inputs the coordinate data on a next punching point relative to the origin through the input module. If the input module here is an input panel arranged on the housing for the user to input coordinates, for example, a built-in keyboard of the electric drill, the data is input directly.

Figure 25:
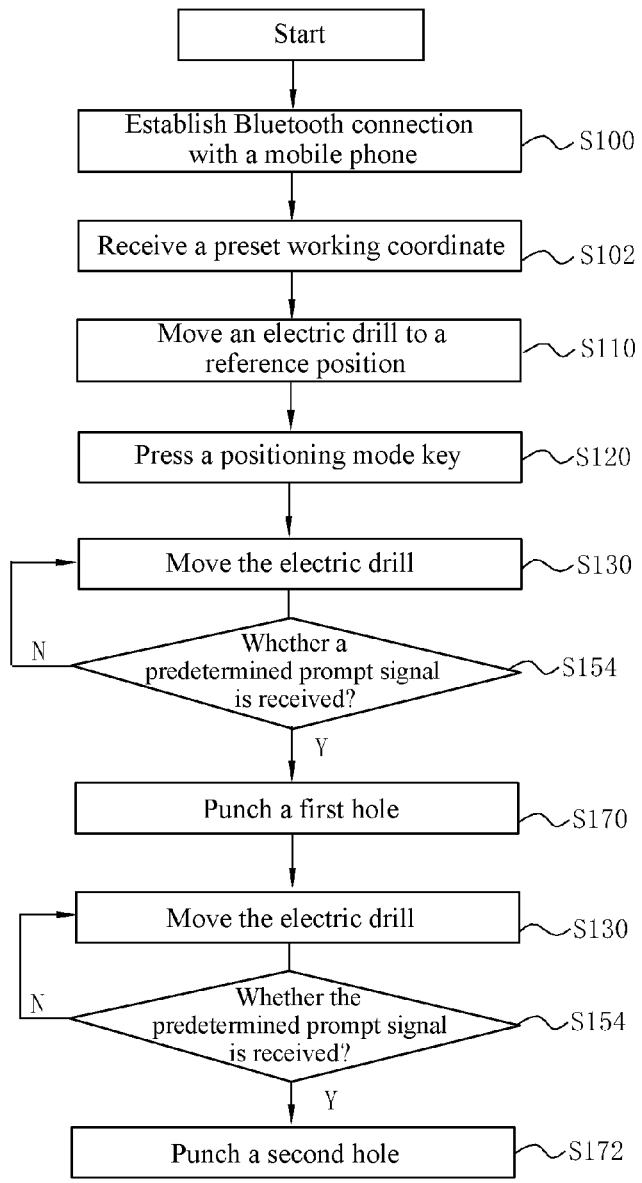
FIG. 25 is a flowchart of punching a first hole and a second hole by the electric drill of FIG. 13 under an intelligent determining mode by receiving a preset working coordinate from a mobile phone.

Referring to FIG. 25, FIG. 25 is a flowchart of punching a first hole and a second hole by the electric drill under the intelligent determining mode by receiving a preset working coordinate from a mobile phone. The differences from the flow shown in FIG. 23 lie in: establishing communication connection with the electric drill through an external mobile apparatus, for example, a smart phone; inputting a series of preset coordinates or the data of a next punching point relative to the origin coordinate on the mobile apparatus, so that the ranging and positioning apparatus of the electric drill receives a preset working coordinate from the mobile phone; and arranging a Bluetooth communication module on the ranging and positioning apparatus. Specific working steps include: step S100, establishing Bluetooth connection with a mobile phone; step S102, receiving a preset working coordinate from the mobile phone, where the preset working coordinate may include a series of coordinates, that is, coordinates of a plurality of consecutive punching positions; step S110, moving the electric drill to a reference position; step S120, pressing a positioning mode key; step S130, moving the electric drill; step S154, determining whether a preset prompt signal is received, where if it is observed that the LED lamp is lit up or it is heard that the buzzer produces a sound, it indicates that the electric drill has been moved to a predetermined punching position; and step S170, the user punching a first hole. If a second hole is to be punched, the following steps are performed: step S120, pressing the positioning mode key by taking the first hole as a benchmark; step S130, moving the electric drill again; step S154, determining whether the preset prompt signal is received; and finally, step S172, punching a second hole in a second preset predetermined position, and so on.

Figure 26:
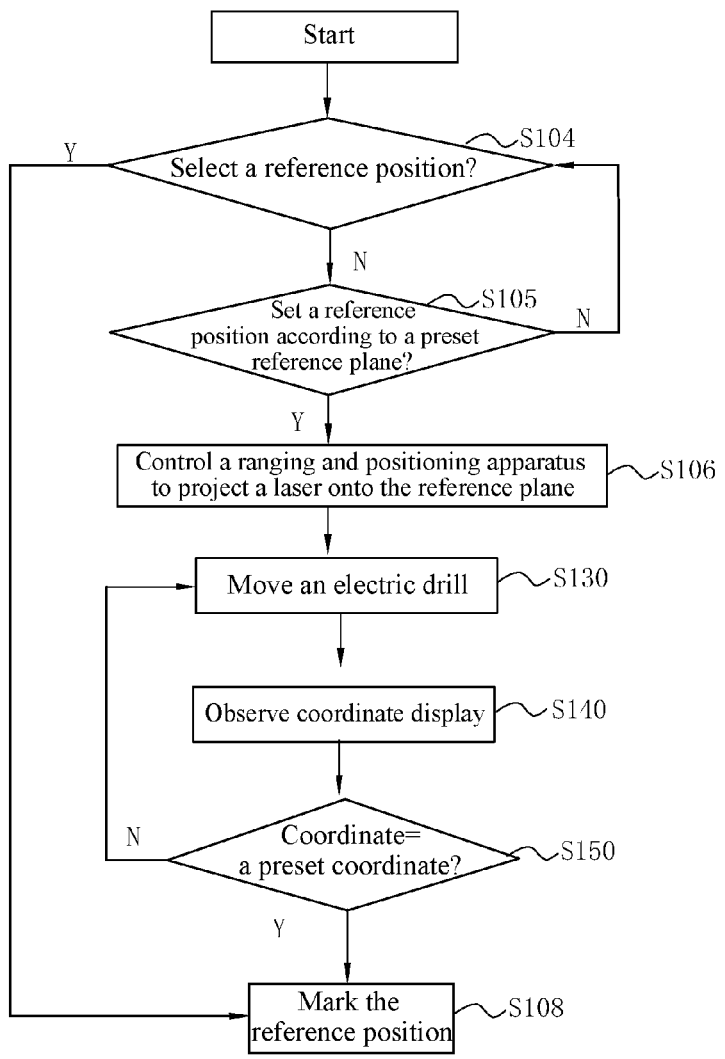
FIG. 26 is a schematic diagram of a work flow of determining a reference position by the electric drill of FIG. 13.

Referring to FIG. 26, before the electric drill 100a is moved to a reference position, the reference position needs to be set firstly, and then, a working predetermined at a certain distance from the reference position may be preset. A normal practice is shown as follows: during setting a reference position, selecting a reference position on a working plane arbitrarily based on step S104, or confirming, based on the reference plane, a reference position where the working plane is at a particular distance from a known reference plane. If it is determined that the reference position is selected on the working plane based on working experience, step S108 of marking the reference position is performed. Instead of selecting the reference position by experience, if there is a clear precision requirement for the reference position, step S105 of determining whether the reference position may be set based on the preset reference plane may be performed; and if so, the following operation steps are performed: step S106, controlling the ranging and positioning apparatus to enable the laser ranging unit to project a laser onto the preset reference plane; step S130, moving the electric drill; step S140, observing a coordinate displayed on the display device 340 to find a point in which a distance from the preset reference plane is a preset normal distance; step S150, when it is determined that the coordinate displayed on the display device 340 is equal to the preset working predetermined coordinate, stopping moving the electric drill and determining a reference point; and step S108, recording the reference position, specifically, pressing a positioning mode key in the reference position so as to record a coordinate of the reference point.

The hand-held tool of the embodiments of the present invention is not limited to the electric drill 100a, and the principle of the ranging and positioning apparatus of the present invention may be applicable to any hand-held tool configured to detect and position a working position of a processed workpiece on a working plane, for example, a multi-functional machine configured to realize swing cutting, a polishing machine for polishing a workpiece, an electric circular saw for cutting, etc.

A Fourth Embodiment

Figure 27:
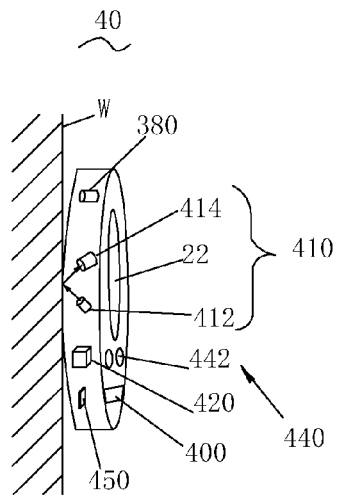
FIG. 27 is a schematic structural diagram of a ranging and positioning apparatus in a preferred fourth embodiment of the present invention.

Referring to FIG. 27, a positioning system includes a ranging and positioning apparatus 40 that moves and works on the working plane W. The ranging and positioning apparatus 40 of this embodiment is in the form of a circular body approximately. The circular body has a top portion and a bottom portion and is similar to an optical mouse that moves on the working plane W. Therefore, positioning a predetermined position on the working plane W by using the ranging and positioning apparatus 40 is also referred to as optical mouse positioning.

Figure 28:
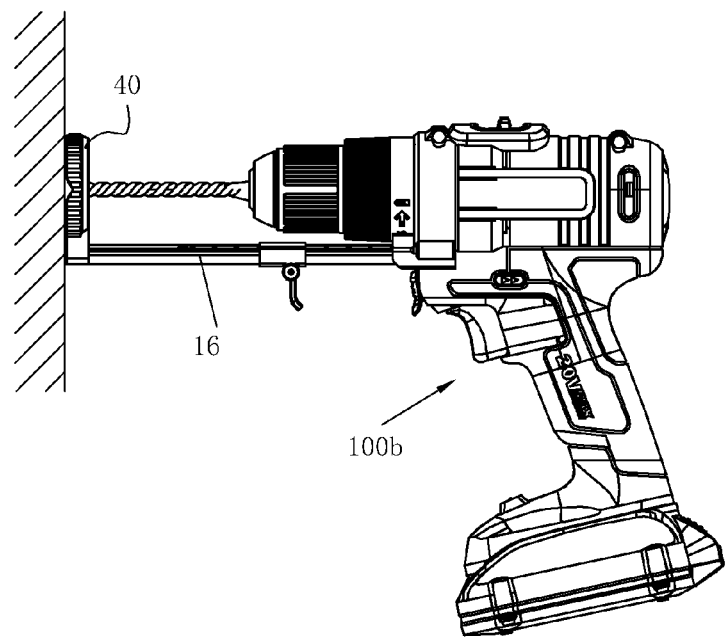
FIG. 28 is a schematic structural diagram of the ranging and positioning apparatus of FIG. 27 combined into an electric drill.

Referring to FIG. 28, in another alternative manner, the ranging and positioning apparatus 40 may be used in combination with the hand-held tool and may achieve data association with the hand-held tool in a wireless manner. The hand-held tool is preferably an electric drill 100b. The ranging and positioning apparatus 40 of this embodiment is combined onto a positioning support rod 16 of the electric drill 100b. The positioning support rod 16 is scalable relative to the body of the electric drill 100b. The ranging and positioning apparatus 40 may contact and move on the working plane W so as to implement ranging and positioning. A positioning mode key 440 of the ranging and positioning apparatus 40 may be partially or completely arranged on the body in a position convenient for operation. For example, a key 442 for coordinate clearing may be disposed in a position, which is closed to a switch trigger, of a handle of the electric drill 100b, and is similar to the key 13 of the third embodiment; and a key for working mode selection, coordinate displaying and the like may be arranged on an end face, which is close to the operator during operation, of the body, which is similar to the third embodiment.

Figure 29:
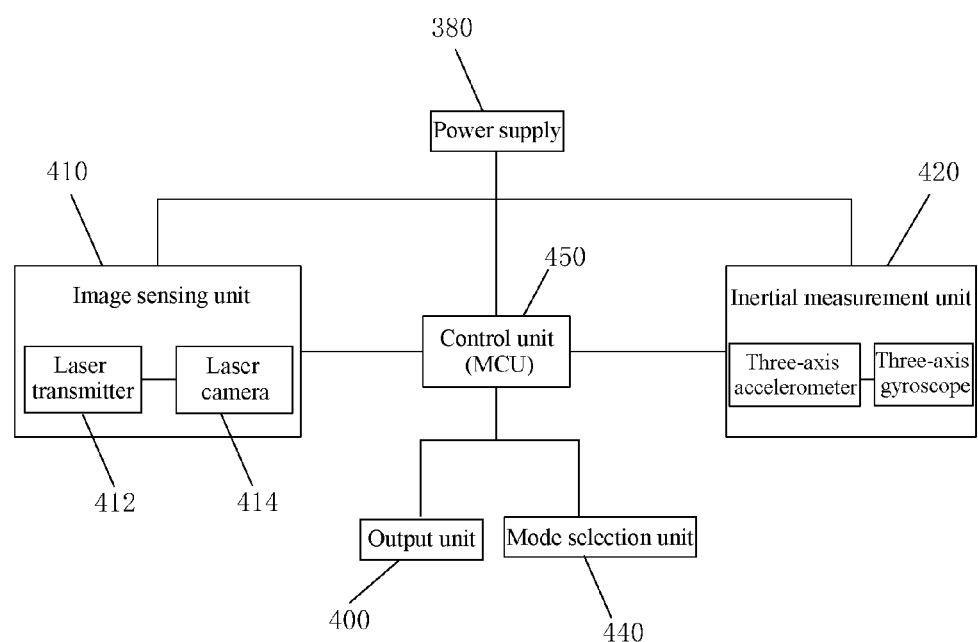
FIG. 29 is a schematic diagram of connection of various components of the ranging and positioning apparatus of FIG. 27.

Referring to FIG. 27 and FIG. 29, the ranging and positioning apparatus 40 includes a power supply 380, an image sensing unit 410, an inertial detection unit 420, and a control module 430. The image sensing unit 410 is arranged close to the bottom portion of the circular body and includes at least one laser camera 412 and at least one laser transmitter 414. The laser transmitter 414 is configured to project a laser onto the working plane W, and the laser camera 412 is configured to sense the laser in real time and photograph a projection image of the laser on the working plane W. The inertial detection unit 420 is configured to detect an attitude angle of the ranging and positioning apparatus 40 in real time. The inertial detection unit 420 of this embodiment includes an acceleration sensor and an angular velocity sensor. The control module 450 is configured to calculate, based on a difference value between pixels with same feature information identified in two adjacent frames of images photographed through the laser camera 412, a displacement generated within a period of time of photographing the two frames of images, and calculates based on the detected attitude angles and displacements. Calculation results include a horizontal displacement and a vertical displacement (X0, Y0) generated by the movement of the ranging and positioning apparatus 40.

The ranging and positioning apparatus 40 further includes an output module 400 arranged on a top surface, a positioning mode key 440, and a positioning unit 22. The output module 400 may be a display device for observing, which is preferably a display screen, or may also be configured to be a reminding device for emitting a prompt signal, for example, for providing an observable optical signal in an illuminating manner. When the output module 400 is a display device, the positioning mode key 440 is configured to selectively control a detection parameter that the positioning mode key may display as well as the calculation results of the control module 450 or for performing a clearing operation on the parameter. The positioning mode key 440 may be a touch screen or an operation key. The positioning mode key 440 of this embodiment includes a plurality of keys 442 configured to be operated manually. Each of the keys 442 corresponds to a particular function and may be used for working mode selection, learning recording or clearing, etc. The display device 400 of this embodiment is a liquid crystal display for displaying the parameters displayed in the manner of digital display. The positioning unit 22 is configured to mark or position the reference point or the working predetermined determined by the ranging and positioning apparatus 40 on the working plane W. The positioning unit of this embodiment is a positioning hole. The positioning hole is substantially a through hole penetrating through the ranging and positioning apparatus 40.

The control module 450 (MCU) is electrically connected to the inertial detection unit 420 and the image sensing unit 410 respectively. Specifically, the three-axis accelerometer of the inertial detection unit 420 detects an acceleration of a moving carrier in 3 directions, the three-axis gyroscope detects angular velocities of the moving carrier in 3 axial directions, and after fusion processing, two upper included angles to a horizontal plane, that is, a roll angle and a pitch angle, as well as a rotation angle on the horizontal plane, that is, a heading angle, may be detected precisely. The roll angle, the pitch angle, and the heading angle of the embodiments of the present invention all belong to attitude angles. The laser transmitter 414 of the image sensing unit 410 is an infrared laser transmitter, and the laser camera 412 is an infrared laser camera. The control module 450 is configured to calculate, based on a difference value between pixels with the same feature information identified in two adjacent frames of images photographed through the laser camera 412, a displacement generated within a period of time of photographing the two frames of images, and calculates based on the attitude angles and the displacements. The display unit is configured to display detected attitude angles and calculation results of the control module 450. The calculation results include a horizontal displacement and a vertical displacement generated by the movement of the ranging and positioning apparatus. The selection unit 330 is configured to display records and the calculation results on the display unit selectively. The power supply 380 provides electric energy for various electricity utilization components and can meet working requirements for a certain period of time.

Figure 30:
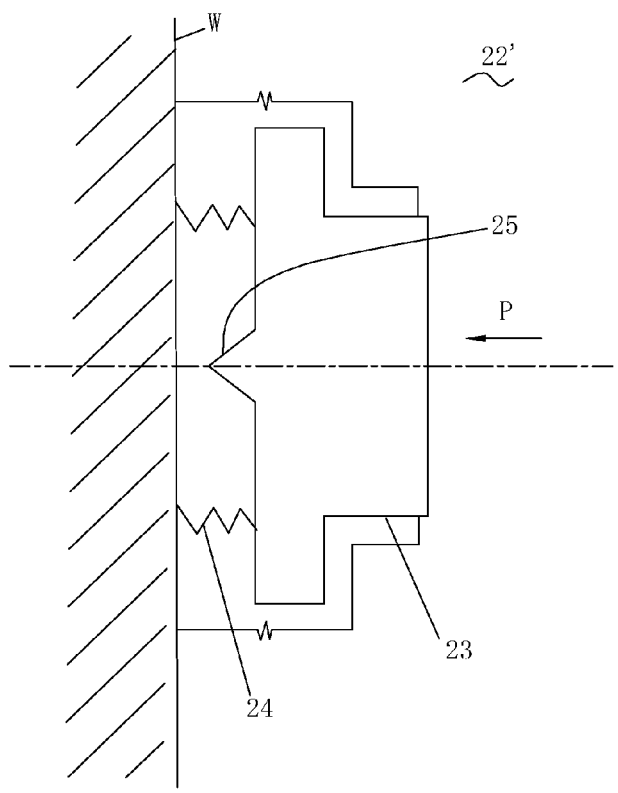
FIG. 30 is a schematic diagram of a variation of a partial structure of the ranging and positioning apparatus of FIG. 27.

Referring to FIG. 30, FIG. 30 shows a simple variation of the positioning hole. A positioning unit 22' includes a positioning column 23 arranged flexibly relative to the working plane W. An end, which is close to the working plane W, of the positioning column 23 is provided with a marker 25. The marker 25 is configured to be similar to a shape of a nib. At the bottom of the ranging and positioning apparatus 40, a hole for the marker 25 to pass through (not shown) is provided. Under a normal state, the positioning column 23 is supported by an elastic member 24, there is a gap maintained between the marker 25 and the working plane W, and when the operator applies an external force indicated by the arrow P to the positioning column 23, the positioning column 23 overcomes the force applied by the elastic member 24 and moves towards the direction of the working plane W, so that the marker 25 abuts against the working plane W and leaves a working mark on the working plane W. The positioning column 23 is preferably made of a transparent material, so that the operator may see a contact position or a working mark of the marker 25 on the working plane W clearly. When the operator determines a reference position on the working plane W, the ranging and positioning apparatus 40 may be moved until the marker 25 of the positioning column 23 is aligned with the reference position for zero position setting. Then, the ranging and positioning apparatus 40 is moved on the working plane W until both the horizontal displacement and the vertical displacement displayed by the display device reach preset values. At this point, the position of the ranging and positioning apparatus 40 is marked by pressing the positioning column 23, and the marked position is a working position.

Figure 31:
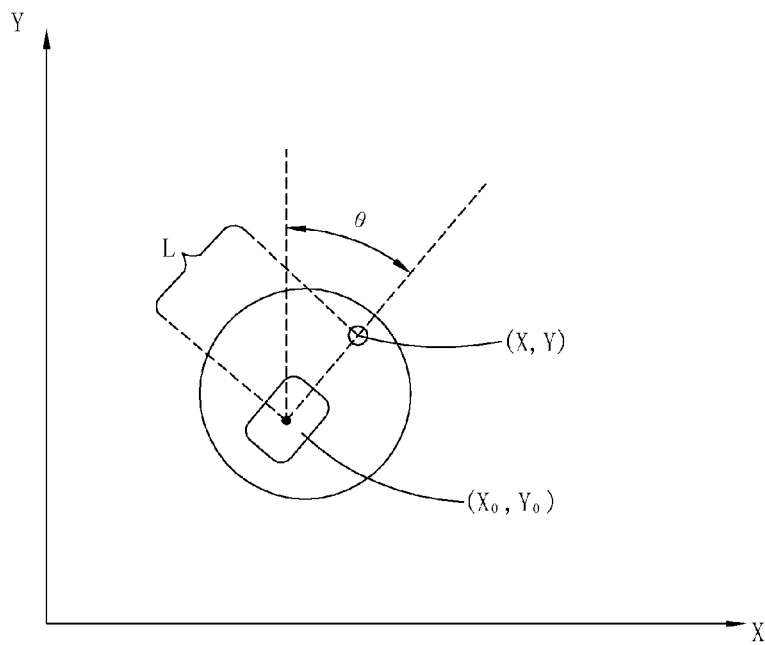
FIG. 31 is a schematic diagram of correcting a positioning coordinate for the ranging and positioning apparatus of FIG. 27.

Referring to FIG. 31, during detection, the ranging and positioning apparatus 40 may have an angular deflection when moved on the working plane W for detection, and the center of the positioning hole 22 has a certain distance from the image sensing unit 410. Therefore, the horizontal displacement and the vertical displacement (X0, Y0) generated by the movement of the ranging and positioning apparatus 40 do not represent the position of the center of the positioning hole 22. Therefore, the control module 450 is required to perform calculation correction, a displacement value after the correction represents the central position of the positioning hole 22, and the parameter displayed by the display unit is also a corrected parameter representing the central position of the positioning hole 22.

In a two-dimensional coordinate system, a specific manner of calculation correction is shown as follows: positioning coordinates (X0, Y0) of the image sensing unit 410, a distance L from the image sensing unit 410 to the center of the positioning hole 22, and an angle at which the ranging and positioning apparatus 40 rotates, that is, the roll angle θ, are known; therefore, a calculation formula of coordinates of the center of the positioning hole 22 is: X=X0+L* cos θ; and Y=Y0+L* sin θ.

When the display unit of the ranging and positioning apparatus 40 displays a parameter that indicates a preset reference point or a working predetermined is reached, the position corresponding to the center of the positioning hole 22 is used as a reference position or a predetermined working position, and the operator may mark at the center of the through hole, or the operator may mark in the center of a through hole or directly pass through the electric drill bit 17 by using the through hole so as to perform punching operations.

A switch of the power supply is turned on so as to initiate the ranging and positioning apparatus 40 to work. At this point, the image sensing unit 410 is initiated, the laser transmitter 414 projects a laser, the laser camera 412 senses the laser and photographs, in real time, images projected by the laser onto the working plane, and the control module 450 detects dynamic images photographed by the laser camera 412 and processes the images by an optical flow method based on a difference value between pixels with the same feature information identified in two adjacent frames of images, thereby acquiring a linear displacement generated by the ranging and positioning apparatus 40 within a period of time of photographing the two frames of images.

The inertial detection unit 420 initiates working at the same time. The three-axis accelerometer detects an acceleration parameter of the ranging and positioning apparatus 40 in real time, the three-axis gyroscope detects an angular velocity parameter of the ranging and positioning apparatus 40 in real time, and attitude angles of the ranging and positioning apparatus 40 are acquired by a filtering fusion algorithm. In the filtering and fusing algorithm, Kalman filtering is used preferably. Certainly, a person skilled in the art would use other filtering methods for substitution. The control module 450 performs calculation based on the attitude angles and linear displacements acquired above so as to acquire the generated horizontal displacement and vertical displacement (X, Y) of the ranging and positioning apparatus 40.

Figure 32:
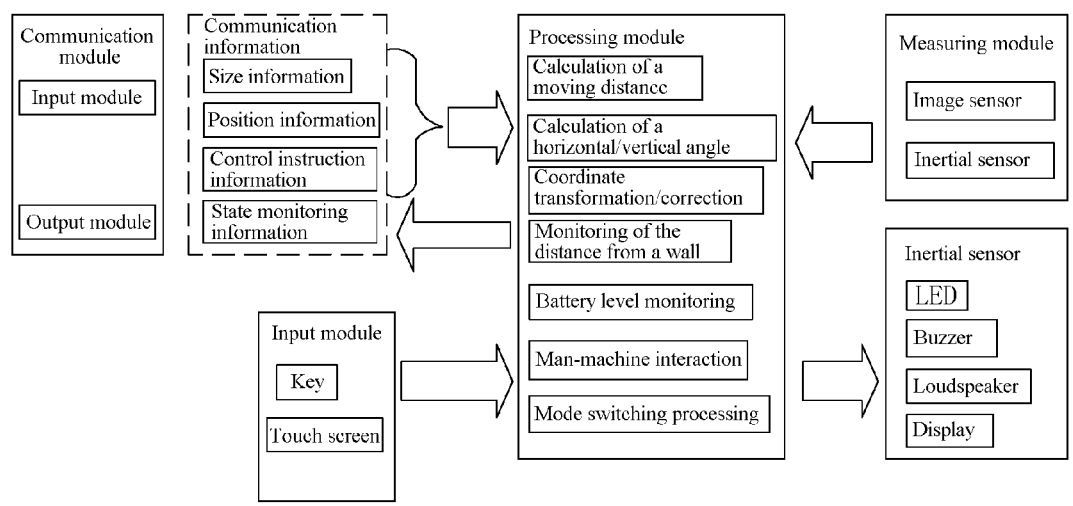
FIG. 32 is a schematic diagram of communication information and control between the ranging and positioning apparatus of FIG. 27 and an intelligent apparatus.
Figure 33:
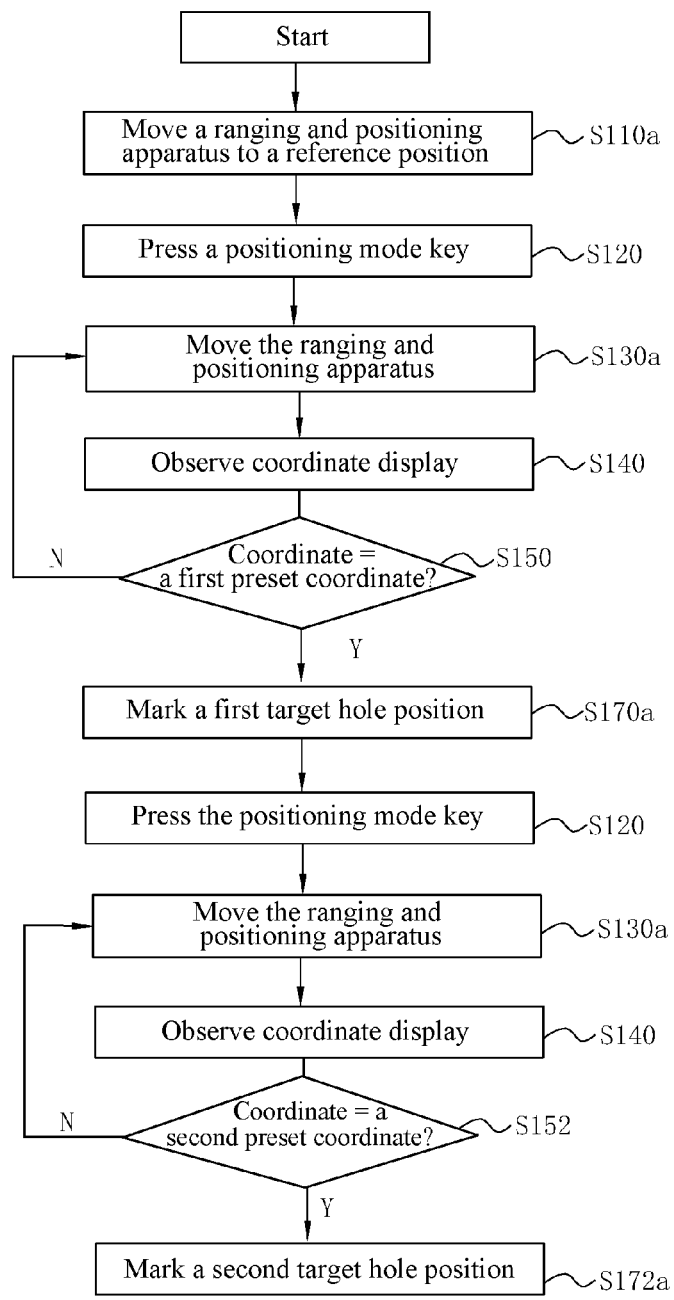
FIG. 33 is a flowchart of determining and marking a first predetermined hole position and a second predetermined hole position by the ranging and positioning apparatus of FIG. 27 under a human-assisted mode by taking a reference position as a benchmark.

Referring to FIG. 32, an optical mouse ranging and positioning apparatus configured to communicate with an intelligent apparatus is also involved in the hand-held tool. A control module of the optical mouse ranging and positioning apparatus of this embodiment also includes a communication module, a detecting/measuring module, and a processing module, where the communication module includes a receiving module for receiving information sent by an intelligent apparatus; the detecting module is configured to obtain a position of a preset predetermined and/or movement information about the positioning apparatus; and the processing module processes information from the receiving module and/or the detecting module.

The communication module further includes a sending module for sending, to the intelligent apparatus, the information processed by the processing module or obtained by the detecting module. The size information involved in information transmission in this embodiment includes the length and width of a picture frame of each picture to be hung and the horizontal and vertical spacing between adjacent picture frames. The position information involved includes positions of hooks of the picture frames relative to respective reference points. Control instruction information includes a working mode and a ranging precision tolerance. The working mode includes an independent detection mode and a picture hanging mode. In the independent detection mode, there are horizontal ranging, vertical ranging, linear ranging at a set angle, horizontally equal spacing, vertically equal spacing, linear ranging at a set angle, etc. The state monitoring information includes a battery level, a continuous working time of the apparatus, the remaining working time, the number of currently identifiable feature points, data acquired by detection or calculation, etc.

The optical mouse ranging and positioning apparatus may send its current state monitoring information, such as monitoring information on the distance from the wall, to the intelligent apparatus through the sending module.

The optical mouse ranging and positioning apparatus further includes an input module. The input module is electrically connected to the processing module. The input module may be in the form of a key or a touch screen. At least one working mode may be selected for the positioning apparatus through the input module, that is, mode switching processing. The processing module under a corresponding working mode includes at least one information processing method corresponding to the working mode. The positioning apparatus may also be configured to perform functions such as man-machine interaction and battery level monitoring through the input module.

The detecting module includes an image sensor and an inertial sensor and is configured to detect a movement and/or state parameter of the optical mouse ranging and positioning apparatus. The processing of the processing module includes calculation of a moving distance of the positioning apparatus, calculation of a horizontal and/or vertical angle, coordinate transformation and/or correction, etc.

The optical mouse ranging and positioning apparatus further includes an output module for outputting, in a sensible manner, the information processed by the processing module. The output module of this embodiment may be a reminding device for emitting a prompt signal based on a processing result of the processing module. The reminding apparatus includes at least one indication unit and/or a display device. The display device emits an optical signal, and the indication unit emits a sound signal. The display device may be an LED or a display, and the indication unit may be a buzzer and a loudspeaker.

Referring to FIG. 27 and FIG. 28 to FIG. 31, a flow of determining and marking, by the ranging and positioning apparatus 40, a first predetermined hole position and a second predetermined hole position on a working plane under the human-assisted mode by taking a reference position as a benchmark, independently from the hand-held tool, will be described below. If the operator desires to punch, on the working plane W, a row of holes located on a same horizontal line or vertical line, it is necessary to set a reference position on the working plane W firstly. Specific operation steps include: step S110*a*, moving the ranging and positioning apparatus 40 on the working plane to the center of the positioning hole 22 so as to reach the selected reference position; step S120, pressing a positioning mode key, that is, pressing the key 442, so as to record a coordinate of the reference position, including coordinate clearing of the reference position; step S130*a*, moving the ranging and positioning apparatus 40; step S140, observing coordinate display; step S150, determining whether a displayed real-time coordinate is equal to a first preset coordinate, where if the real-time coordinate is equal to the first preset coordinate, the position is a first predetermined position; and step S170*a*, marking the first predetermined position by the positioning hole or the positioning column of the positioning unit, where the first predetermined position is a first punching position; and if it is observed and determined that the real-time coordinate is not equal to the first preset coordinate, further moving the ranging and positioning apparatus 40. If a second hole is to be punched, a second predetermined position must be positioned. The operation steps include: step S120, pressing the positioning mode key so as to clear a display result of the display unit; step S130*a*, moving the ranging and positioning apparatus 40; step S140, observing coordinate display; step S152, determining whether a displayed coordinate is equal to a second preset coordinate; and step S172*a*, marking the second predetermined position by the positioning hole or the positioning column of the positioning unit. If it is determined that the displayed coordinate is not equal to the second preset coordinate, the ranging and positioning apparatus 40 is required to be further moved until it is observed and determined that the displayed coordinate is equal to the second preset coordinate, that is, the electric drill reaches the second predetermined position, namely, the second hole punching position; the second predetermined position is marked by the positioning hole or the positioning column of the positioning unit; and by analogy, a third predetermined and a fourth predetermined are positioned and marked. Once the first and second predetermined punching positions are determined, holes may be punched in the predetermined positions by using the electric drill.

Figure 34:
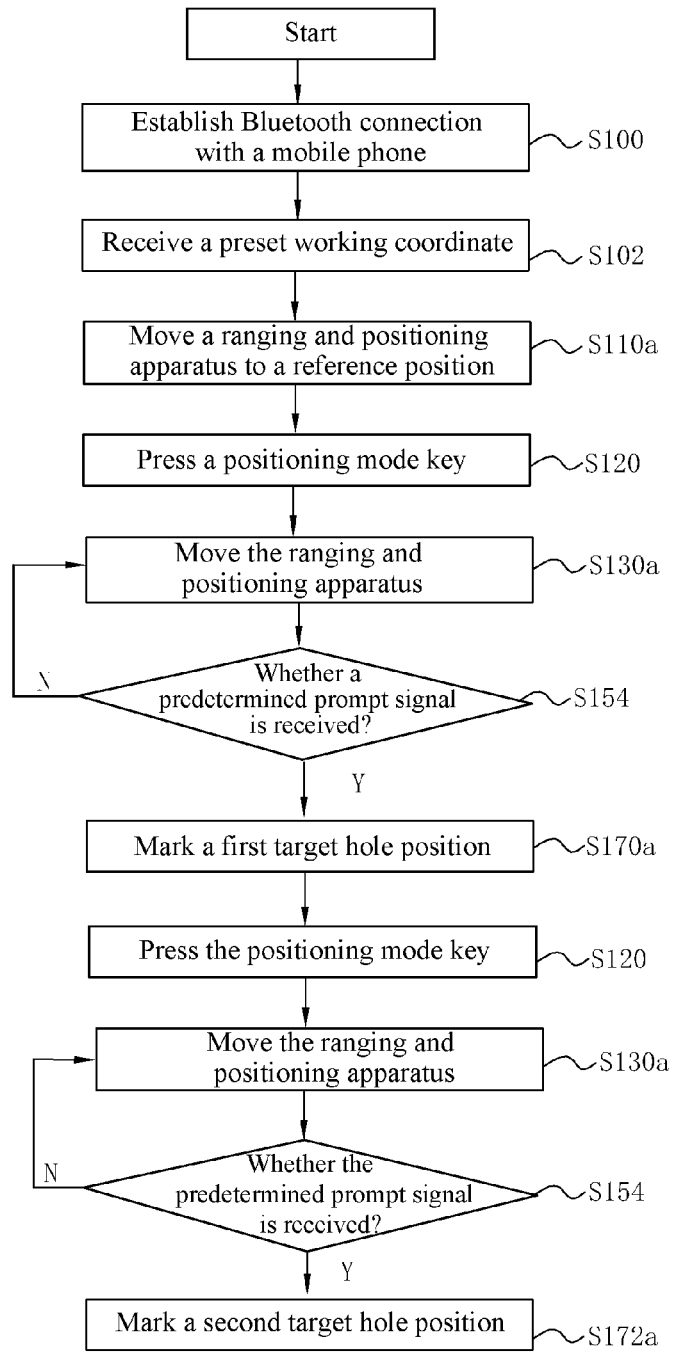
FIG. 34 is a flowchart of determining and marking a first predetermined hole position and a second predetermined hole position by the ranging and positioning apparatus of FIG. 27 under an intelligent determining mode by receiving a preset working coordinate from a mobile phone.

Referring to FIG. 34, a flow of determining and marking, by the ranging and positioning apparatus 40, a first predetermined hole position and a second predetermined hole position under the intelligent determining mode by receiving a preset working coordinate from a mobile phone, independently from the hand-held tool, will be described below. Specific working steps include: step S100, establishing Bluetooth connection with a mobile phone; step S102, receiving a preset working coordinate from the mobile phone, which may include a series of coordinates, that is, coordinates of a plurality of consecutive punching positions; step S110*a*, moving the ranging and positioning apparatus to a reference position; step S120, pressing a positioning mode key; step S130*a*, moving the ranging and positioning apparatus; step S154, determining whether a preset prompt signal is received, where if it is observed that an LED lamp is lit up or it is heard a buzzer produces a sound, it indicates that the ranging and positioning apparatus has been moved to a predetermined punching position; and step S170*a*, marking a first hole position in the predetermined position. If a second hole is to be punched, the following steps are performed: step S120, pressing the positioning mode key by taking the first hole as a benchmark; step S130*a*, moving the ranging and positioning apparatus again; step S154, determining whether the preset prompt signal is received; and step S172*a*, marking a second hole position in a second preset predetermined position, and so on.

Referring to FIG. 28, when the ranging and positioning apparatus 40 is combined into the electric drill 100*b*, for a work flow of ranging and positioning as well as punching by the electric drill, reference can be made to FIG. 23 and FIG. 24 in the third embodiment and will not be further described in this embodiment.

Figure 35:
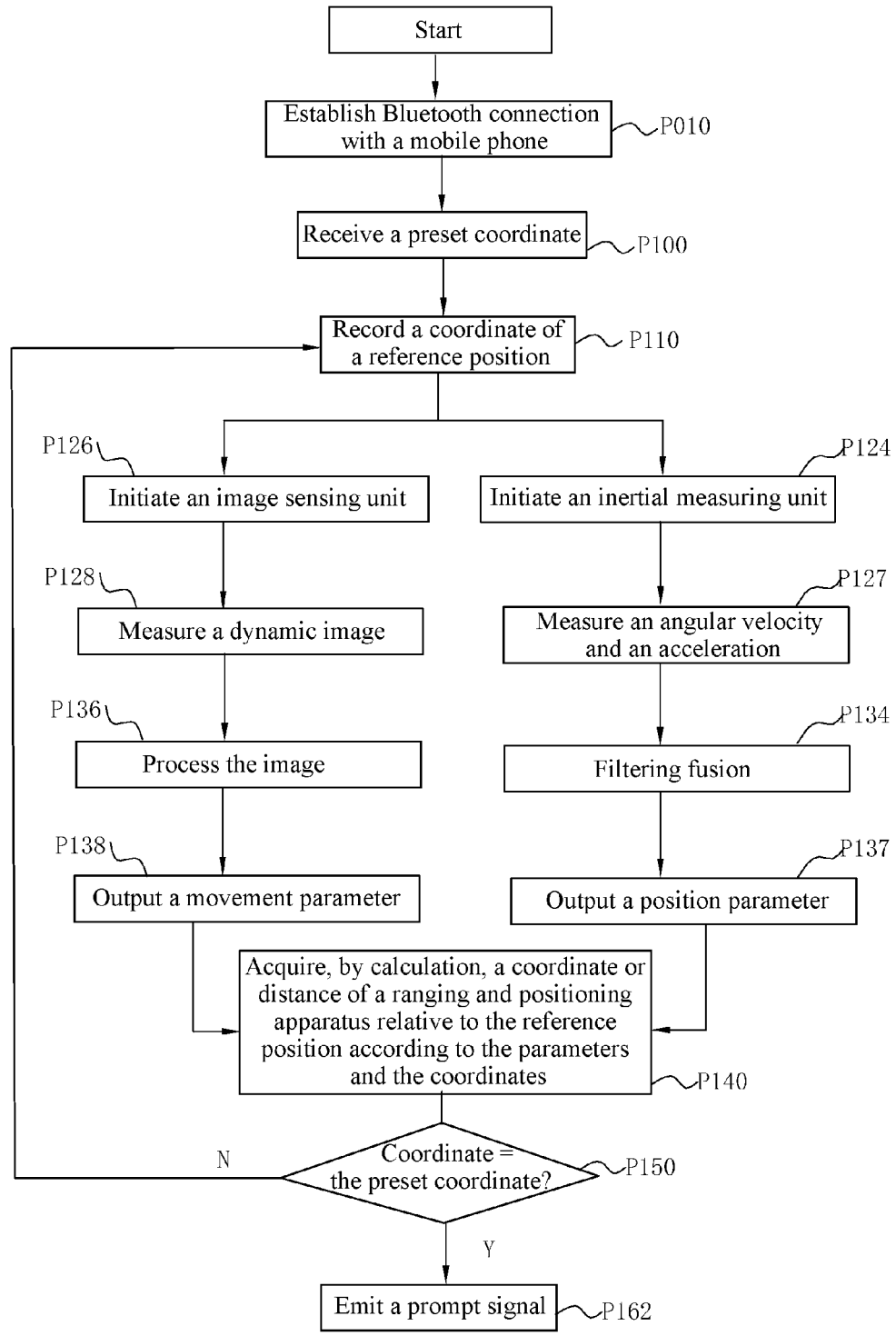
FIG. 35 is a schematic diagram of a work flow of the ranging and positioning apparatus combined with the electric drill of FIG. 28 being associated with an intelligent apparatus.

Referring to FIG. 32 and FIG. 35, the ranging and positioning apparatus 40 is combined into the electric drill 100*b* and may be in data communication with an external intelligent apparatus, for example, a smart phone, in a wireless manner. The output module 400 is specifically a reminding device. The work flow of performing positioning detection by the ranging and positioning apparatus 40 is shown as follows: step P010, establishing Bluetooth connection with a smart phone; step P100, receiving a preset coordinates transmitted from the mobile phone; step P110, when the electric drill is moved to a reference position and the operator presses a positioning mode key, detecting a coordinate of the reference position, which is recorded by the ranging and positioning apparatus 40; step P124 and step P126, initiating the inertial detection unit and the image sensing unit of the ranging and positioning apparatus 40 respectively; step P127, the inertial detection unit measuring an angular velocity and the acceleration of the electric drill; step P128, the image sensing unit measuring dynamic images; step P134, the inertial detection unit performing filtering fusion; step P136, the image sensing unit processing the images; step P137, the inertial detection unit outputting a position parameter of the ranging and positioning apparatus; step P138, the image sensing unit outputting a movement parameter of the ranging and positioning apparatus; step P148, based on the above parameters and coordinates, the control module acquiring, by calculation, a real-time coordinate or distance of the positioning hole or the positioning column of the ranging and positioning apparatus relative to the reference position, where reference is made to FIG. 27, that is to say, when the ranging and positioning apparatus is combined into a free end of the positioning support rod of the electric drill, the position of the center of the positioning hole thereof is the position where the electric drill bit is aligned with the working plane; step P150, the control module comparing and determining the real-time coordinate acquired by calculation with the received preset coordinate; if it is determined that the real-time coordinate is equal to the preset coordinate, performing step P162 of the reminding device emitting a prompt signal so as to indicate that the electric drill has been moved to a predetermined position; and if the control module determines that the real-time coordinate is not equal to the preset coordinate, not emitting a prompt signal to prompt the operator, and the operator continuing to move the electric drill.

The key 442 of this embodiment may be arranged on the handle of the electric drill and adjacent to the trigger. The key 442 is connected to the control module 430 of the ranging and positioning apparatus 40 in a wireless manner, so that the control module 430 may receive a clearing signal and perform a coordinate clearing operation as long as the key 442 is actuated. The advantage is that the operator may control the moving ranging and positioning apparatus 40 by one hand on the working plane W, while controlling and performing punching by the other hand holding the electric drill.

After the clearing operation, a predetermined value is input. The predetermined value may be a horizontal coordinate value, a vertical coordinate value, or both a horizontal coordinate value and a vertical coordinate value, which may be set based on working scenarios. For the ranging and positioning apparatus 40, when the ranging and positioning apparatus 40 does not reach the predetermined position, the reminding device emits an indication signal so as to prompt the operator of adjusting a moving orientation, and when the ranging and positioning apparatus 40 reaches a predetermined displacement, the ranging and positioning apparatus 40 stops emitting the indication signal.

Another alternative solution is: moving the ranging and positioning apparatus 40, until a horizontal displacement or a vertical displacement displayed by the display device 400 reaches a preset predetermined value, which indicates that a current central position of the positioning hole of the ranging and positioning apparatus 40 has been consistent with a predetermined position, that is, the ranging and positioning apparatus has reached a first hole position; punching in the first hole position again by the drill bit of the electric drill through the positioning hole; by analogy, continuing to move the ranging and positioning apparatus 40 on the working plane W so as to determine a second hole position, a third hole position, and more hole positions; and punching holes by using the electric drill.

During the specific operations, a person skilled in the art would take a first reference position or a previous hole position as a benchmark. When a reference position is selected, the clearing operation needs to be performed on the position, and subsequent hole positions are kept horizontal or vertical by taking the reference position as a benchmark.

Since an optional manner of the ranging and positioning apparatus 40 of the present invention is to move on the working plane W independently and freely, a roller or a guide wheel convenient for movement may be arranged on the ranging and positioning apparatus 40, so that the movement on the working plane W becomes sliding contact, which reduces friction between the ranging and positioning apparatus 40 and the working plane W and makes the sliding more labor-saving. The ranging and positioning apparatus 40 of the present invention may be connected to the electric drill as an accessory in a detachable manner, or may be completely combined with or integrally provided with the electric drill. When the ranging and positioning apparatus 40 works independently from the working plane after separated from the electric drill as an accessory, detecting operations and positioning and marking operations are performed firstly by using the ranging and positioning apparatus 40, and then, punching operations are performed by using a hand-held tool such as the electric drill. After the punching operations are completed, the accessory may be assembled with the electric drill again, so that the ranging and positioning apparatus 40 is easy to carry and may not be lost easily.

Certainly, a person skilled in the art would envisage that the ranging and positioning apparatus 40 is combined into the hand-held tool and may be movable relative to the hand-held tool, for example, the image sensing unit 410 of the ranging and positioning apparatus 40 may be arranged on an end portion of a support rod scalable relative to the body, and the center of the positioning hole or the positioning column is located on a same axis as the center of the output shaft of the electric drill all the time. In this way, punching operations may be implemented once the electric drill bit coaxial with the output shaft determines the reference position or the predetermined position, which is convenient and precise and avoids marking separately. After the punching operations are completed, the support rod may be retracted to a non-ranging position relative to the body without affecting the punching operations of the electric drill. Other elements of the ranging and positioning apparatus 40, such as a micro control module 450, the inertial detection unit 420, the display device 400, and a mode selection key 440, may be arranged on the body of the electric drill; particularly, the display device 400 and the positioning mode key of the mode selection key 440 may be arranged on a portion of the body of the electric drill, which is suitable for observation and convenient for operation, for example, an end face of a tail portion of the electric drill body; and the inertial sensor 420 remains parallel with or perpendicular to the axis of the output shaft of the electric drill 100*a* when mounted on the body. Therefore, the ranging and positioning apparatus 40 and the electric drill work independently from each other without influencing each other. When the ranging and positioning apparatus 40 matches a hand-held DC electric tool for use, a battery pack of the electric tool may serve as a power supply to supply power to the above-mentioned electricity utilization components, without an additional power supply.

A Fifth Embodiment

Figure 36:
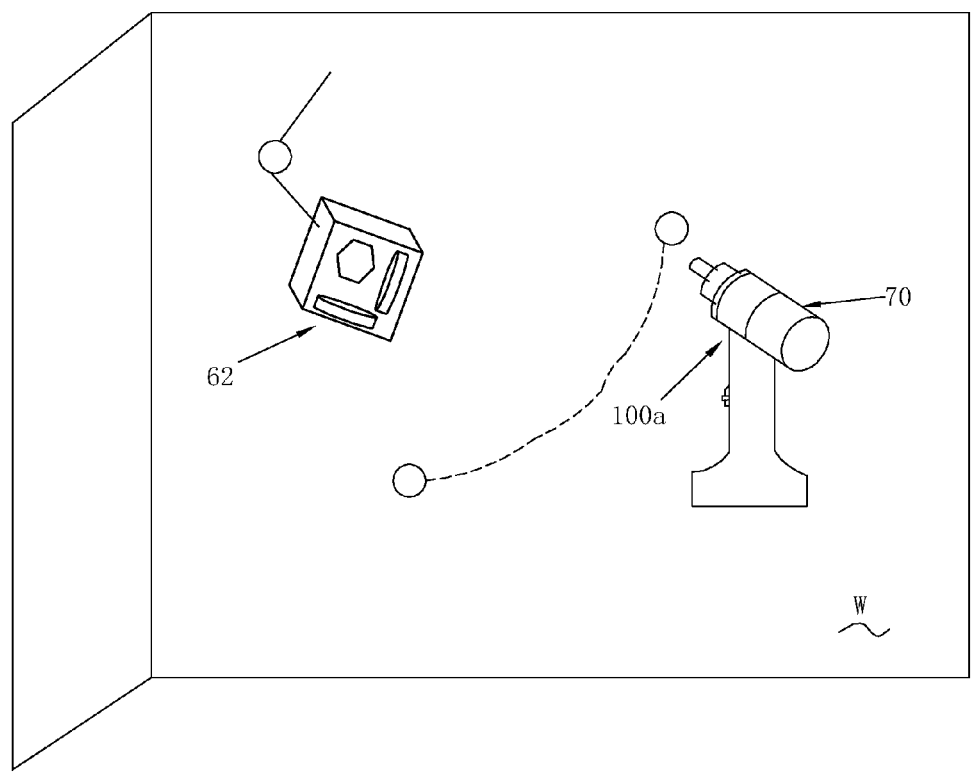
FIG. 36 is a schematic diagram of a working scenario of a positioning system in a fifth embodiment of the present invention.

Referring to FIG. 36, the ranging and positioning apparatus includes a mobile ranging apparatus 70 used with the hand-held tool 100*a* and a secondary positioning member 62 separated from the hand-held tool. The secondary positioning member of this embodiment is a light tower 62. The mobile ranging apparatus 70 is combined with the hand-held tool. The light tower 62 may be suspended, spun or supported on a working area. Initiating the light tower 62 relates to positioning and establishing a coordinate benchmark. A scanning area of the light tower 62 may cover the whole working plane W. There is no need for an arrangement of the light tower 62 to meet a requirement of a horizontal or vertical direction, that is to say, the precision of detection of the ranging and positioning apparatus may not be affected even if the light tower 62 is arranged in a tilted manner in an actual working situation. The hand-held tool is the electric drill 100*a*, and the mobile ranging apparatus 70 is moved along with the electric drill 100*a* by combining with the electric drill.

Figure 37:
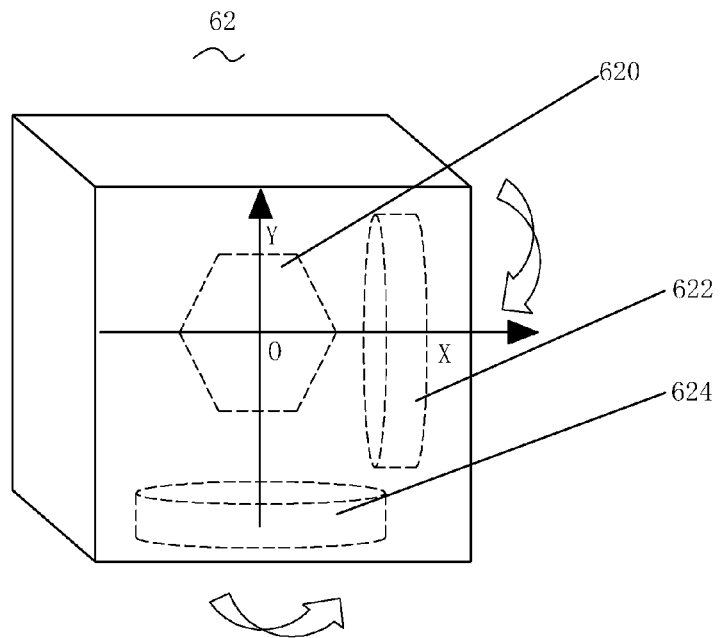
FIG. 37 is a schematic structural diagram of a secondary positioning member of FIG. 36, that is, a light tower.

Referring to FIG. 37, the light tower 62 is an important secondary positioning member for performing positioning and ranging in a specific space and is mainly configured to provide three types of laser signals, including a synchronization signal from synchronous laser 620, an X-axis rotatory scanning signal from X-axis rotatory laser beam 622, and a Y-axis rotatory scanning signal from Y-axis rotatory laser beam 624. The center of the light tower 62 is used as the origin O of an X axis and a Y axis.

Figure 38:
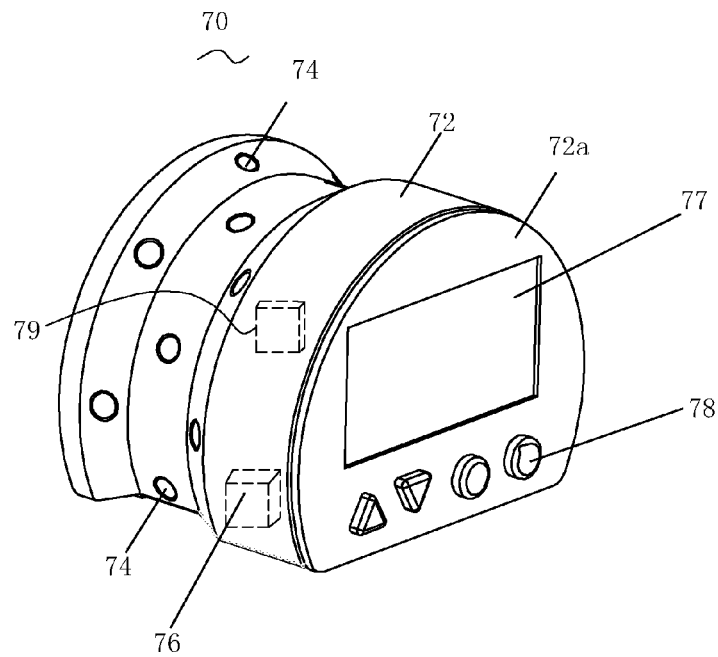
FIG. 38 is a schematic structural diagram of a mobile ranging apparatus of FIG. 36.

Referring to FIG. 38, the mobile ranging apparatus 70 includes a main body 72, a plurality of photoelectric sensors 74 distributed on the main body 72, an inertial detection unit 76 disposed in the main body 72, and a control module 79 (MCU). The main body 72 is an annular body approximately and has an end face 72*a*. The end face 72*a* has operation keys 78. A plurality of operation keys 78 are arranged on a lower side of a display screen 77. Each of the operation keys 78 corresponds to different functions and may be used for working mode selection, learning recording or clearing. There are at least three photoelectric sensors 74. The photoelectric sensor 74 generates an electric signal once scanned by a laser signal of the light tower 62. Based on the electric signal, the control module 79 acquires, by calculation an angle of departure from the X axis of the light tower and an angle of departure from the Y axis of the light tower in the scanning area for each photoelectric sensor 74 that uses the light tower 62 as the center. The inertial detection unit 76 includes a three-axis accelerometer and a three-axis gyroscope. The accelerometer is configured to detect the acceleration of a moving carrier, that is, the electric drill 100*a*, in 3 directions. The gyroscope is configured to detect the angular velocity of the hand-held tool in 3 axial directions. After fusion processing, attitude angles of the hand-held tool 100*a* may be detected precisely, including a roll angle, a pitch angle, and a heading angle. The inertial detection unit 76 is to be arranged parallel with or perpendicular to the axis of the output shaft of the electric drill 100*a* when mounted.

Figure 39:
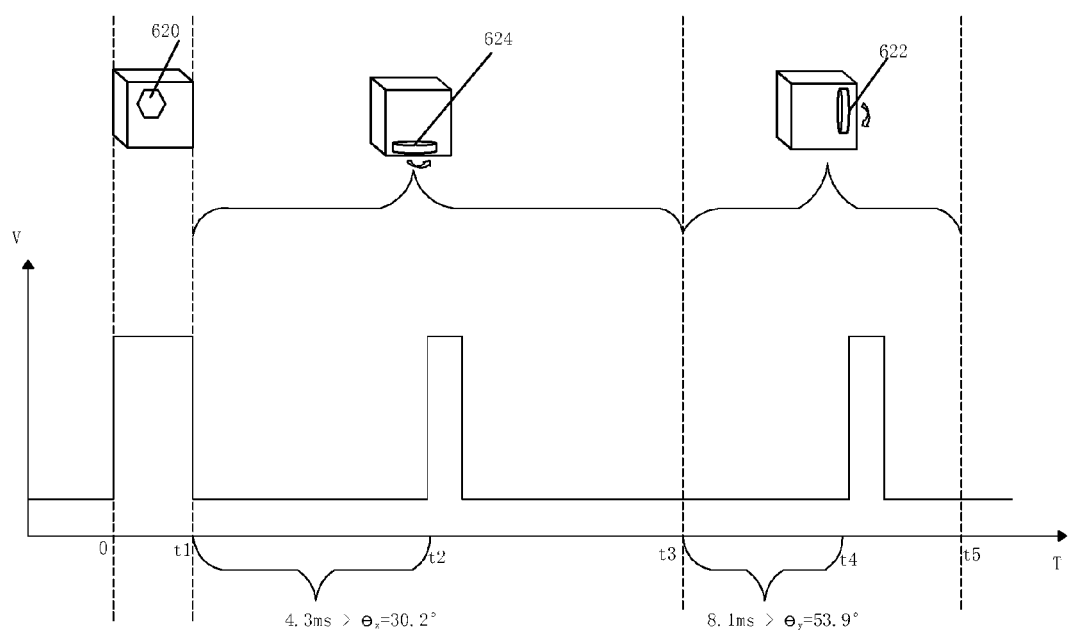
FIG. 39 is a schematic diagram of detecting scanning angles of the light tower of FIG. 37.

Referring to FIG. 39, each photoelectric sensor 74 may change in level over time under the laser irradiation of the light tower 62, and the control module 79 acquires an angle of departure from the X axis of the light tower and an angle of departure from the Y axis of the light tower based on the change in level, that is, electric signal processing. In a schematic diagram of taking a horizontal coordinate as the time T and a vertical coordinate as the voltage V, when a synchronization laser 620 of the light tower 62 starts scanning the working area, the timing of generating a high-level signal is zero, and the scanning ends after the time t1 is past. Then, the Y-axis rotatory laser beam 624 starts scanning, for example, when the photoelectric sensor 74 is scanned at the time point t2, that is, 4.3 milliseconds, the photoelectric sensor 74 generates a high-level signal, the control module 79 acquires, based on the electric signal processing, an angle of departure Ox from the X axis which is equal to 30.2 degrees, and the Y-axis rotatory laser beam 624 ends scanning after the time t3 is past. Then, the X-axis rotatory laser beam 622 starts scanning, for example, when the photoelectric sensor 74 is scanned at the time point t4, that is, 8.1 milliseconds, the photoelectric sensor 74 generates another high-level signal, the control module 79 acquires, based on the electric signal processing, an angle of departure Oy from the Y axis which is equal to 53.9 degrees, and the X-axis rotatory laser beam 622 finishes scanning after the time t5 is past.

Figure 40:
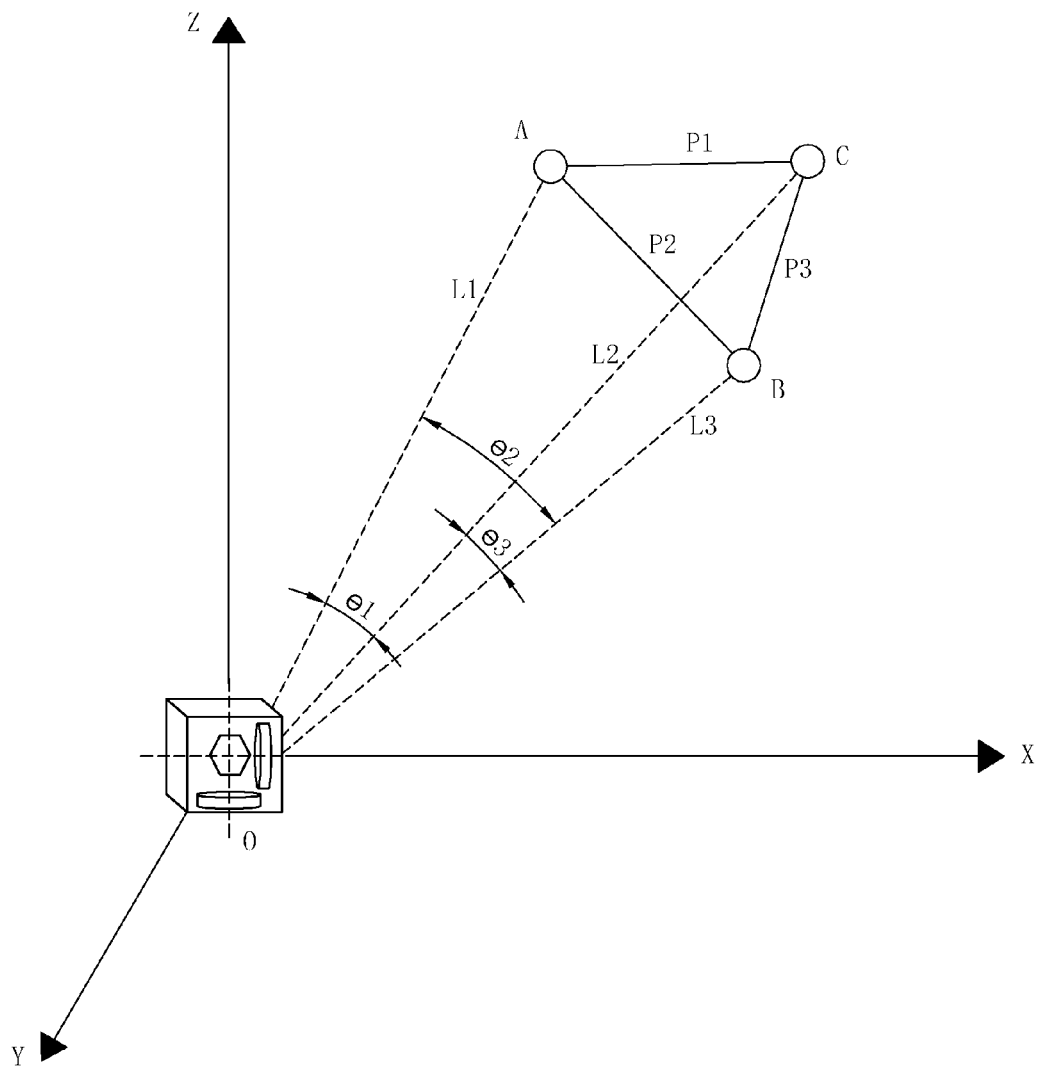
FIG. 40 is a principle diagram of ranging by the light tower of FIG. 37.

Referring to FIG. 40, the mobile ranging apparatus 70 is provided with at least three photoelectric sensors 74 thereon, positions of which are defined as A, B, and C respectively. In the scanning area of the light tower 62, each photoelectric sensor 74 may be scanned. An angle of departure $\theta_Y$ from the Y axis of the light tower and an angle of departure Ox from the X axis of the light tower are generated by the control module 79 respectively based on the electric signals fed back by each photoelectric sensor 74. The photoelectric sensors 74 of this embodiment are distributed in a plurality of planar surfaces or curved surfaces of the housing of the electric drill, which is advantageous for improving the precision of positioning. Although the mobile ranging apparatus 70 is moved along with the electric drill, since relative positions of the three photoelectric sensors 74 are fixed, distances between every two photoelectric sensors 74 are known, that is, distances P1, P2, and P3 are known. After scanning for a period, the light tower 62 may detect a direction of each photoelectric sensor 74 in a light tower coordinate system, that is, may detect, directly, an included angle of straight lines OA, OB, and OC to a plane formed by any two coordinate axes (X, Y, and Z) in a stereoscopic coordinate system, and may also acquire included angles θ1, θ2, and θ3 between axes of OA, OB, and OC by calculation directly. A linear distance L1 for OA, a linear distance L2 for OB, and a linear distance L3 for OC are acquired respectively based on the following formulas.

$f(L1,L2,\theta 1)=P1$ $f(L1,L3,\theta 2)=P2$ $f(L2,L3,\theta 3)=P3$

In addition, based on the attitude angles of the hand-held tool 100*a* detected by the inertial detection unit 76 and the angle of departure $\theta_Y$ from the Y axis of the light tower and the angle of departure $\theta_X$ from the X axis of the light tower finally acquired respectively after at least three photoelectric sensors 74 are scanned by the light tower, after data correction processing, the control module 79 calculates coordinates of each photoelectric sensor 74 in a spatial coordinate system that uses the center O of the light tower 62 as the origin. The photoelectric sensors 74 are uniformly distributed on the mobile ranging apparatus 70 and thus may determine a central point of the mobile ranging apparatus 70.

Figure 41:
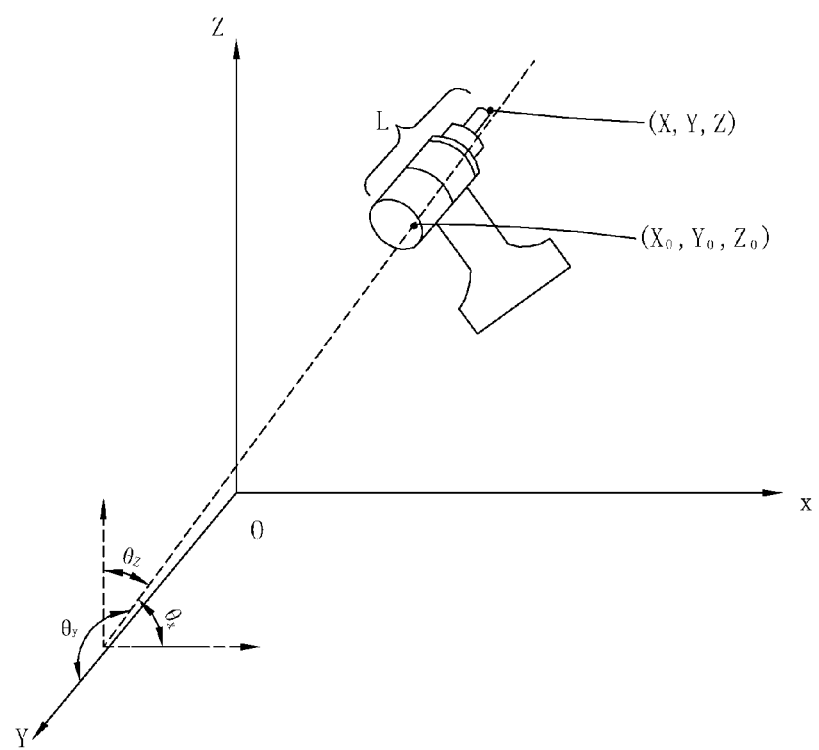
FIG. 41 is a schematic diagram of positioning coordinate correction for a mobile ranging apparatus of FIG. 36.

Referring to FIG. 36 and FIG. 41, the position of the mobile ranging apparatus 70 relative to the electric drill 100*a* is fixed, there is a linear distance L from the central point of the mobile ranging apparatus 70 to the drill bit 17, and the linear distance L may be set based on the specification or length of the drill bit. Therefore, coordinates of the central point of the mobile ranging apparatus 70 do not represent coordinates of the drill bit 17, so that correction calculation needs to be performed on three-dimensional spatial coordinates of the drill bit 17 of the hand-held tool.

Specifically, the inertial detection unit 76 detects that deflection angles of axes of the electric drill 100*a*, that is, the drill bit 17, to the positioning central point of the mobile ranging apparatus 70 are $\theta_X$, $\theta_Y$, and $\theta_Z$ respectively, so that coordinate calculation formulas for the drill bit 17 are:

$X=X_0+L^* \cos \theta_X^* \sin \theta_Y$ $Y=Y_0+L^* \cos \theta_Y^* \sin \theta_Z$ $Z=Z_0+L^* \theta_Z^*\sin \theta_X$ Therefore, spatial coordinates of the drill bit 17 of the electric drill 100*a* may be acquired based on the coordinates of the central point of the mobile ranging apparatus 70, that is to say, the drill bit 17 of the electric drill 100*a* may be positioned quickly and accurately, thereby performing punching operations on the working plane W.

In the process that the light tower 62 of this embodiment works in the working area in cooperation with the mobile ranging apparatus 70, the light tower 62 is initiated so as to perform laser scanning, the control module calculates angles of departure from the X axis and the Y axis $\theta_X$ and $\theta_Y$ for various photoelectric sensors respectively, and then, the linear distances L1, L2, and L3 of various photoelectric sensors from the coordinate origin are acquired by calculation based on the formulas. The inertial detection unit 76 initiates working and detects attitude angles of the electric drill 100*a*. The control module 79 performs correction processing based on the attitude angles and the angles of departure from the X axis and the Y axis $\theta_X$ and $\theta_Y$ and acquires an angle to the horizontal plane $\theta_{Y'}$ and an angle to the vertical plane Ox respectively. Finally, positioning is performed after the spatial coordinates of the central point of the mobile ranging apparatus 70 in a horizontal coordinate system are acquired by calculation based on the acquired linear distances L1, L2, and L3 of various photoelectric sensors from the coordinate origin and the angles $\theta_{Y'}$ and $\theta_{X'}$, and correction calculation is performed on the three-dimensional spatial coordinates of the drill bit 17.

Figure 42:
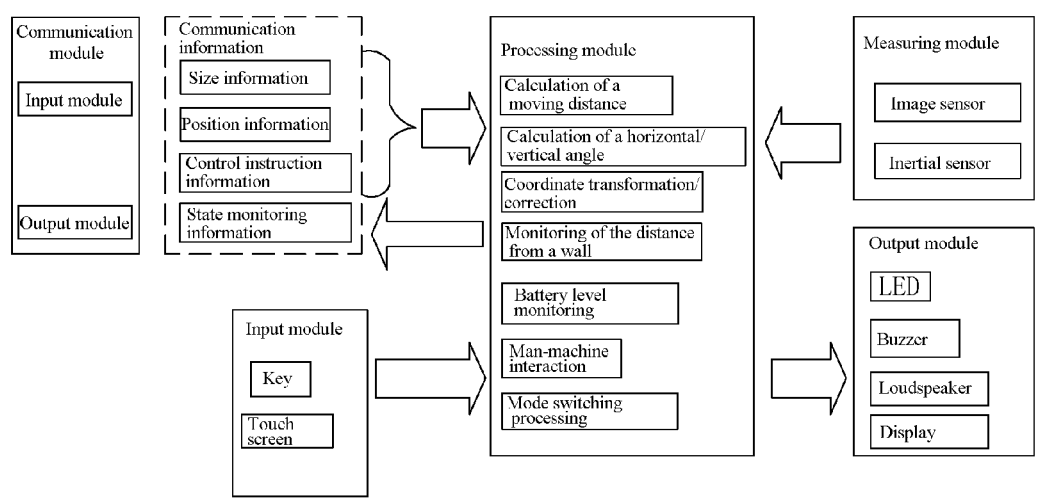
FIG. 42 is a schematic diagram of communication information and control between a mobile ranging apparatus of FIG. 36 and an intelligent apparatus.

Referring to FIG. 42, a light tower ranging and positioning apparatus which may be in communication association with an intelligent apparatus is also involved in the hand-held tool system. The light tower ranging and positioning apparatus of this embodiment has a similar structure to that of the above laser ranging and positioning apparatus and optical mouse positioning apparatus configured to be in communication association with an intelligent apparatus.

For ease of description, the same structure will not be described further. The difference shows in that the measuring module of the light tower ranging and positioning apparatus includes a photoelectric sensor and an inertial sensor and is configured to detect movement and/or state parameters of the mobile ranging apparatus. The processing of the processing module includes calculation of three-dimensional coordinates of the sensors, calculation of a horizontal and/or vertical angle, coordinate transformation and/or correction, etc. The position information includes three-dimensional coordinates of a picture frame hook. The control instruction information includes a tolerance of the number of active sensors. The state monitoring information includes a battery level, the remaining working time, a current working attitude angle of the mobile ranging apparatus, the number of current active sensors, and determining whether the active sensors are within the scanning area of the light tower.

Figure 43:
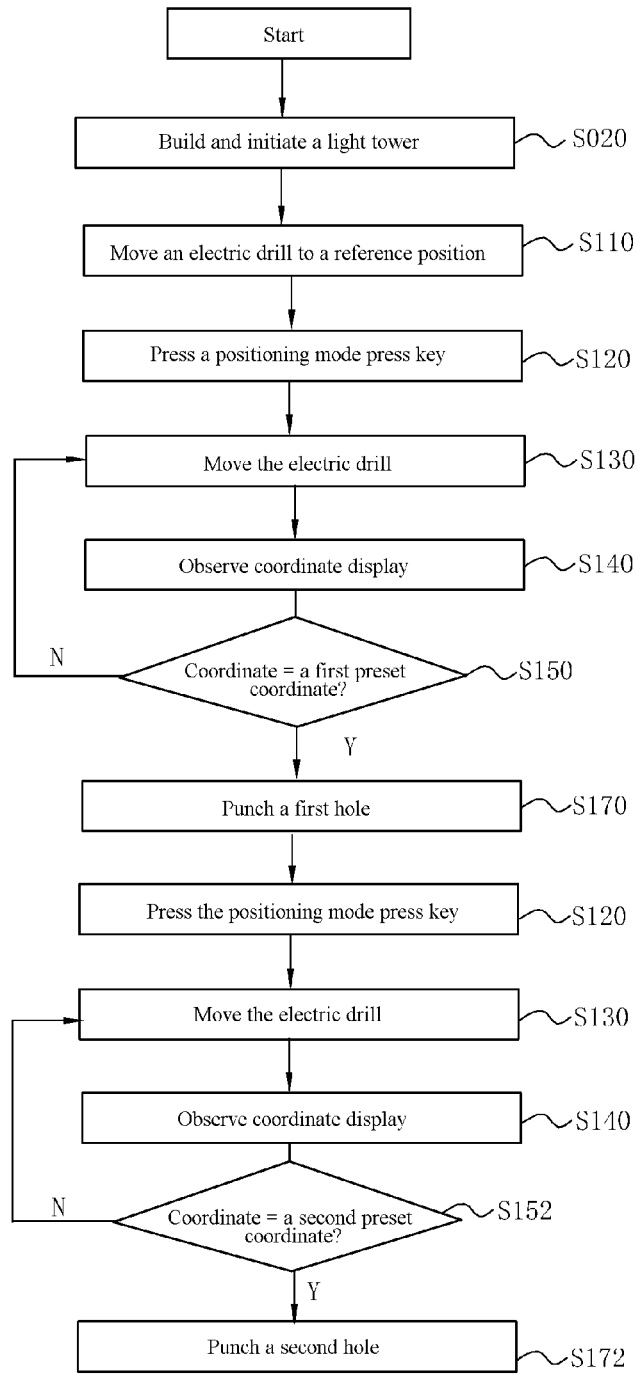
FIG. 43 is a flowchart of punching, by the electric drill of FIG. 36 under a human-assisted determining mode, a first hole by taking a reference position as a benchmark and a second hole by taking a first hole position as a benchmark.

Referring to FIG. 43, ranging and positioning as well as punching may be performed on the working plane W by using the electric drill with the mobile ranging apparatus 70 as well as the light tower 62 that is used as a secondary positioning member, and the positioning may be observed in real time through the display screen. An operation flow of punching a first hole by taking a reference position as a benchmark and a second hole by taking a first hole position as a benchmark under the human-assisted mode is introduced below: step S020, building and initiating a light tower; step S110, moving an electric drill to a reference position; step S120, pressing a positioning mode key so as to record a coordinate of a reference point with the positioning mode key; step S130, moving the electric drill so as to move a mobile ranging apparatus together; step S140, observing coordinate display on a display screen; step S150, determining whether the coordinate display is consistent with a preset predetermined coordinate, if so, indicating that the electric drill has been moved to a predetermined position, and if not, continuing to move the electric drill until the coordinate display is consistent with the preset predetermined coordinate; and step S170, punching a first hole in the predetermined position. If a second hole needs to be punched, the following operation steps are performed: S120, pressing the positioning mode key in a first hole position; step S130, moving the electric drill; step S140, observing coordinate display on the display screen; step 152, determining whether the coordinate display is consistent with a preset second predetermined coordinate, if so, indicating that the electric drill has been moved to the predetermined position, and if not, continuing to move the electric drill until the coordinate display is consistent with the preset second predetermined coordinate; and step S172, punching a second hole in the predetermined position. If more holes need to be punched, for example, a third hole, a fourth hole, and so on, operations may be performed based on the above method.

Figure 44:
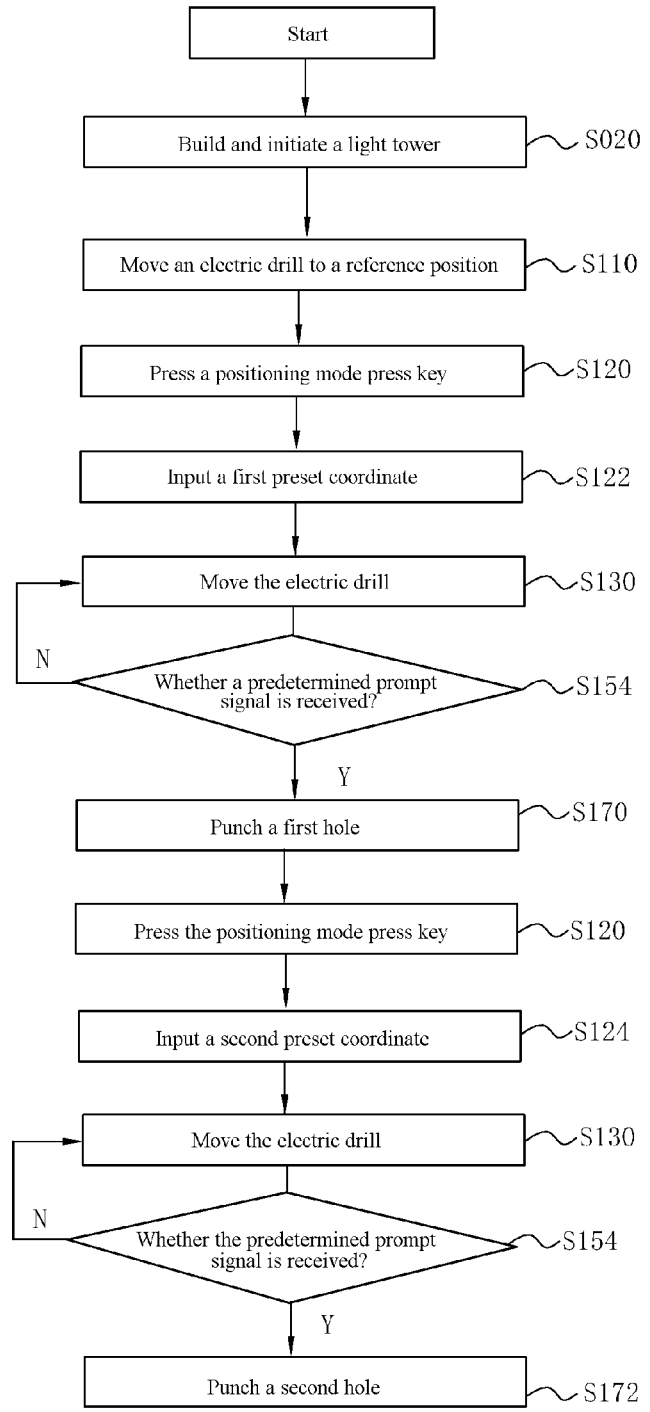
FIG. 44 is a flowchart of punching a first hole and a second hole by an electric drill of FIG. 36 under an intelligent determining mode by inputting a preset working coordinate.

Referring to FIG. 44, FIG. 44 shows an operation flow of punching a first hole and a second hole by the electric drill under the intelligent determining mode by inputting a preset working coordinate. The difference from the human-assisted mode mainly lies in that working coordinates are determined by inputting the working coordinate, and when the electric drill is moved to a real-time coordinate consistent with the preset working coordinate, the operator may be reminded in an intelligent reminding manner. Specifically, the operation flow includes the following steps: step S020, building and initiating a light tower; step S110, the user holding an electric drill by hand and moving the electric drill to a reference position; step S120, pressing a positioning mode key; step S122, inputting a first preset coordinate; step S130, moving the electric drill; step S154, determining whether a preset prompt signal is received, where if it is observed that an LED lamp is lit up or it is heard that a buzzer produces a sound, it indicates that the electric drill has been moved to a predetermined punching position; and step S170, punching a first hole in the predetermined position. When a second hole needs to be punched, the following steps are performed: step S120, pressing the positioning mode key by taking the first hole as a benchmark; step S124, inputting a second preset working coordinate; step S130, moving the electric drill again; step S154, determining whether the preset prompt signal is received; and finally, step S172, punching a second hole in a second preset predetermined position, and so on.

Figure 45:
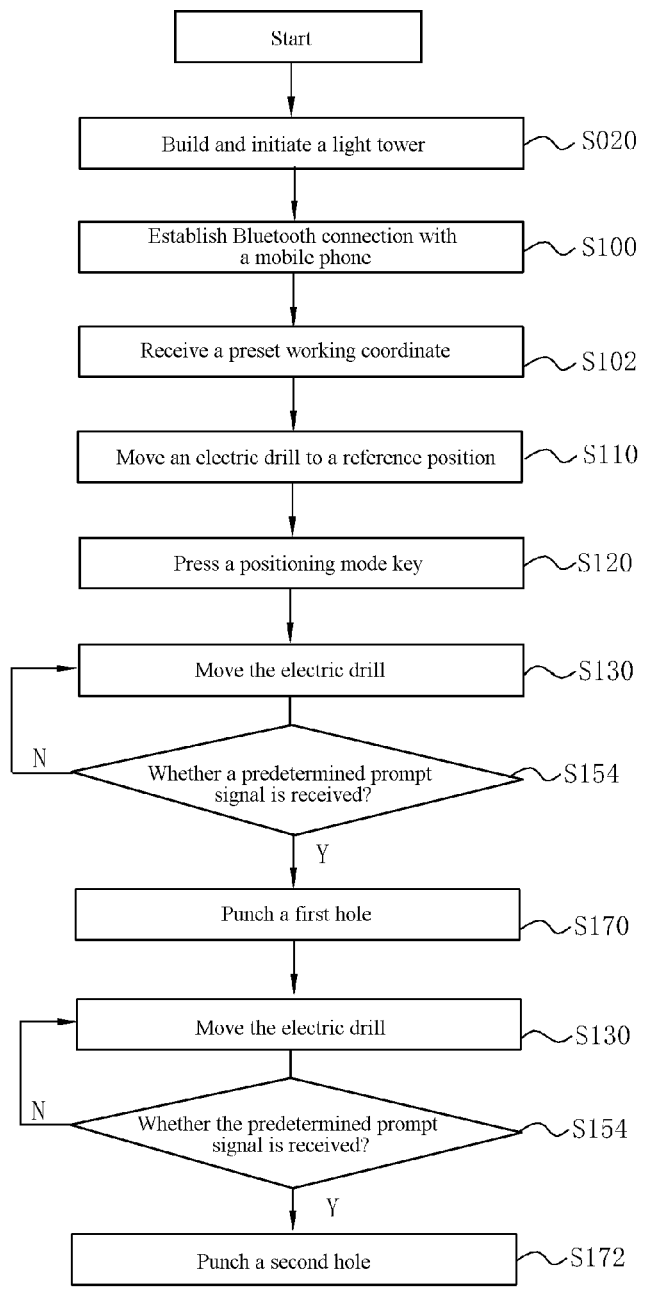
FIG. 45 is a flowchart of punching a first hole and a second hole by an electric drill of FIG. 36 under an intelligent determining mode by receiving a preset working coordinate from a mobile phone.

Referring to FIG. 45, FIG. 45 shows an operation flow of punching a first hole and a second hole by the electric drill under the intelligent determining mode by receiving a preset working coordinate from a mobile phone. The differences from the flow shown in FIG. 40 lie in: establishing communication connection with the electric drill through an external mobile apparatus, for example, a smart phone; and inputting a series of preset coordinates or coordinate data of a next punching point relative to the origin into the mobile apparatus, so that the ranging and positioning apparatus of the electric drill receives the preset working coordinate from the mobile phone. The operation flow includes: step S020, building and initiating a light tower; step S100, establishing Bluetooth connection with a mobile phone; step S102, receiving a preset working coordinate from the mobile phone, where the preset working coordinate may include a series of coordinates, that is, coordinates of a plurality of consecutive punching positions; step S110, moving an electric drill to a reference position; step S120, pressing a positioning mode key; step S130, moving the electric drill; step S154, determining whether the preset prompt signal is received, where if it is observed that an LED lamp is lit up or it is heard that a buzzer produces a sound, it indicates that the electric drill has been moved to a predetermined punching position; and step S170, a user punching a first hole. If a second hole is to be punched, the following steps are performed: step S120, pressing the positioning mode key by taking the first hole as a benchmark; step S130, moving the electric drill again; step S154, determining whether the preset prompt signal is received; and finally, step S172, punching a second hole in a second preset predetermined position, and so on.

Figure 46:
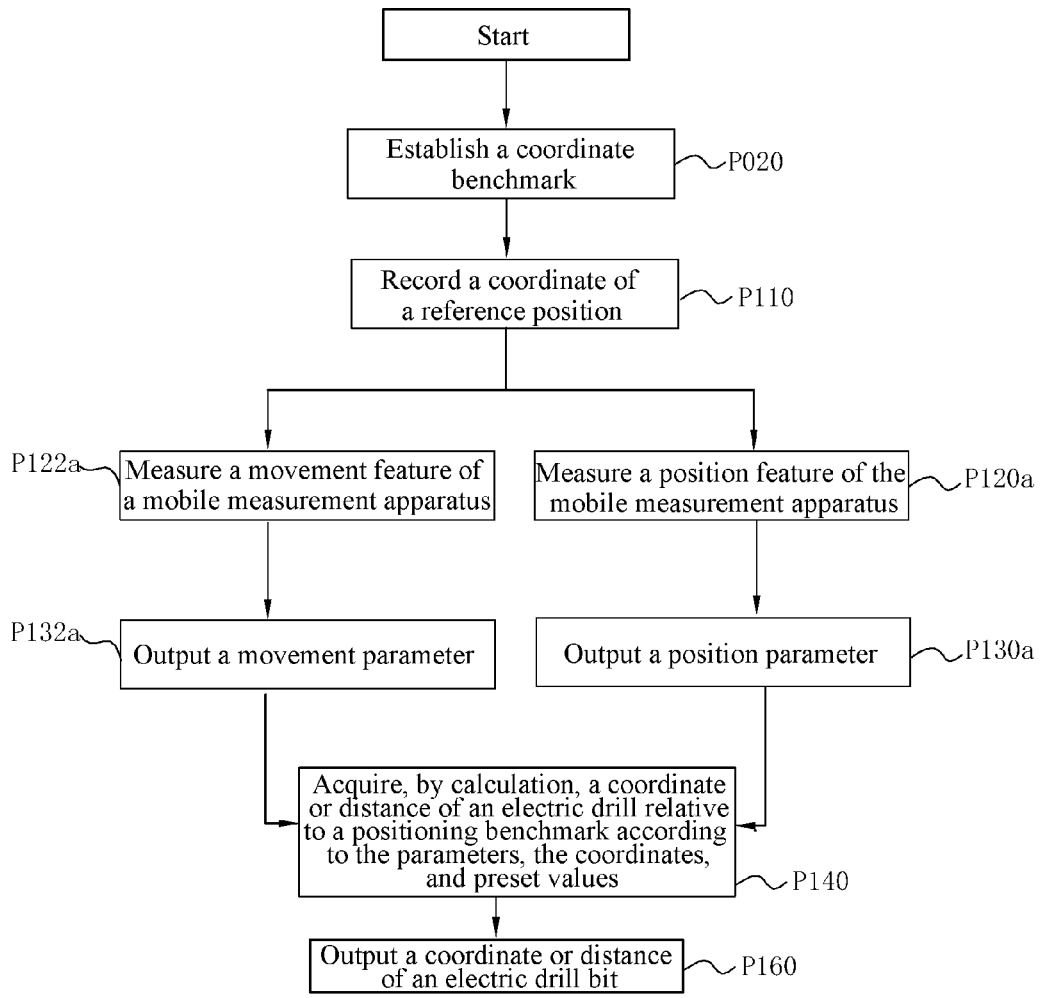
FIG. 46 is a working flowchart of the ranging and positioning apparatus of FIG. 36 under the human-assisted determining mode.

Referring to FIG. 46, an operation flow for the secondary positioning member of the ranging and positioning apparatus and the mobile ranging apparatus combined into the electric drill under the human-assisted determining mode includes: step P020, establishing a coordinate benchmark, that is to say, the coordinate benchmark is established once the secondary positioning member, that is, a light tower, built on the working area is initiated; step P110, a control module (MCU) recording a coordinate of a reference position when an operator performs the step of "pressing a positioning mode key" in the reference position; when a user moves the electric drill, performing step P120a of measure a movement feature of the mobile ranging apparatus in real time, and step P130a of outputting a movement parameter; simultaneously performing step P122a of measure a position feature of the mobile ranging apparatus in real time, and step P132a of outputting a position parameter; then, performing step P140 of a controller acquiring a coordinate or distance of the electric drill bit relative to the reference position by calculation via an algorithm based on the recorded coordinate of the reference position, the detected position and movement parameters, and a preset distance between the electric drill bit and the positioning apparatus, that is, correcting the coordinate of the positioning apparatus to be the coordinate or distance of the electric drill bit; and finally, performing step P160 of outputting the coordinate or distance on a display screen, which is the current coordinate or distance of the electric drill bit after correction.

Figure 47:
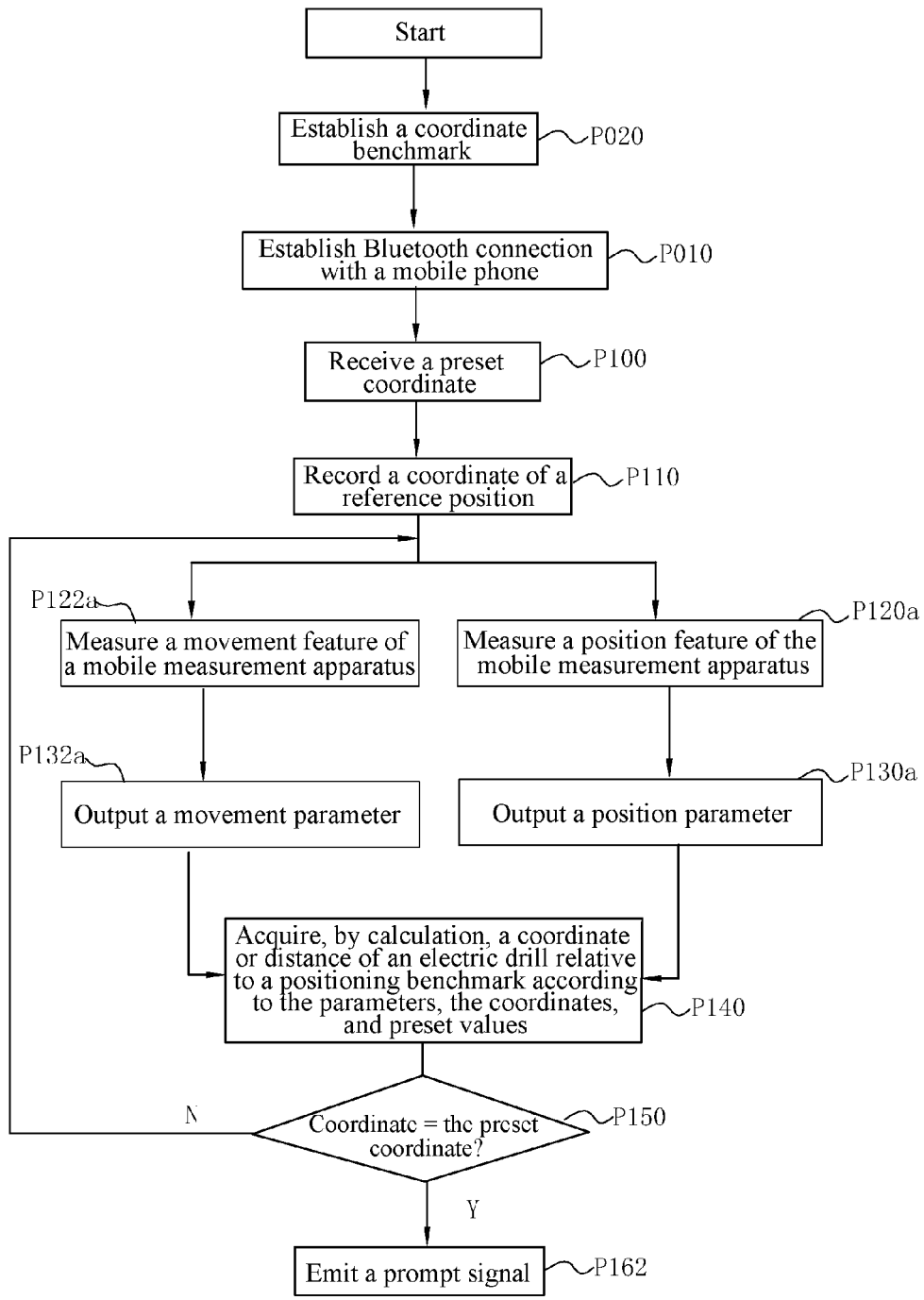
FIG. 47 is a working flowchart of a ranging and positioning apparatus of FIG. 36 being associated with an intelligent apparatus under an intelligent determining mode.

Referring to FIG. 47, an operation flow of the secondary positioning member of the ranging and positioning apparatus and the mobile ranging apparatus combined into the electric drill being associated with an intelligent apparatus under the human determining mode includes: step P020, establishing a coordinate benchmark; step P010, establishing Bluetooth connection with a smart phone; step P100, receiving a preset coordinate transmitted from the smart phone; and step P110, when the electric drill is moved to a reference position, an operator pressing a positioning mode key, and when a user moves the electric drill, an inertial sensor performing the following operations respectively: step P120a, measure a movement feature of the mobile ranging apparatus in real time, and step P130a, outputting a movement parameter; simultaneously performing step P122a of measure a position feature of the mobile ranging apparatus in real time, and step P132a of outputting a position parameter; then, performing step P140 of a controller acquiring a coordinate or distance of the electric drill bit relative to the reference position by calculation via an algorithm based on the recorded coordinate of the reference position, the detected position and movement parameters, and a preset distance between the electric drill bit and the positioning apparatus, that is, correcting the coordinate of the positioning apparatus to be the coordinate or distance of the electric drill bit; step 150, a control module performing comparison and determining on a real-time coordinate acquired by calculation and a preset coordinate received; if it is determined that the real-time coordinate is equal to the preset coordinate, performing step P162 of a reminding device emitting a prompt signal so as to indicate that the electric drill has been moved to a predetermined position; and if the control module determines that the real-time coordinate is not equal to the preset coordinate, not emitting a prompt signal to prompt the operator, and the operator continuing to move the electric drill.

A Sixth Embodiment

Figure 48:
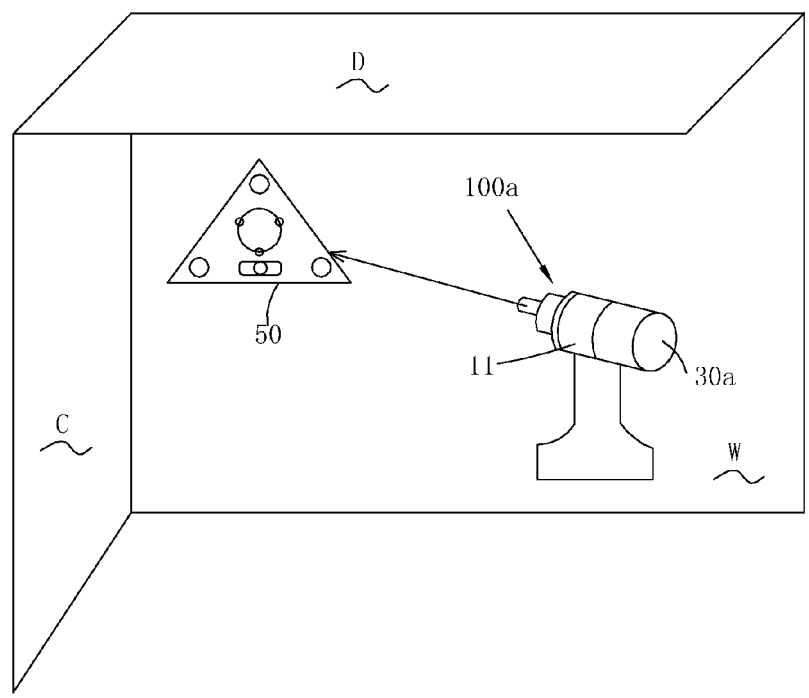
FIG. 48 is a schematic diagram of a working scenario of a positioning system in a sixth embodiment of the present invention.
Figure 49:
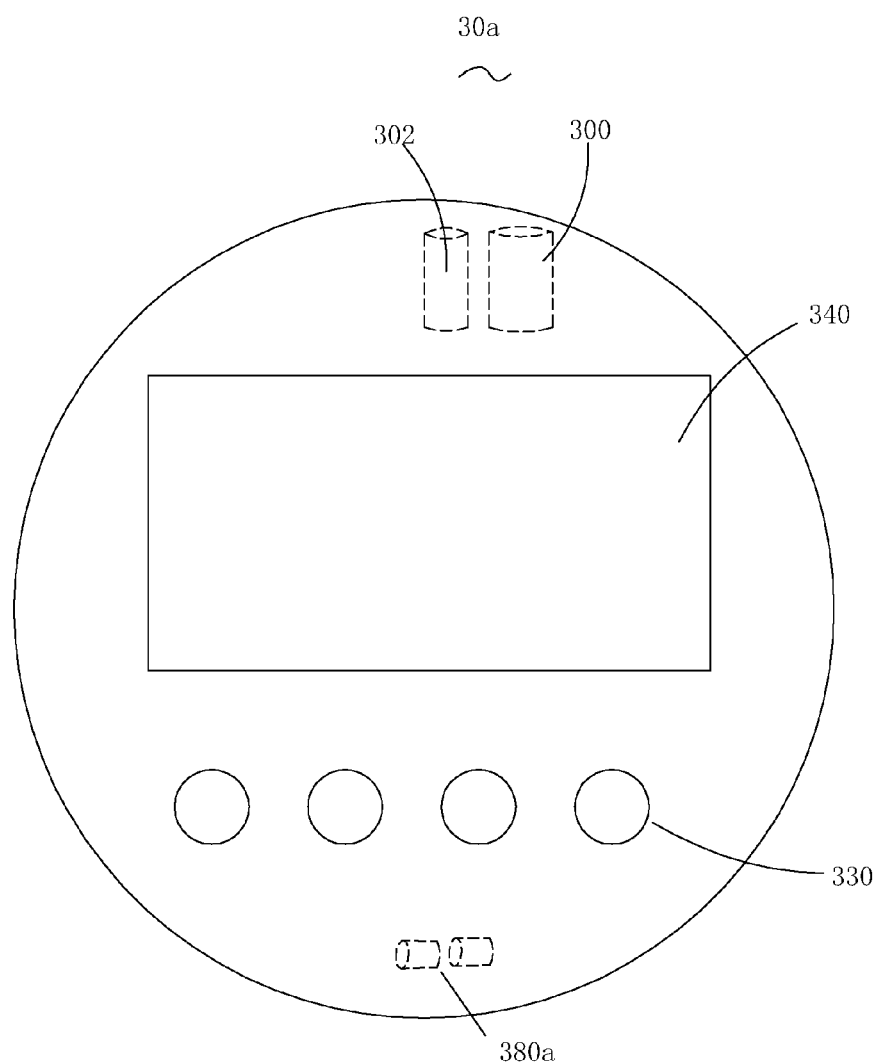
FIG. 49 is a schematic structural diagram of a mobile ranging apparatus combined with an electric drill of FIG. 48.
Figure 50:
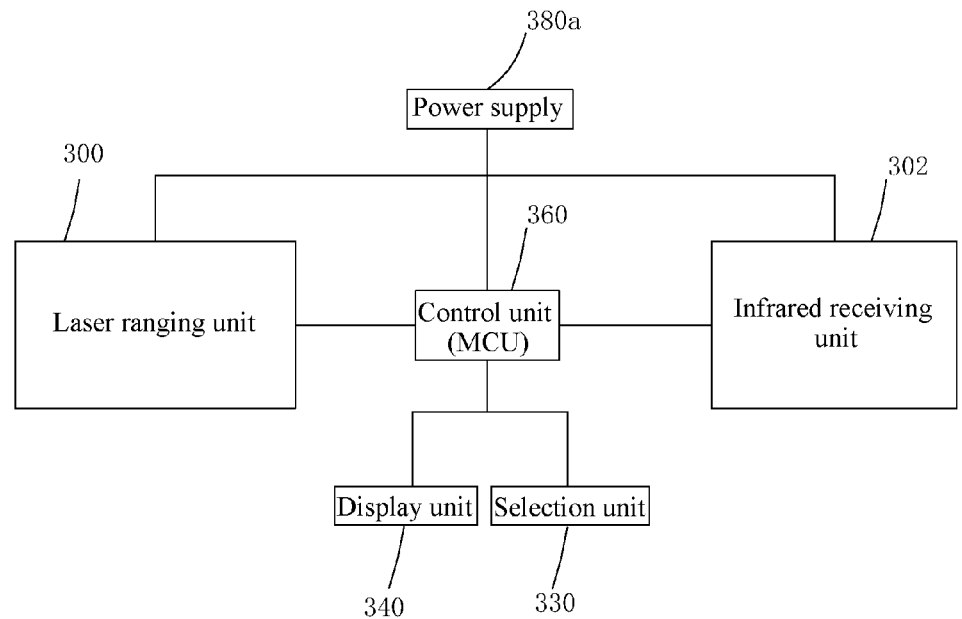
FIG. 50 is a schematic diagram of a functional structure of the mobile ranging apparatus of FIG. 49.

Referring to FIG. 48 to FIG. 50, the ranging and positioning apparatus includes a secondary positioning member 50 movably positioned on a vertical wall, that is, the working plane W, and a mobile ranging apparatus 30a. The mobile ranging apparatus 30a is combined into a body 11 of the electric drill 100a. The mobile ranging apparatus 30a includes at least one laser ranging unit 300, an infrared receiving unit 302, a display device 340, a positioning mode key 330, a control module 360, and a power supply 380a. The laser ranging unit 300 and the infrared receiving unit 302 of the mobile ranging apparatus 30a are connected in positions on the body of the electric drill close to the top of the electric drill, where the laser ranging unit 300 is arranged perpendicular to the electric drill bit axis; and the infrared receiving unit 302 is arranged parallel with the laser ranging unit 300. The positioning mode key 330 and the display device 340 are arranged at a tail end portion of the electric drill so as to facilitate the observation and operation of the operator. The display device 340 of the embodiments of the present invention is a liquid crystal display, and the control module is a microprocessor (MCU).

Figure 51:
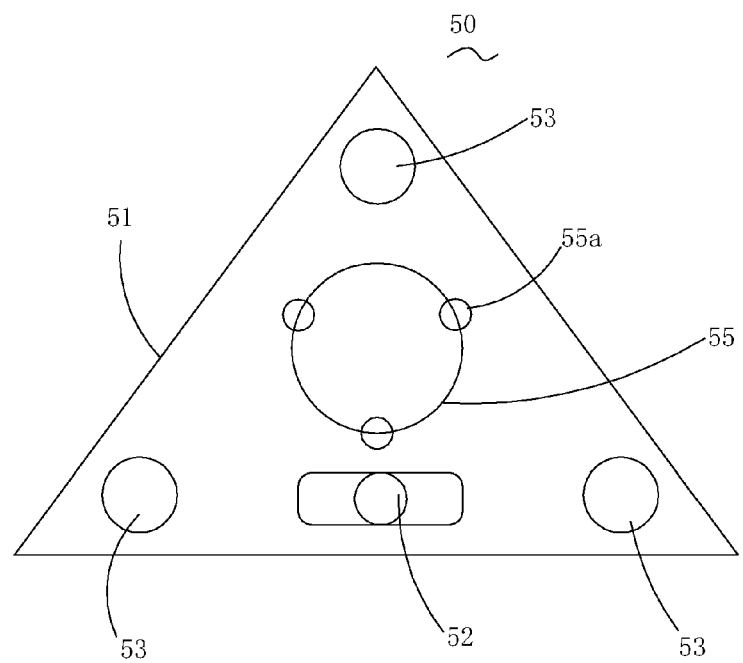
FIG. 51 is a schematic structural diagram of a secondary positioning member of FIG. 48.

Referring to FIG. 48 and FIG. 51, the secondary positioning member 50 defines a positioning benchmark. The secondary positioning member of this embodiment includes a base 51 in the form of an equilateral triangle approximately and light guide posts 53 that are arranged on three vertexes of the equilateral triangle respectively and is configured to detect a laser signal emitted by the laser ranging unit 300. The secondary positioning member 50 includes a level gauge bubble or an inertial sensor for providing a horizontal benchmark of the secondary positioning member 50, that is to say, the light guide posts 53 distributed in the form of a triangle are guaranteed to be located in the same horizontal plane. A level gauge bubble 52 is shown in FIG. 51 for providing the horizontal benchmark. An infrared transmitters 55 is arranged at a central position of the base 51 and includes three infrared transmitting tubes 55a uniformly distributed circumferentially. The infrared transmitting tubes 55a may transmit infrared signals towards all directions.

Figure 52:
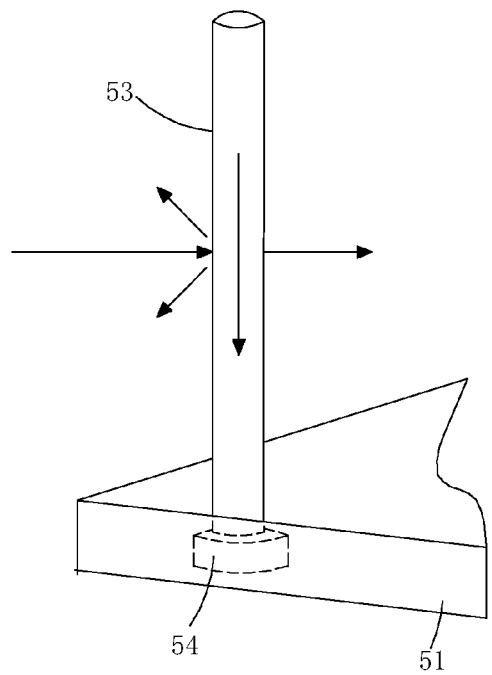
FIG. 52 is a partially enlarged stereoscopic schematic diagram of a secondary positioning member of FIG. 48.
Figure 53:
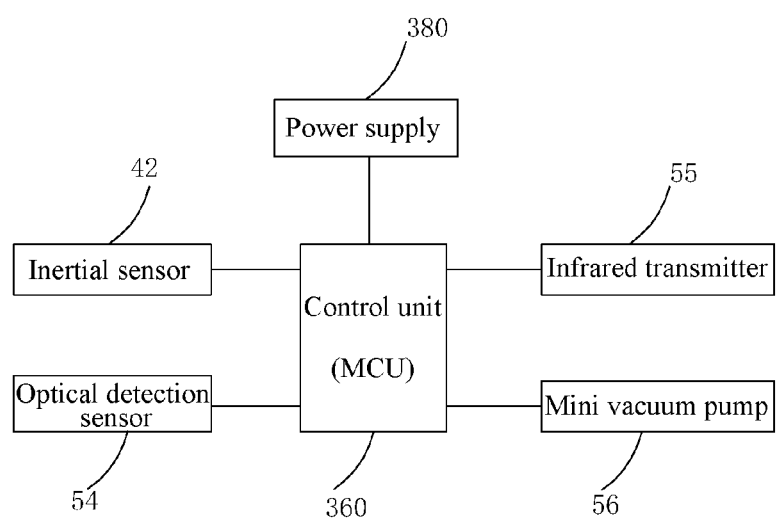
FIG. 53 is a schematic diagram of a functional structure of the secondary positioning member of FIG. 51.

Referring to FIG. 52 and FIG. 53, the light guide posts 53 extend perpendicular to the base 51 respectively. End portions, which are close to the base 51, of the light guide post 53 are provided with optical detection sensors 54 respectively. The light guide post 53 may guide light rays perpendicular to a cylindrical surface of the light guide post to the optical detection sensor 54. The secondary positioning member 50 further includes a suction device for suctioning the secondary positioning member 50 onto the working plane W, for example, a suctioning disc or a mini vacuum air pump. The control module 360 is a microprocessor (MCU) and is electrically connected to an inertial sensor 42, an optical detection sensor 54, an infrared transmitter 55, and a mini vacuum pump respectively. The power supply 380 provides electric energy for these electronic devices. The power supply 380 is a rechargeable battery. The level gauge bubble 52 is replaced with the inertial sensor 42 and is configured to provide the horizontal benchmark of the secondary positioning member 50.

The laser ranging unit 300 transmits a laser of a fixed wavelength and performs ranging based on the time interval detected between transmitting and returning of the laser. The infrared receiving unit 302 is configured to receive the infrared signal transmitted from the infrared transmitter 55. When the laser transmitted from the laser ranging unit 300 irradiates onto the laser guide post 53 and the optical detection sensor 54 detects the fixed wavelength of the laser transmitted from the laser ranging unit, an infrared signal is transmitted from the infrared transmitter 55. The infrared signal includes a marked signal of the light guide post 53, such that the mobile ranging apparatus 30a may identify a position of a corresponding light guide post and detect the distance from the light guide post 53.

Figure 54:
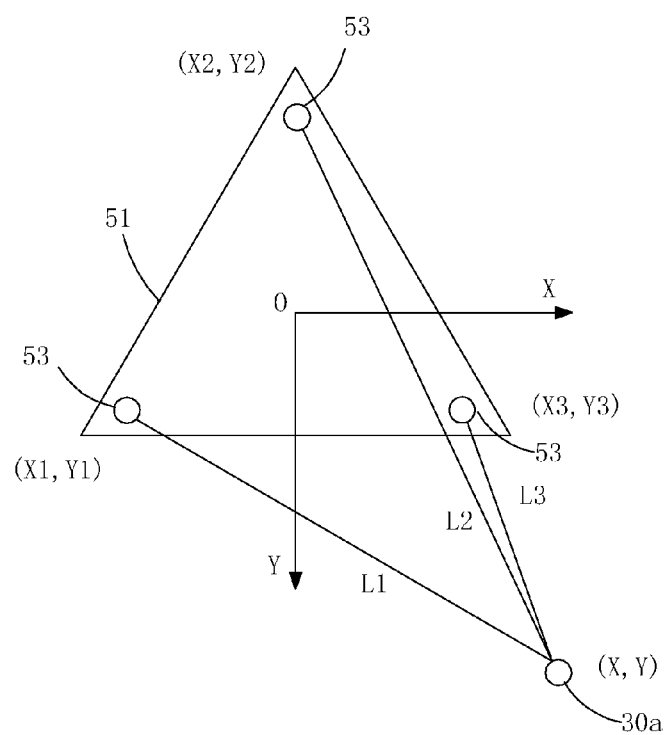
FIG. 54 is a schematic diagram of two-dimensional coordinate calculation of the positioning system of FIG. 48.

Referring to FIG. 54, in the process of detecting and positioning, the secondary positioning member 50 is positioned on the working plane W, so as to confirm an X and Y two-dimensional axis coordinate benchmark O in the working plane. For the hand-held electric drill 100a, a front end face of the chuck of the electric drill 100a is enabled to fit the working plane W. The body 11 is rotated relative to the chuck, such that the laser ranging unit 300 is perpendicular to the light guide post 53, that is, the laser transmitted from the laser ranging unit 300 scans the three light guide posts 53 in a perpendicular manner. When the optical detection sensor 54 detects the fixed wavelength of laser ranging, an infrared signal is transmitted by the infrared transmitter 55. The infrared receiving unit 302 receives the infrared signal transmitted by the infrared transmitter 55. The control module of the mobile ranging apparatus 30*a* automatically calculates and displays two-dimensional coordinate values of the three guide posts 53 that use the coordinate benchmark O as a reference and are (x1, y1), (x2, y2), and (x3, y3) respectively.

In this embodiment, the chuck is configured to clamp the working head, for example, a drill bit, a screwdriver bit, etc. A central line of the chuck is in line with a central line of the working head. When the body 11 rotates relative to the chuck around the central line, the mobile ranging apparatus 30*a* also rotates around the central line, thereby ensuring that the working head and the mobile ranging apparatus 30*a* have the same coordinate values in a two-dimensional coordinate system of the working plane W. In some other working planes, for example, a horizontal plane, the user may adjust X and the Y axes as needed in an XOY two-dimensional coordinate system provided by a coordinate base. Since the coordinate base is stable in structure, if coordinates of the three guide posts 53 are known to be (x1, y1), (x2, y2), and (x3, y3), the distances L1, L2, and L3 of the guide posts 53 each from the mobile ranging apparatus 30*a* may be detected in the operation process, that is, may be calculated based on the following formulas:

$$(x-x1)2+(y-y1)2=L12$$

$$(x-x2)2+(y-y2)2=L22$$

$$(x-x3)2+(y-y3)2=L32$$

Therefore, coordinate values (x, y) of the mobile ranging apparatus 30*a* within the working plane W are acquired. By using such a ranging manner, the user may perform working, for example, punching, cutting, and the like, on a plane such as a vertical wall and a wood plate, may implement two-dimensional positioning within the working plane and may be assisted in completing operations such as linear cutting, isometric punching, and positioning and drilling, which is convenient, efficient, and easy to use, with high precision.

A Seventh Embodiment

Figure 55:
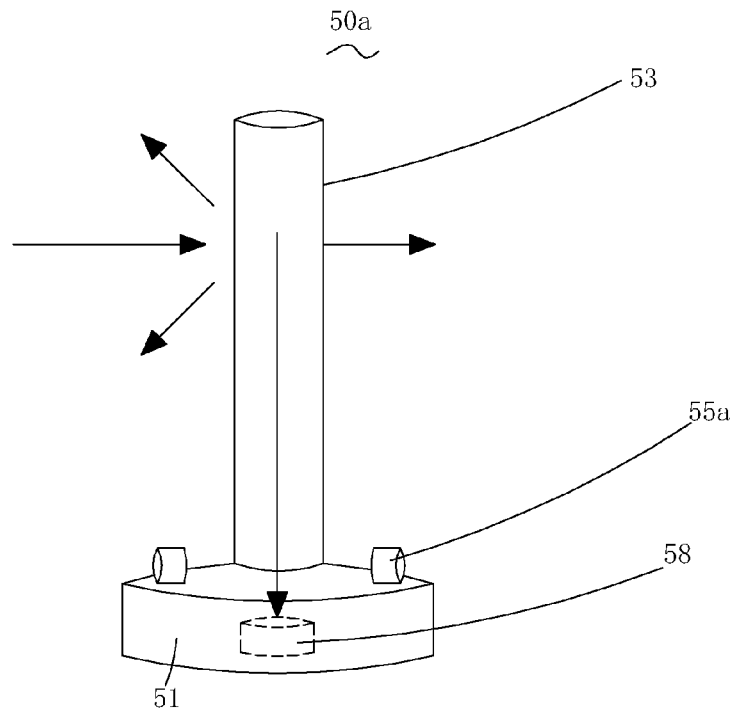
FIG. 55 is a schematic structural diagram of a secondary positioning member in a seventh embodiment of the present invention.
Figure 56:
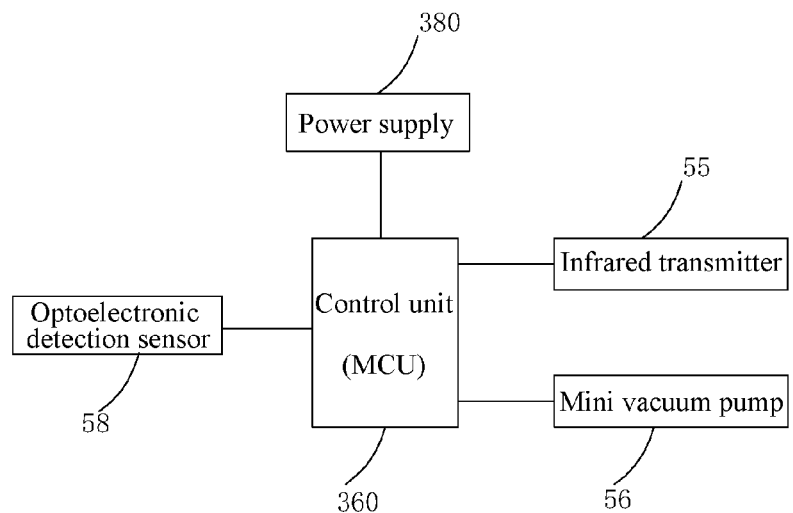
FIG. 56 is a schematic diagram of a functional structure of the secondary positioning member of FIG. 55.
Figure 57:
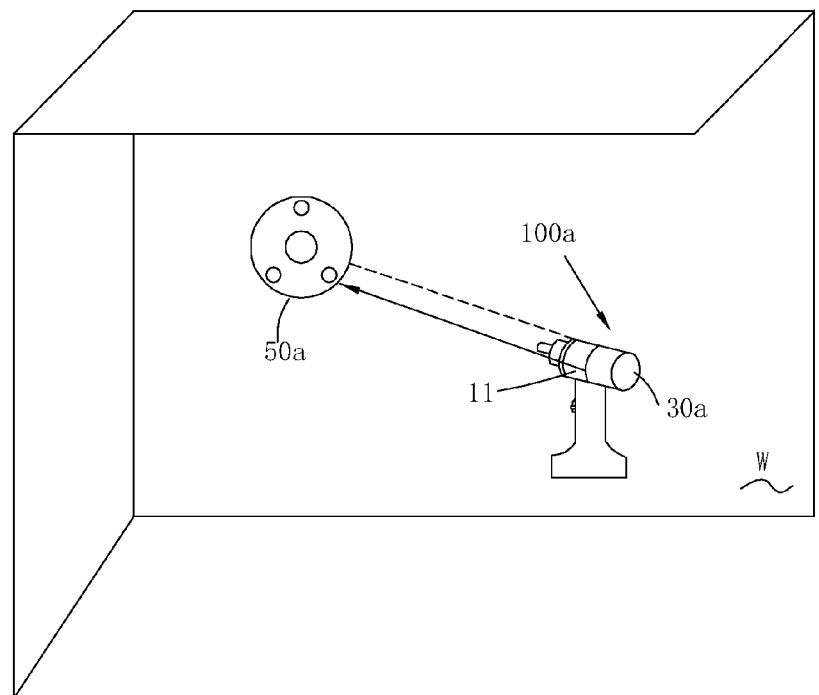
FIG. 57 is a schematic diagram of a working scenario of the secondary positioning member of FIG. 55.

Referring to FIG. 55 and FIG. 57, a simple variation of the secondary positioning member 50 in the sixth embodiment is shown and has a similar structure. The difference lies in that the secondary positioning member 50*a* in this embodiment has a single light guide post 53. A base 51 of the secondary positioning member 50*a* is also disc-shaped approximately. The single light guide post 53 is located in the center of the base 51 and extends perpendicular to the base 51. An infrared transmitter 55 is arranged on the base 51. In this embodiment, the infrared transmitter 55 includes a plurality of infrared transmitting tubes 55*a* and may transmit infrared signals towards all directions. An optoelectronic detection sensor 58 is disposed within the base 51 and is configured to detect a laser signal. The light guide post 53 may guide light rays perpendicular to a cylindrical surface to the optical detection sensor 58 that is located on an end portion of the light guide post 53. The secondary positioning member 50*a* also includes a suction device (not shown) that suctions the secondary positioning member 50*a* onto the working plane W, for example, a suctioning disc or a mini vacuum air pump. The control module 360 is a microprocessor (MCU) and is electrically connected to an optical detection sensor 54, an infrared transmitter 55, and a mini vacuum pump 56 respectively. The power supply 380 provides electric energy for these electronic devices. The power supply 380 is a rechargeable battery.

Figure 58:
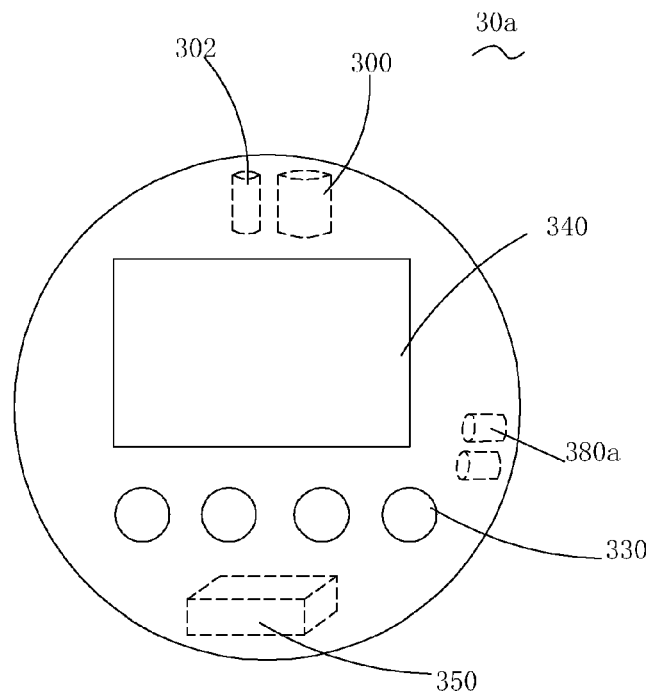
FIG. 58 is a schematic structural diagram of a mobile ranging apparatus of FIG. 57.
Figure 59:
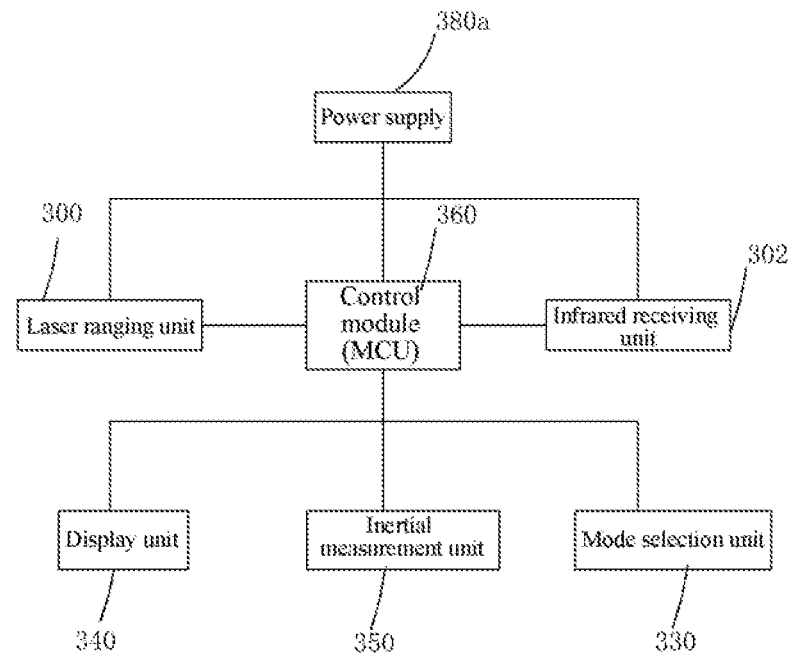
FIG. 59 is a schematic diagram of a functional structure of a mobile ranging apparatus of FIG. 57.

Referring to FIG. 57 to FIG. 59, the mobile ranging apparatus 30*a* is combined into the body 11 of the electric drill 100*a*. The mobile ranging apparatus 30*a* includes at least one laser ranging unit 300, an infrared receiving unit 302, a display device 340, a mode selection key, an inertial detection unit 350, a control module 360, and a power supply 380. Similar to the sixth embodiment, the laser ranging unit 300 is arranged perpendicular to an electric drill bit axis, and the infrared receiving unit 302 is arranged parallel with the laser ranging unit 300. The inertial detection unit 350 is arranged within the body and remains parallel with or perpendicular to the axis of the output shaft of the electric drill. The mode selection key 330 and the display device 340 are arranged at a tail end portion of the electric drill so as to facilitate the observation and operation of the operator. The display device 340 of the embodiments of the present invention is a liquid crystal display, the control module is a microprocessor (MCU), the mode selection key 330 includes a plurality of control keys, and the inertial detection unit 350 is configured to be an inertial sensor. The mobile ranging apparatus 30*a* is provided with an independent power supply 380*a* for supplying electric energy for the above electricity utilization units. The laser ranging unit 300 is configured to transmit a laser of a fixed wavelength and perform ranging based on the time interval detected between reflecting and returning of the laser. The infrared receiving unit 302 is configured to receive an infrared signal transmitted from the infrared transmitting tube 55*a* on the base 51. When the laser transmitted from the laser ranging unit 300 irradiates onto the light guide post 53 and the optoelectronic detection sensor 58 detects the laser of the fixed wavelength, an infrared signal is transmitted by the infrared transmitting tube 55*a*. When the infrared receiving unit 302 of the mobile ranging apparatus 30*a* receives the infrared signal, the laser ranging unit 300 records a ranging value, that is, the distance between the mobile ranging apparatus 30*a* and the light guide post 53.

Figure 60:
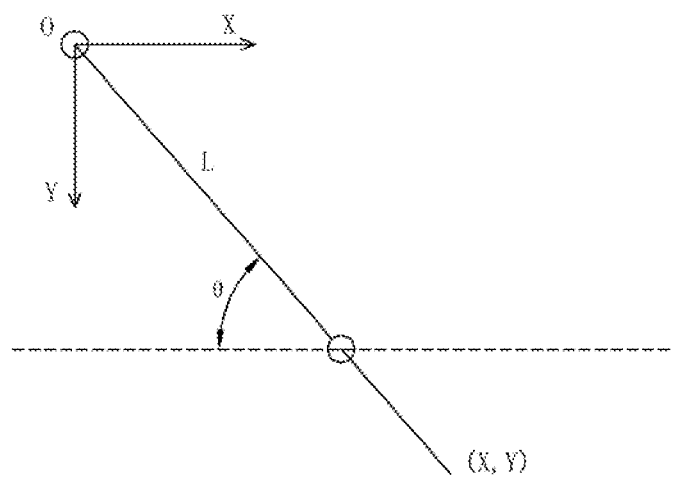
FIG. 60 is a schematic diagram of two-dimensional coordinate calculation of a mobile ranging apparatus of the positioning system of FIG. 57.

Referring to FIG. 60, in the process of ranging and positioning, the secondary positioning member 50*a*, that is the coordinate base, is fixed within the working plane W, and a ranging function of the hand-held electric drill with the mobile ranging apparatus 30*a* is enabled. The electric drill rotates within the working plane W, so that the laser transmitted from the laser ranging unit 300 scans the light guide post 53 on the coordinate base, the laser ranging unit 300 of the mobile ranging apparatus 30*a* automatically detects the distance from the light guide post 53, and the inertial detection unit 350 automatically detects an included angle to a horizontal plane and calculates and displays two-dimensional coordinate values that use the coordinate base as a reference.

The coordinate base provides two-dimensional coordinate values that use the center of the light guide post as the origin O. The two-dimensional coordinate values are used as XOY two-dimensional coordinates of a horizontal or vertical coordinate axis on the working plane W. The mobile ranging apparatus 30*a* detects a linear distance L from the origin O through the laser ranging unit 300, detects an included angle θ to a connecting line with the origin O through the inertial detection unit 350, and then may acquires coordinates (X, Y), where X=L* sin θ; and Y=L* cos θ. By using such a ranging manner, the user may perform working for example, punching, cutting, and the like, on a plane such as a vertical wall and a wood plate, may implement two-dimensional positioning within the working plane and may be assisted in completing operations such as linear cutting, isometric punching, and positioning and drilling, which is convenient, efficient, and easy to use, with high precision. Reference can be made to the sixth embodiment for an operation flow of ranging and positioning as well as punching under human assistance as well as an operation flow of determining a punching position in an intelligent manner, which will not be described repeatedly in this embodiment.

Figure 61:
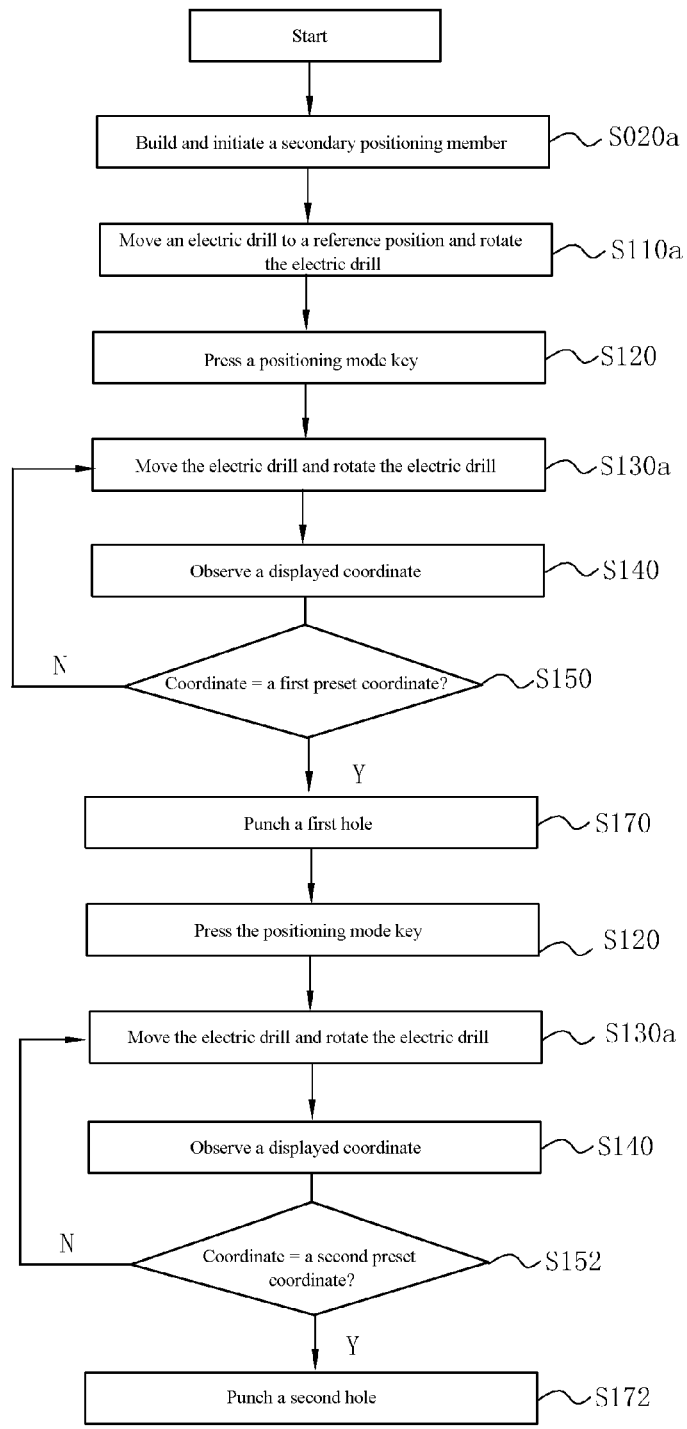
FIG. 61 is a flowchart of punching, by the secondary positioning member and the mobile ranging apparatus of FIG. 48 and FIG. 57 under a human-assisted determining mode, a first hole by taking a reference position as a benchmark and a second hole by taking a first hole position as a benchmark.

Referring to FIG. 61, the mobile ranging apparatus of the sixth embodiment and the seventh embodiment is integrated into the electric drill, ranging and positioning as well as punching may be implemented on the working plane W, and the positioning may be observed through the display screen in real time. An operation flow of punching a first hole by taking a reference position as a benchmark and a second hole by taking a first hole position as a benchmark under the human-assisted mode is shown as follows: step S020a, building and initiating a light tower on a working plane; step S110a, moving an electric drill to a reference position and rotating the electric drill, so that a ranging laser scans a light guide post; step S120, pressing a positioning mode key so as to record a coordinate of a reference point with the positioning mode key; step S130a, moving the electric drill and rotating the electric drill; step S140, observing coordinate display on a display screen; step S150, determining whether the coordinate display is consistent with a preset first predetermined coordinate, if so, indicating that the electric drill has been moved to a predetermined position, and if not, continuing to move and rotate the electric drill until the coordinate display is consistent with the preset first predetermined coordinate; and step S170, punching a first hole in the predetermined position. If a second hole needs to be punched, the following operation step are performed: S120, pressing the positioning mode key in a first hole position; step S130a, moving the electric drill and rotating the electric drill, so that the ranging laser scans the light guide post; step S140, observing coordinate display on the display screen; step 152, determining whether the coordinate display is consistent with a preset second predetermined coordinate, if so, indicating that the electric drill has been moved to the predetermined position, and if not, continuing to move and rotate the electric drill until the coordinate display is consistent with the preset second predetermined coordinate; and step S172, punching a second hole in the predetermined position. If more holes need to be punched, for example, a third hole, a fourth hole, and so on, operations may be performed based on the above method.

Figure 62:
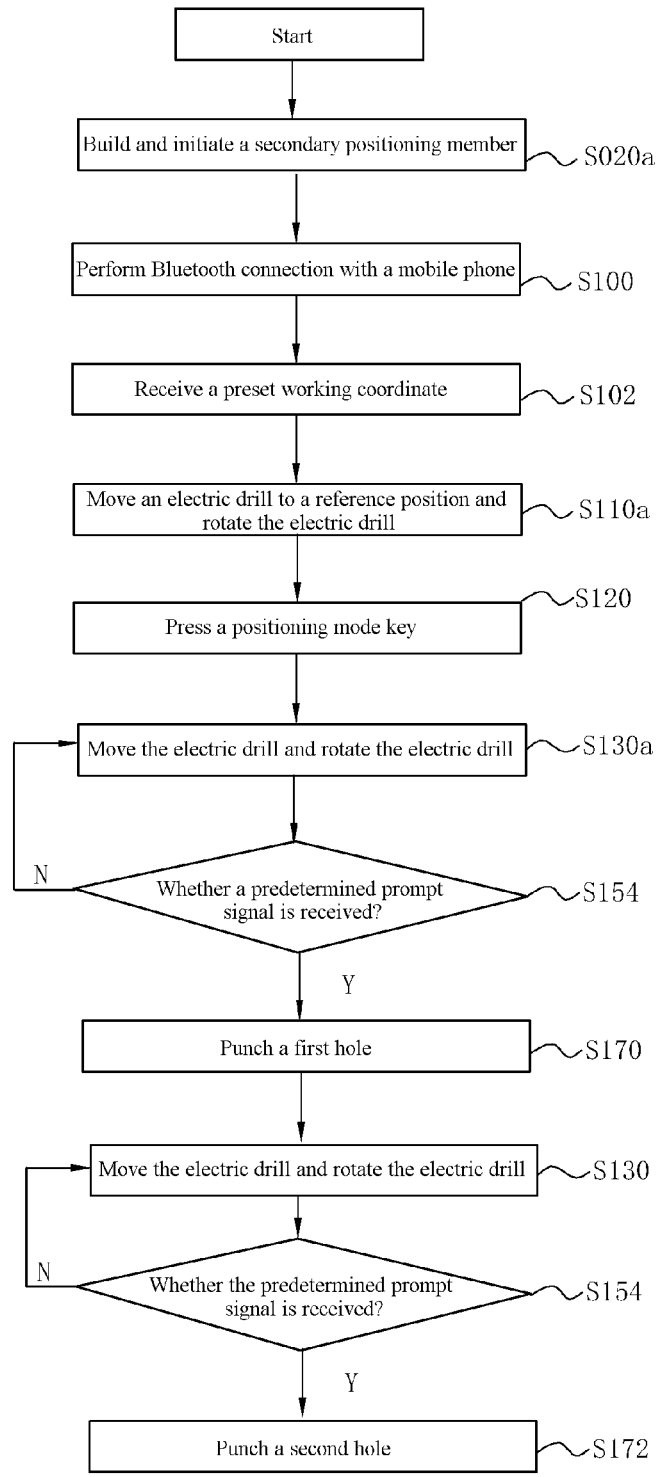
FIG. 62 is a flowchart of punching a first hole and a second hole by the secondary positioning member and a mobile ranging apparatus of FIG. 48 and FIG. 57 under an intelligent determining mode by receiving a preset working coordinate from a mobile phone.

Referring to FIG. 62, an operation flow of punching a first hole and a second hole by the electric drill under the intelligent determining mode by receiving a preset working coordinate from a mobile phone includes: step S020a, building and initiating a secondary positioning member; step S100, establishing Bluetooth connection with a mobile phone; step S102, receiving a preset working coordinate from the mobile phone, where the preset working coordinate may include a series of coordinates, that is, coordinates of a plurality of consecutive punching positions; step S110, moving an electric drill to a reference position; step S120, pressing a positioning mode key; step S130a, moving the electric drill and rotating the electric drill; step S154, determining whether a preset prompt signal is received, where if it is observed that an LED lamp is lit up or it is heard that a buzzer produces a sound, it indicates that the electric drill has been moved to a predetermined punching position; and step S170, a user punching a first hole. In addition, if a second hole is to be punched, the following steps are performed: step S120, pressing the positioning mode key by taking the first hole as a benchmark; step S130a, moving the electric drill again and rotating the electric drill; step S154, determining whether the preset prompt signal is received; finally, step S172, punching a second hole in a second preset predetermined position, and so on.

Reference can be made to FIG. 44 for operation flows of punching a first hole and a second hole by the secondary positioning members 50, 50a of the ranging and positioning apparatus and the mobile ranging apparatus 30a combined into the electric drill 100a by inputting a preset coordinate. The differences lie in that it is required to rotate the electric drill around a drill bit when the electric drill is moved to the reference position, and that it is required to rotate the electric drill around the drill bit and observe whether a reminding device emits a prompt signal when the electric drill is moved, which will not be described repeatedly in this embodiment.

An Eighth Embodiment

Figure 63:
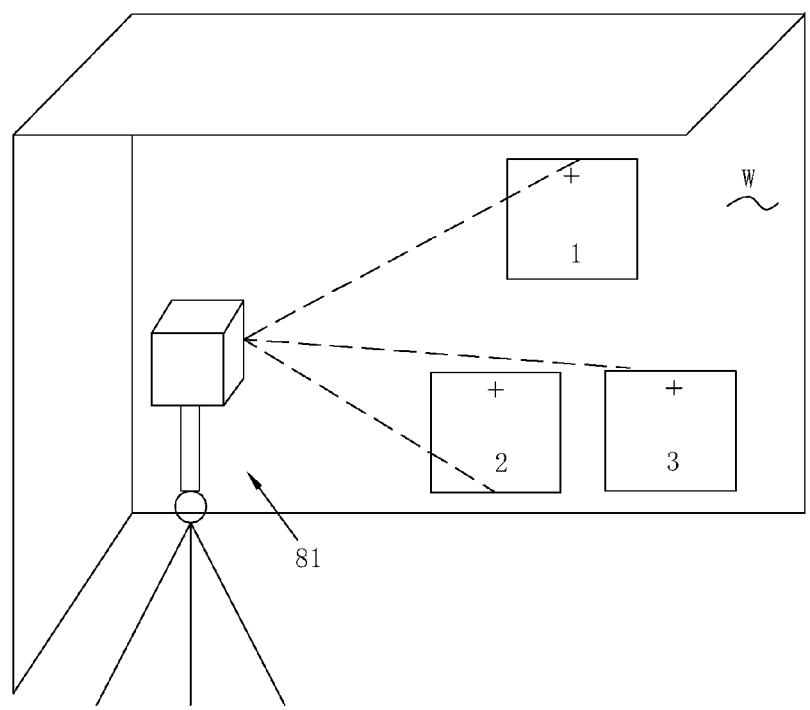
FIG. 63 is a schematic diagram of a working scenario of a positioning apparatus in an eighth embodiment of the present invention.
Figure 64:
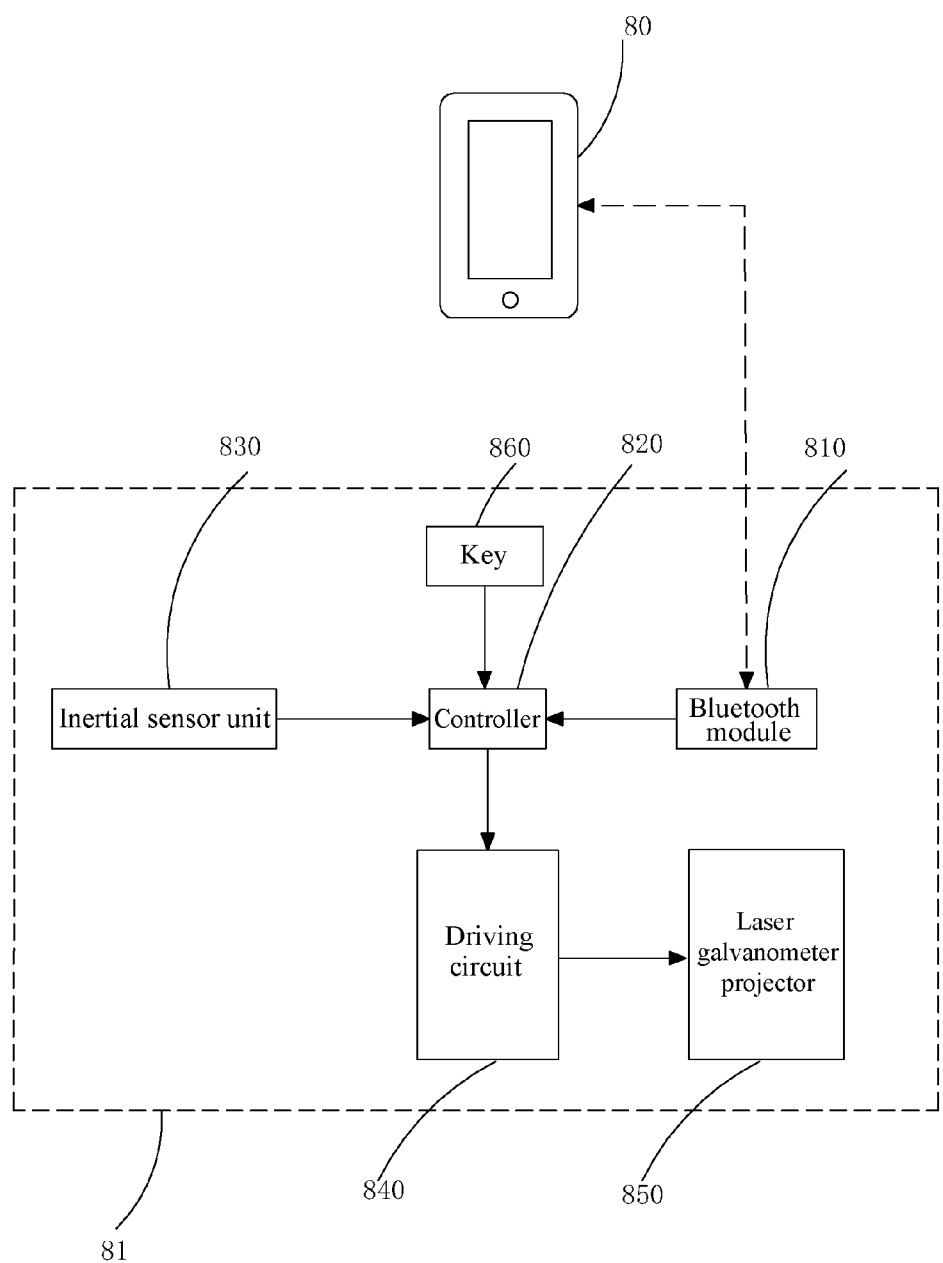
FIG. 64 is a working schematic diagram of the positioning apparatus of FIG. 63 being in communication with an intelligent apparatus.

Referring to FIG. 63 and FIG. 64, the present invention relates to a positioning apparatus 81 suitable for assisting in hanging a picture and having communication association with an intelligent apparatus 80. The positioning apparatus 81 includes a laser galvanometer projection apparatus 850. The laser galvanometer projection apparatus 850 is used as a display device for projection onto a wall W configured to be hung with a picture. The electric drill, as a punching tool, may perform a punching operation independently after positioned on the working plane accurately. Specifically, the positioning apparatus 81 includes: a communication module, specifically, a Bluetooth module 810; a detecting module, including an inertial sensor unit 830; a control module, including a controller 820 that connects the Bluetooth module 810 with the inertial sensor unit 830 and a driving circuit 840 for receiving a control signal of the controller; and an output module, including a laser galvanometer projection apparatus 850 that is controlled by the driving circuit 840 to perform operations. The positioning apparatus 81 further includes an input module, and specifically, the input module is configured to be a key or a touch screen.

The positioning apparatus 81 receives, through the Bluetooth module 810, picture frame size data generated after typeset by an intelligent apparatus APP, inputs an instruction by operating a key 860 so as to notify the controller 820 to receive the picture frame size sent from an intelligent apparatus, and controls, through the key 860, the laser galvanometer projection apparatus 850 to correct a projection proportion so as to project onto the picture hanging wall W by means of a picture of equal proportion.

Figure 65:
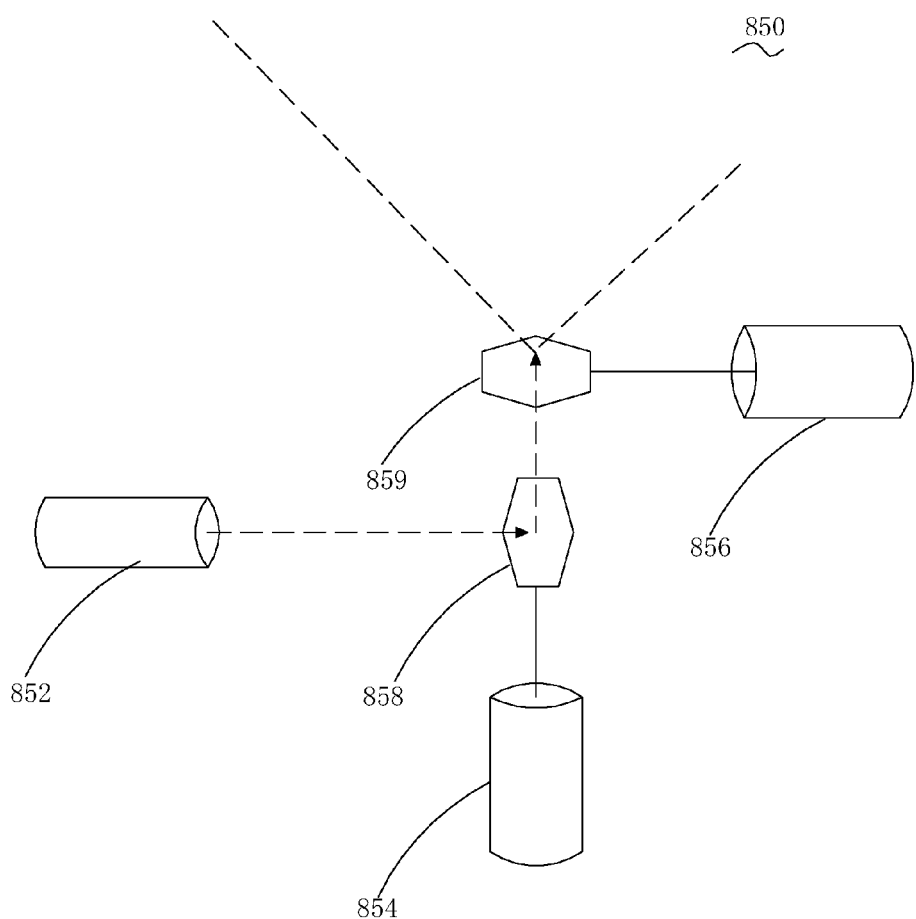
FIG. 65 is a schematic structural diagram of a laser galvanometer display device of FIG. 64.

Referring to FIG. 64 and FIG. 65, the laser galvanometer projection apparatus 850 includes a laser transmitter 852 and two scanning reflection units, that is, an X-axis scanning reflection unit and a Y-axis scanning reflection unit. The X-axis scanning reflection unit includes an X-axis scanning motor 854 and an X-axis scanning reflection mirror 858 that is controlled by the X-axis scanning motor 854. The Y-axis scanning reflection unit includes a Y-axis scanning motor 856 and a Y-axis scanning reflection mirror 859 that is controlled by the Y-axis scanning motor 856. The X-axis scanning motor 854 and the Y-axis scanning motor 856 are high-speed motors respectively. The laser transmitter is a dotted laser transmitter. A dotted laser transmitted from the dotted laser transmitter scans through the X-axis scanning reflection mirror 858 and the Y-axis scanning reflection mirror 859 respectively in high speed. The dotted laser scans a particular picture trajectory on the wall, and a particular graphic image may be formed on the picture hanging wall W due to a pause in human vision.

The Bluetooth module 810 is configured to perform communication and transmission with an intelligent apparatus, for example, a smart phone, a computer, an IPD or other apparatuses. The intelligent apparatus may typeset, by installing corresponding APP typesetting software, picture frames of a plurality of pictures after photographing and may transmit, in a wireless manner, image size data generated by typesetting with the Bluetooth module 810 of the positioning apparatus 81. The Bluetooth module 810 may not only be used for transmitting the image size data, but also be used for transmitting control information, for example, scanning speeds of the laser galvanometer projection apparatus 850, image brightness, etc., or transmitting sate information about the positioning apparatus 81, for example, battery levels, temperatures, scanning speeds, image brightness, etc.

The controller 820 is a microcontroller (MCU), used for receiving the image size data, and may convert the data into movement control data on the X-/Y-axis scanning motor and control data on the laser transmitter 852 and send the control data to the driving circuit 840. The image size data received by the controller 820 includes outer frame size for typesetting and editing each picture frame, numbers of the picture frames, positions of hooks of the picture frames relative to respective picture frames, relative position relationships between the picture frames, etc.

The inertial sensor unit 830 includes a three-axis accelerometer and a three-axis gyroscope, and is configured to detect attitude angles of the positioning apparatus 81 in real time and automatically correct and adjust a projected image and a pitch distortion angle parameter in real time based on the detected attitude angles, so as to ensure that the projected image is horizontal on the wall W. The projected image may also be projected onto the picture hanging wall W at a perpendicular or preset angle based on scenario requirements.

The driving circuit 840 is configured to receive control information or data, controlling an on/off state of the laser transmitter 852, and controlling a movement angle of the X-axis scanning motor 854.

Referring to FIG. 63, information projected by the laser galvanometer projection apparatus 850 onto the picture hanging wall W includes outer frame size for typesetting and editing each picture frame, numbers of the picture frames, positions of hooks of the picture frames relative to respective picture frames, and relative position relationships between the picture frames. The user needs to punch a hole or mount a hook at a cross-shaped aiming mark position of the picture frame, place a picture frame of a corresponding number into a corresponding projection picture frame, and enable borders overlap with image boundaries.

Figure 66:
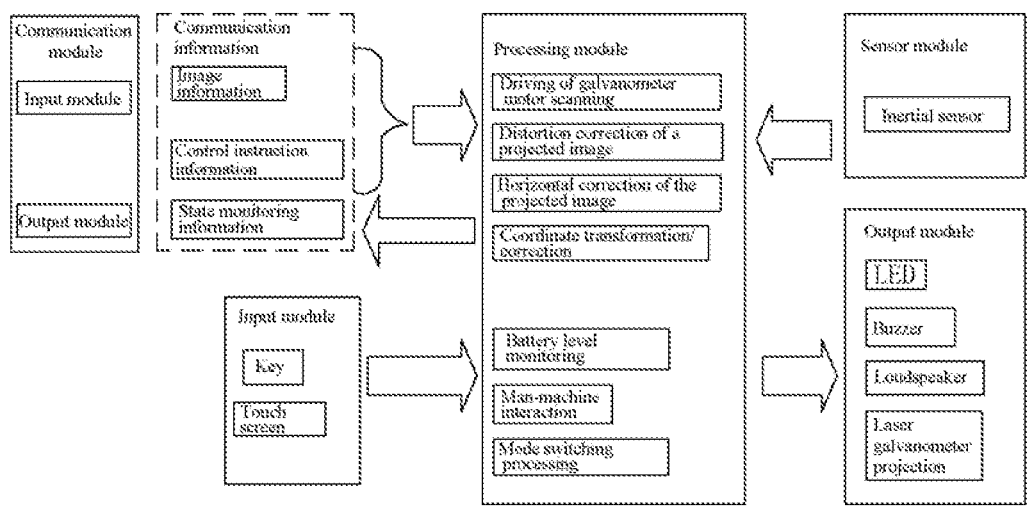
FIG. 66 is a schematic diagram of communication information and control between the positioning apparatus of FIG. 63 and an intelligent apparatus.

Referring to FIG. 66, the laser galvanometer projection apparatus configured to be in communication association with the intelligent apparatus includes a communication module, a detecting module, a processing module and an output module, where the communication module includes a receiving module for receiving information sent by the intelligent apparatus, the detecting module is configured to obtain a position of a preset predetermined and/or movement information about the positioning apparatus, and the processing module processes the information from the receiving module and/or the detecting module.

The communication module further includes a sending module for sending, to the intelligent apparatus, the information processed by the processing module or obtained by the detecting module. Communication information in this embodiment includes image information, control instruction information, and state monitoring information. The image information includes typeset picture frame images. The control instruction information includes working modes, projection proportion adjustment coefficients, projection pitch distortion adjustment coefficients, projection oblique distortion adjustment coefficients, projection brightness adjustment and settings, and scanning frequency settings. The working modes include a gradienter mode, a projector mode, and a picture hanging mode. The state monitoring information includes a battery level, a continuous working time of the apparatus, the remaining working time, a current working attitude, etc.

A projecting and positioning apparatus may send its current state monitoring information to the intelligent apparatus through the sending module.

The projecting and positioning apparatus includes an input unit. The input unit is electrically connected to the processing module. The input unit may be in the form of a key or a touch screen. At least one working mode may be selected for the projecting and positioning apparatus through the input module, that is, mode switching processing. The processing module in a corresponding working mode includes at least one information processing method corresponding to the working mode. The positioning apparatus may also be configured to perform functions such as man-machine interaction and battery level monitoring, through the input unit.

The detecting module includes an inertial sensor and is configured to detect a movement and/or state parameter of the projecting and positioning apparatus. The processing of the processing module includes driving of galvanometer motor scanning, distortion correction of the projected images, horizontal correction of the projected images, proportional adjustment of the projected images, etc.

The projecting and positioning apparatus further includes an output module for outputting, in a sensible manner, the information processed by the processing module. The output module of this embodiment may be a reminding device for emitting a prompt signal based on a processing result of the processing module. The reminding apparatus includes at least one indication unit and/or a display device. The display device emits an optical signal, and the indication unit emits a sound signal. The display device of this embodiment may employ laser galvanometer projection and may also be other means such as an LED and a display, and the indication unit may be a buzzer, a loudspeaker, etc.

Figure 67:
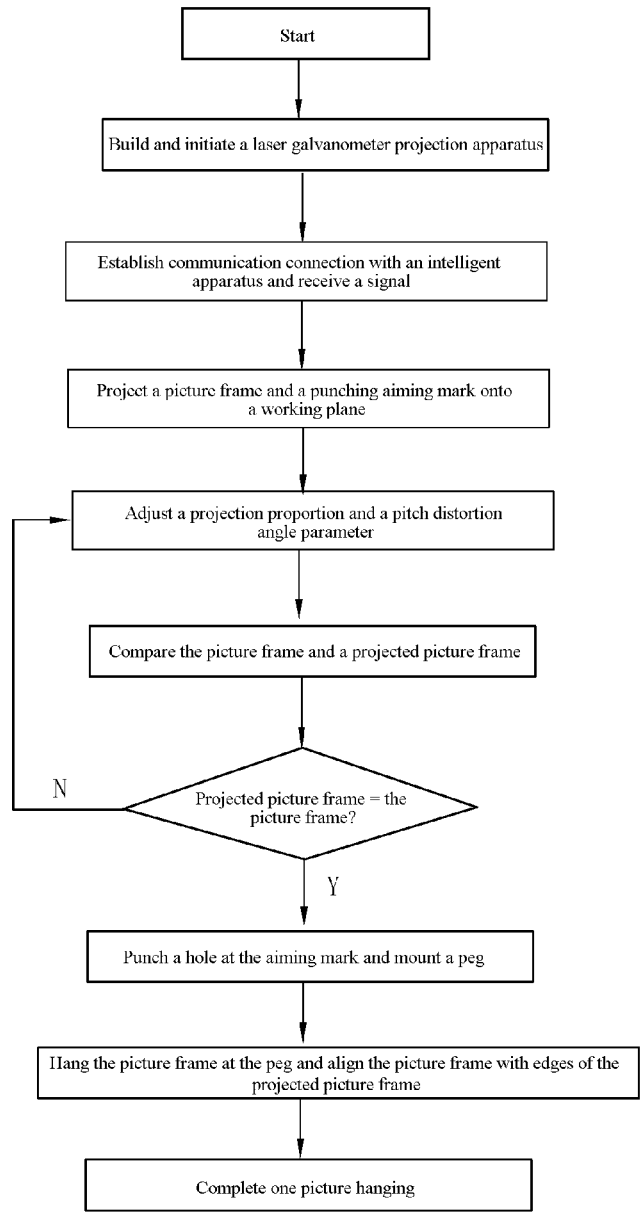
FIG. 67 is a schematic flow of performing working predetermined positioning in a working area with the positioning apparatus of FIG. 63 cooperated with an intelligent apparatus so as to assist in picture hanging.

Referring to FIG. 67, an operation flow of positioning, punching, and picture hanging on the working plane W is shown as follows: building a laser galvanometer projection apparatus in a working space and initiating the laser galvanometer projection apparatus to operate, so that the laser galvanometer projection apparatus establishes communication connection with an intelligent apparatus through the Bluetooth module 810; receiving information sent from the intelligent apparatus; projecting the information onto a predetermined area in an image projection manner, so that the laser galvanometer projection apparatus projects a picture frame and a cross-shaped aiming mark onto a picture hanging wall W; adjusting and correcting an image projection proportion and a pitch distortion angle parameter, so that a physical picture frame may overlap with a projected picture frame image in the predetermined area so as to determine an aiming mark position, and if the physical picture frame is inconsistent with the size of a projected picture frame, repeating the above adjusting and correcting an image projection proportion and a pitch distortion angle parameter again; punching a hole and mounting a peg in the aiming mark position directly, or marking an aiming mark position in the projected image first, and then, punching a hole in the aiming mark position; and then, hanging a picture frame at the peg and aligning the physical picture frame with the projected picture frame along borders, so that one picture hanging is completed.

The following steps are also included: verifying whether the size of a real picture frame is consistent with the size of the projected picture frame; adjusting the projection proportion and the pitch distortion angle parameter through a key of the input module, or adjusting the projection proportion and the pitch distortion angle parameter by operating the intelligent apparatus, until the size of the real picture frame is consistent with the size of the projected picture frame; punching a hole and mounting a peg in the aiming mark position; and hanging a picture and adjusting a position of a frame of the picture so as to align the picture frame with edges of the projected picture frame, so that hanging of a piece of picture is completed. If a plurality of pictures need to be hung, the above operation flow may be repeated.

A Ninth Embodiment

Figure 68:
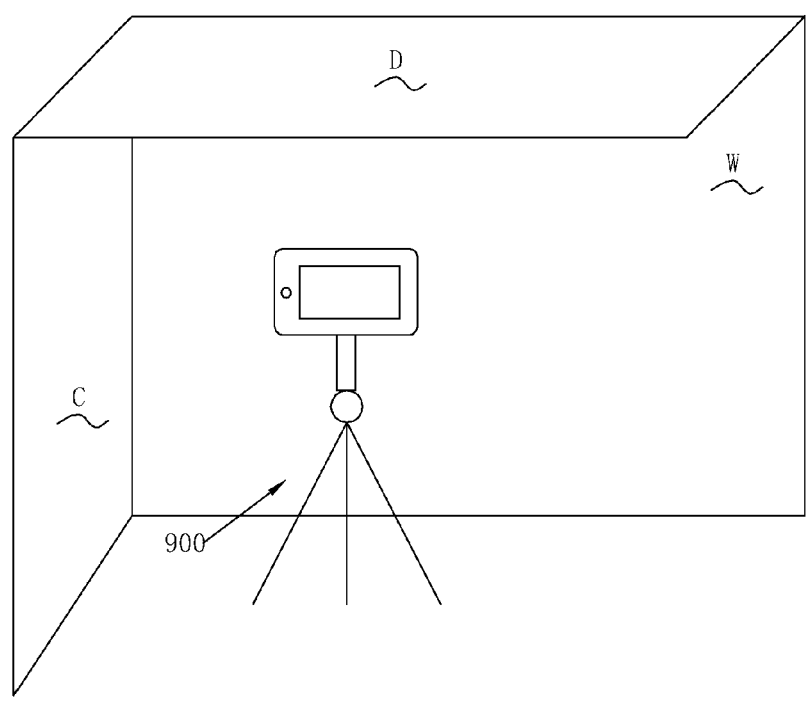
FIG. 68 is a schematic diagram of a working scenario of a positioning apparatus in a ninth embodiment of the present invention.
Figure 69:
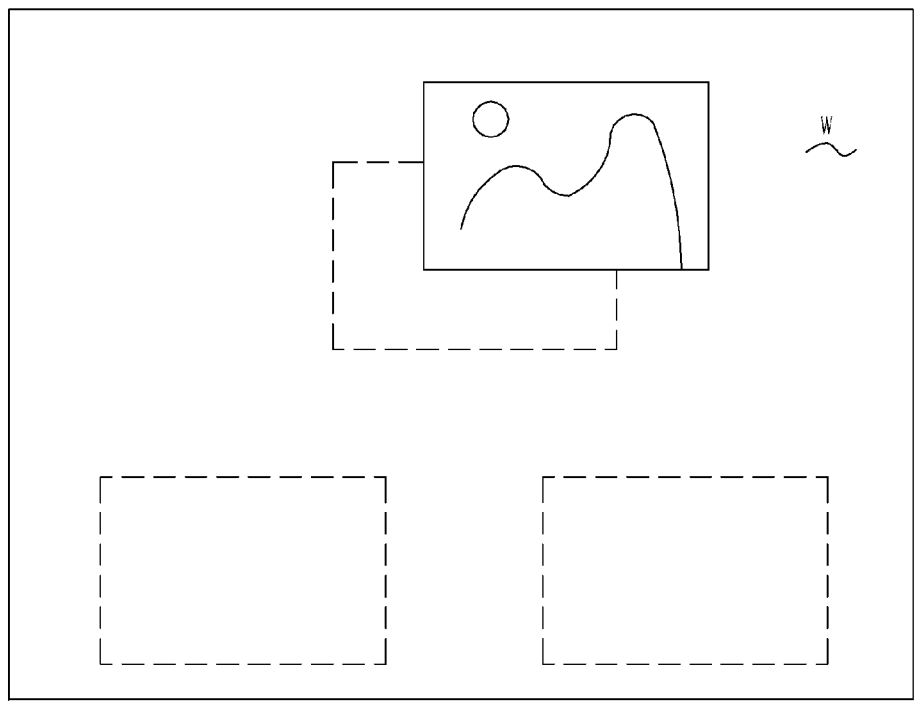
FIG. 69 is a schematic diagram of a position comparison of a virtual picture frame projected onto a working plane by using the positioning apparatus of FIG. 68 with a physical picture frame.

Referring to FIG. 68 and FIG. 69, the positioning apparatus of the present invention is implemented by the intelligent apparatus itself. Based on real-time visual identification and detection technology, a user hanging a picture is reminded, in real time, of a correct position and a departure direction of placing the picture frame on the wall W, so as to provide convenience for picture hanging on the wall during assisting a single person in working.

In this embodiment, an intelligent apparatus 900 is configured to enter image information about the hung picture, for example, a photographed physical picture frame, an actual picture-hanging wall and surrounding reference substances. Position data is designed to be generated through a typesetting APP installed in the intelligent apparatus 900. In the process of picture hanging, a camera of the intelligent apparatus identifies the wall and images of moving pictures in real time, and emits a voice prompt or other sound signals after comparing borders of the picture frame with a picture frame in a virtual position in terms of position and direction, so as to assist a picture-hanging operator in adjusting the position of the picture frame.

Specifically, three picture frame design diagrams as indicated by dashed boxes in FIG. 69 are virtual picture frame positions that are generated through the typesetting APP after entering size and image information about the picture frame through the intelligent apparatus 900 and correspond to an actual wall.

Figure 70:
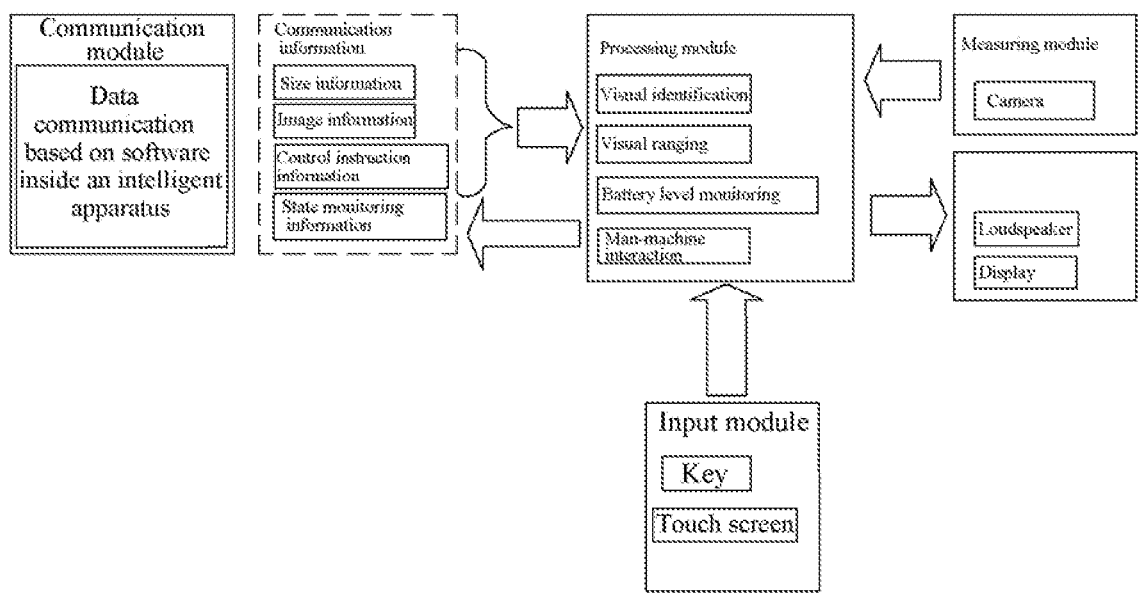
FIG. 70 is a schematic diagram of communication information and control between the positioning apparatus and an intelligent apparatus.

Referring to FIG. 70, a positioning apparatus configured to be in communication association with an intelligent apparatus and have a visual identification function includes a communication module, a detecting module, a processing module, and an output module. The communication module performs data communication based on software inside the intelligent apparatus. Communication information includes size information, image information, control instruction information, and state monitoring information. The measure module is a camera and configured to obtain position information about a preset predetermined. The processing module is responsible for processing data from the camera or the software inside the intelligent apparatus. The processing of the processing module includes visual identification, visual ranging, etc.

A visual identifying and positioning apparatus further includes an input unit. The input unit is electrically connected to the processing module. The input unit may be in the form of a key or a touch screen, the visual identifying and positioning apparatus may be configured, through the input unit, to perform state control such as man-machine interaction and battery level monitoring. State control information is fed back to the intelligent apparatus through the data communication inside the intelligent apparatus.

The output module is configured to output, in a sensible manner, information processed by the processing module or captured by the camera. The output module of this embodiment is a reminding device for emitting a prompt signal based on a processing result of the processing module. The prompt signal may be an optical signal and/or a sound signal. The optical signal may be indicated by using a display. The sound signal may be indicated by using a loudspeaker.

The image information includes a picture frame front-face image and a typeset picture frame image. The control instruction information includes a visual ranging ambiguity tolerance. The state monitoring information includes a battery level and the remaining working time.

Figure 71:
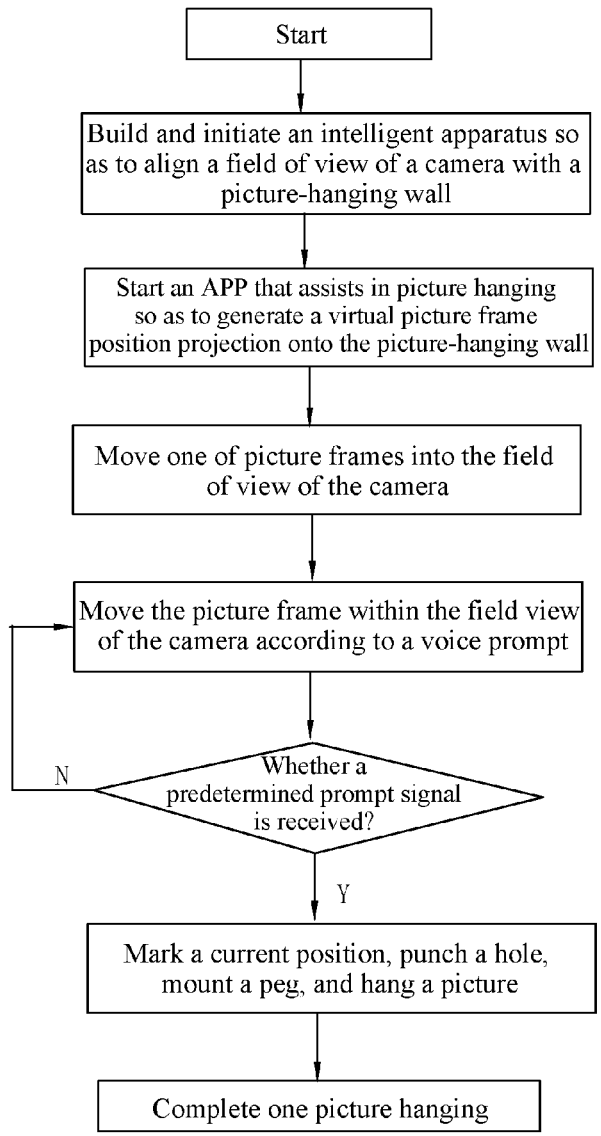
FIG. 71 is a schematic flow of performing working predetermined positioning in a working plane by using the intelligent positioning apparatus of FIG. 68, so as to assist in picture hanging.

Referring to FIG. 71, an operation flow of assisting in picture hanging on a wall by using an intelligent apparatus is shown as follows: building an intelligent apparatus 900 and fixing the intelligent apparatus in a position by using a tripod or other fixing devices so as to align a field of view of a camera of the intelligent apparatus to a picture hanging wall W; initiating a typesetting APP that assists in picture hanging, projecting based on a virtual picture hanging position generated by the typesetting APP on the wall, initiating the camera to capture an image of the wall, identifying feature points on the wall by the intelligent apparatus 900, for example, an artificially placed reference substance, an identifiable lamp, a hung picture frame, etc., and matching typesetting position data coordinates with the wall W automatically; moving one of physical picture frames for typesetting into the field of view for photographing via the camera, capturing an image of the picture frame by the camera, and determining, by identification, a position corresponding to the physical picture frame; capturing a picture frame image by the camera, identifying edges of the picture frame automatically, comparing the edges with boundaries of the picture frame in a corresponding position, and determining a relative position; prompting a picture-hanging operator, by voice, of moving left, moving right, moving upward, moving downward, rotating left, rotating right, position being correct, and other information so as to assist the picture-hanging operator in picture hanging; and marking a current position if the prompting is received, punching a hole, mounting a peg, and finally completing the picture hanging. If more than one picture is to be hung, the following steps may be repeated again: moving a physical picture frame for typesetting into a field of view for photographing via the camera; moving the picture frame based on an indication of voice, until it is indicated that the moving is enough; and marking a current position, punching a hole, mounting a peg, and hanging a picture.

By using the intelligent apparatus 900 as the positioning apparatus to assist in picture hanging, use functions of the intelligent apparatus 900 are utilized and developed sufficiently, so that the intelligent apparatus 900 indicates the operator of correct operation steps like a real assistant, which is obviously very humanized and makes picture hanging of a single person more intelligent and rapid. With the machine vision technology, the precision of picture hanging is higher.

The above embodiments merely illustrate several implementations of the present invention and are not to be construed as a limitation to the patent scope of the present invention. It should be noted that a person of ordinary skill in the art may make several variations and improvements without departing from the concept of the present invention, and all these variations and improvements shall fall within the protection scope of the present invention. The patent protection scope of the present invention shall be subject to the appended claims.

What is claimed is:

1. A hand-held tool system, comprising:
a hand-held tool;
and a positioning device couple to the hand-held tool;
wherein the hand-held tool comprises an output shaft and a working head coupled to the output shaft; and the positioning device comprises:
a detecting module configured to detect a position feature and/or a movement feature of the positioning device and output a parameter indicative of the position feature and/or the movement feature, the detecting module and the working head having a preset distance therebetween;
a storage module configured at least to record reference position information about the working head;
a control module configured to acquire real-time position information about the working head based on the parameter, the preset distance, and the reference position information; and
an output module configured to output the real-time position information in a sensible manner.

2. The hand-held tool system according to claim 1, wherein the hand-held tool comprises a main body portion and a holding portion arranged at an angle to the main body portion, wherein the positioning device is disposed in the main body portion.

3. The hand-held tool system according to claim 2, wherein the positioning device further comprises an input unit configured to input predetermined position information.

4. The hand-held tool system according to claim 3, wherein the input unit is configured to be a key or a touch screen, and wherein the input unit is arranged on a tail end face of the main body portion which is opposite to the working head.

5. The hand-held tool system according to claim 2, wherein the positioning device further comprises an actuating unit for actuating to record information of a determined reference position, wherein the actuating unit is disposed in the holding portion and adjacent to a switch trigger.

6. The hand-held tool system according to claim 2, wherein the output module comprises a display screen for displaying position information of the working head in a digital manner.

7. The hand-held tool system according to 6, wherein the display screen is arranged on a tail end face of the main body portion which is opposite to the working head.

8. The hand-held tool system according to claim 1, wherein the positioning device further comprises a mode selection unit configured to operably select the positioning device to be in a predetermined working mode, wherein the control module is configured to match an operation interface corresponding to the predetermined working mode.

9. The hand-held tool system according to claim 1, wherein the output module comprises a reminding device, wherein the reminding device is controlled to send out an indication when the control module determines that the positioning portion is moved to a preset area adjacent to the predetermined position.

10. The hand-held tool system according to claim 9, wherein the reminding device is controlled to send out an in-place indication when the control module determines that the positioning portion is reached to the predetermined position.

11. The hand-held tool system according to claim 1, wherein the positioning device is provided with a DC power supply for supplying electric energy.

12. The hand-held tool system according to claim 1, wherein the detecting module comprises an inertial detection unit for detecting an attitude angle of the positioning device, wherein the inertial detection unit is arranged parallel with or perpendicular to an axis of the output shaft of the hand-held tool.

13. The hand-held tool system according to claim 12, wherein the inertial detection unit comprises an acceleration sensor and an angular velocity sensor, wherein the acceleration sensor is configured as a three-axis accelerometer and the angular velocity sensor is configured as a three-axis gyroscope.

14. The hand-held tool system according to claim 12, wherein the detecting module further comprises an image sensing unit configured to detect a displacement of the positioning device, wherein the image sensing unit comprises a laser camera and a laser transmitter.

15. The hand-held tool system according to claim 1, wherein the detecting module further comprises a laser ranging unit configured to detect a linear distance between the positioning device and a reference plane, wherein the laser ranging unit comprises a laser transmitter and a laser sensor.

16. The hand-held tool system according to claim 15, wherein the laser ranging unit comprises a first laser unit and a second laser unit that are arranged perpendicular to each other.

17. The hand-held tool system according to claim 16, wherein axis of the first laser unit and that of the second laser unit define a plane perpendicular to the axis of the output shaft of the hand-held tool.

18. The hand-held tool system according to claim 15, wherein the laser ranging unit is rotatable about an axis.

19. The hand-held tool system according to claim 1, wherein the hand-held tool comprises an interlock control circuit configured to initiate the hand-held tool or the positioning device working alternatively.

20. The hand-held tool system according to claim 1, wherein the control module comprises a processing module configured to reset the reference position information.

21. A hand-held tool system, comprising a hand-held tool and a positioning device couple to the hand-held tool, wherein the hand-held tool comprises an output shaft and a working head coupled to the output shaft; and the positioning device comprises:
a detecting module configured to detect a position feature and/or a movement feature of the positioning device and output a parameter indicative of the position feature and/or the movement feature, the detecting module and the working head having a preset distance therebetween;
a communication module configured to communicate with an intelligent apparatus so as to obtain a predetermined position information from the intelligent apparatus;

a storage module configured at least to record reference position information about the working head;

a control module configured to acquire real-time position information about the working head based on the parameter, the preset distance, and the reference position information; and an output module configured to give an indication based on the real-time position information and the predetermined position information.

22. The hand-held tool system according to claim 21, wherein communication is performed between the communication module and the intelligent apparatus at least by means of one of Wi-Fi, Bluetooth, infrared, and NFC.

23. The hand-held tool system according to claim 22, wherein communication information at least comprises one of position information, size information, image information, control instruction information, state monitoring information, and voice information.

* * * * *